(12) United States Patent
Masuda

(10) Patent No.: US 10,898,804 B2
(45) Date of Patent: Jan. 26, 2021

(54) IMAGE PROCESSING DEVICE AND IMAGE PROCESSING METHOD

(71) Applicant: SONY CORPORATION, Tokyo (JP)

(72) Inventor: Tooru Masuda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 60 days.

(21) Appl. No.: 16/321,525

(22) PCT Filed: Aug. 4, 2017

(86) PCT No.: PCT/JP2017/028337
§ 371 (c)(1),
(2) Date: Jan. 29, 2019

(87) PCT Pub. No.: WO2018/034171
PCT Pub. Date: Feb. 22, 2018

(65) Prior Publication Data
US 2019/0160377 A1 May 30, 2019

(30) Foreign Application Priority Data
Aug. 19, 2016 (JP) .................................. 2016-161233

(51) Int. Cl.
*A63F 13/525* (2014.01)
*G06T 15/20* (2011.01)
(Continued)

(52) U.S. Cl.
CPC ........ *A63F 13/525* (2014.09); *A63F 13/5252* (2014.09); *A63F 13/655* (2014.09);
(Continued)

(58) Field of Classification Search
CPC combination set(s) only.
See application file for complete search history.

(56) References Cited

U.S. PATENT DOCUMENTS 7,146,023 B2 * 12/2006 Kondo .................. G06T 15/205
382/107
7,848,628 B2 * 12/2010 Ujisato .................. G03B 37/04
396/72
(Continued)

FOREIGN PATENT DOCUMENTS

JP 2003-006618 A 1/2003
JP 2008-090750 A 4/2008
(Continued)

OTHER PUBLICATIONS

International Search Report and Written Opinion of PCT Application No. PCT/JP2017/028337, dated Oct. 17, 2017, 09 pages of ISRWO.

*Primary Examiner* — Tsung Yin Tsai
(74) *Attorney, Agent, or Firm* — Chip Law Group

(57) ABSTRACT

The present disclosure relates to an image processing device and an image processing method for achieving an easy change of a display mode of each object in live-action content. The image processing device includes an image generation section that changes a display mode of each of objects within a display image on the basis of segment information that indicates a position of a segment in which each of the objects is present, the position of the segment being a position in each of a plurality of layer images that are images generated on the basis of a plurality of captured images and are images classified into a plurality of layers in accordance with distances of the images from a predetermined visual point. For example, the present disclosure is applicable to a display device or the like.

11 Claims, 45 Drawing Sheets

(51) Int. Cl.
*G06T 19/00* (2011.01)
*A63F 13/655* (2014.01)
*G06T 15/04* (2011.01)
*G08G 1/16* (2006.01)
*A63F 13/5252* (2014.01)

(52) U.S. Cl.
CPC .............. *G06T 15/04* (2013.01); *G06T 15/20* (2013.01); *G06T 19/00* (2013.01); *G08G 1/16* (2013.01)

(56) References Cited

U.S. PATENT DOCUMENTS

| | | | | |
|---|---|---|---|---|
| 8,797,354 | B2* | 8/2014 | Noge | A63F 13/10 |
| | | | | 345/633 |
| 10,140,746 | B2* | 11/2018 | Masuda | G06T 13/80 |
| 2007/0040904 | A1* | 2/2007 | Kondo | G06T 7/55 |
| | | | | 348/51 |
| 2009/0021600 | A1* | 1/2009 | Watanabe | H04N 5/232933 |
| | | | | 348/222.1 |
| 2009/0080803 | A1* | 3/2009 | Hara | G06T 15/503 |
| | | | | 382/285 |
| 2009/0174652 | A1* | 7/2009 | Yamamoto | A63F 13/655 |
| | | | | 345/156 |
| 2010/0277620 | A1* | 11/2010 | Iijima | H04N 5/23293 |
| | | | | 348/240.1 |
| 2011/0141319 | A1* | 6/2011 | Watazawa | H04N 5/23229 |
| | | | | 348/240.2 |
| 2013/0044108 | A1* | 2/2013 | Tanaka | G06T 15/20 |
| | | | | 345/419 |
| 2015/0324655 | A1* | 11/2015 | Chalasani | G06K 9/3241 |
| | | | | 382/103 |
| 2017/0278289 | A1* | 9/2017 | Marino | G06Q 30/0276 |
| 2019/0108611 | A1* | 4/2019 | Izumi | G06T 3/0062 |
| 2019/0392192 | A1* | 12/2019 | Dubey | G06K 9/3233 |

FOREIGN PATENT DOCUMENTS

| | | |
|---|---|---|
| JP | 2011-147109 A | 7/2011 |
| JP | 2013-197881 A | 9/2013 |
| JP | 2015-164450 A | 9/2015 |

* cited by examiner

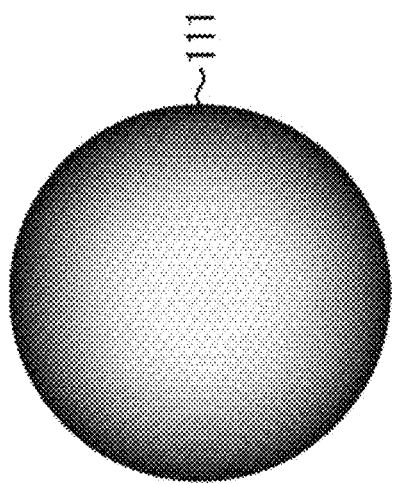
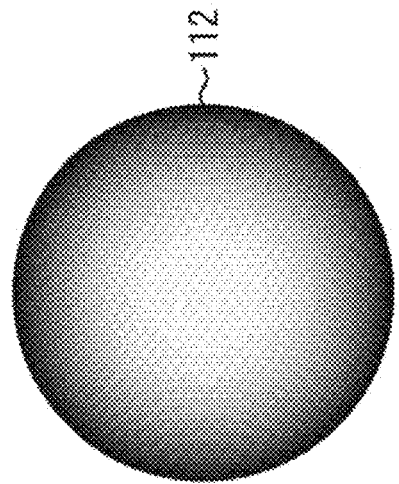
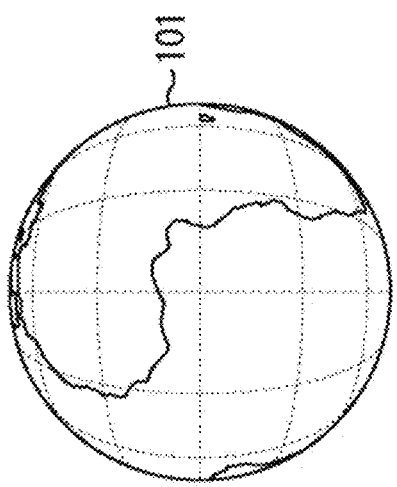
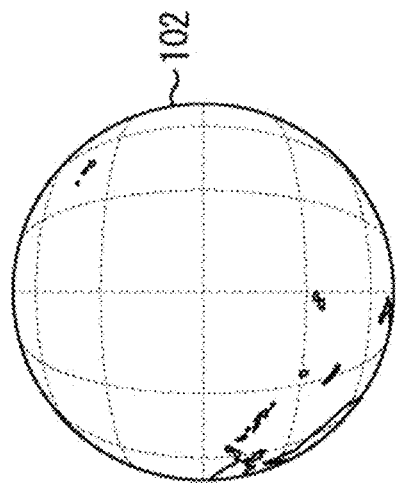
FIG. 4A
FIG. 4B

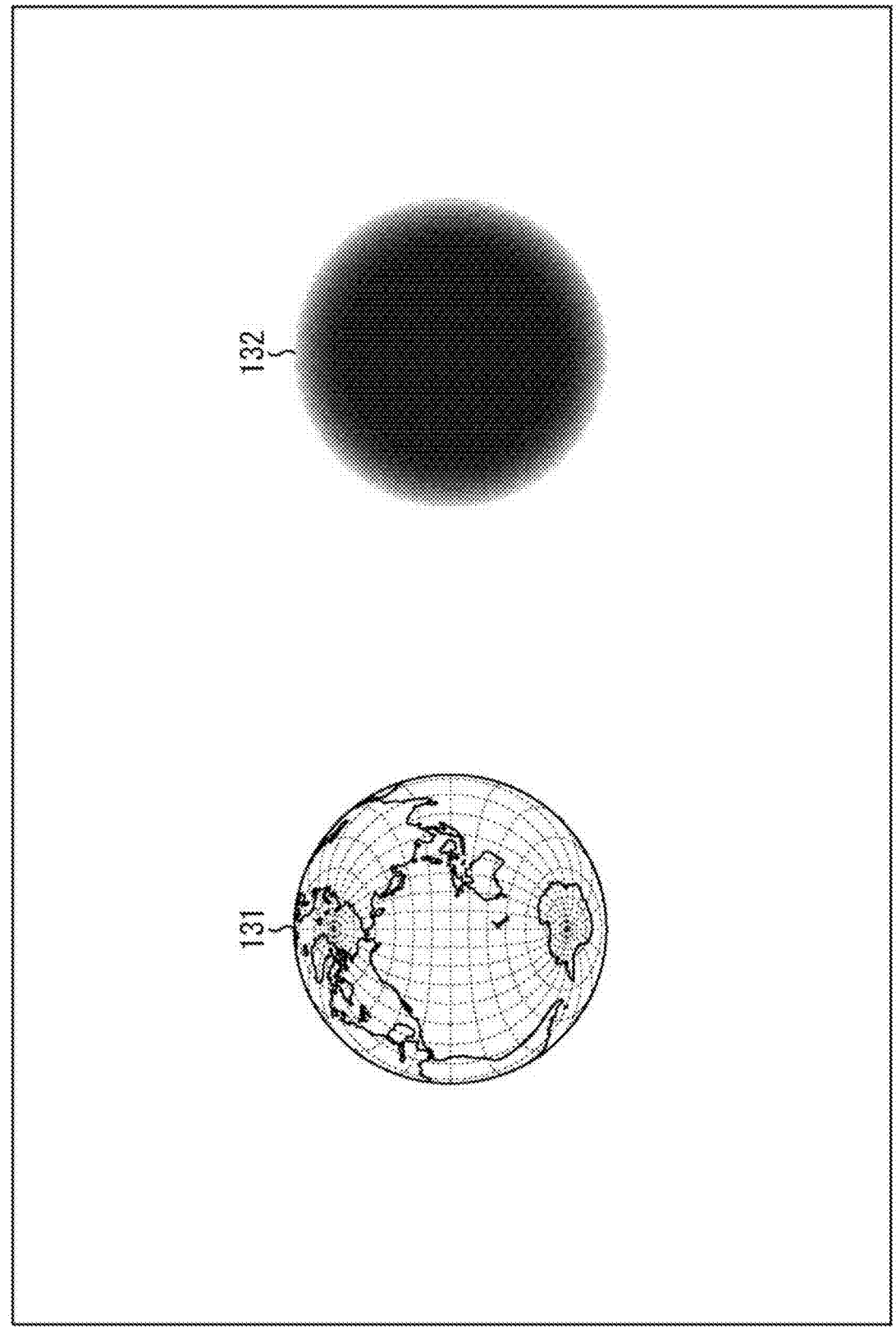

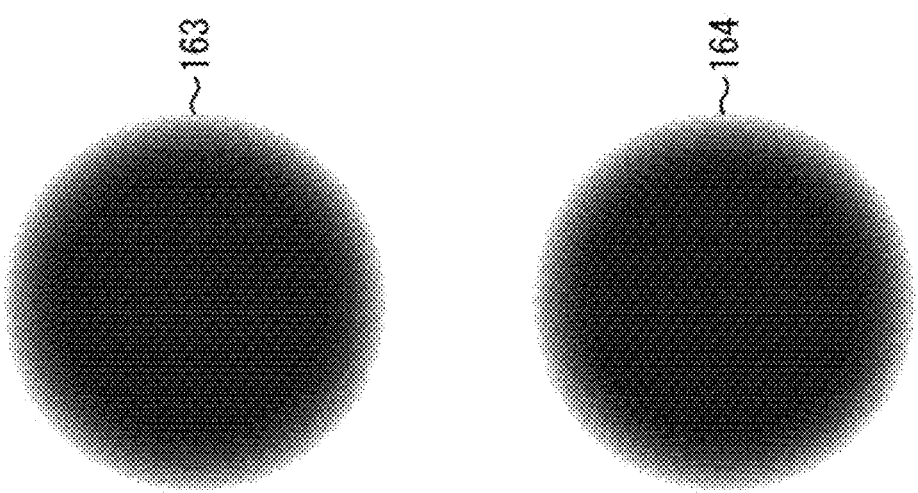
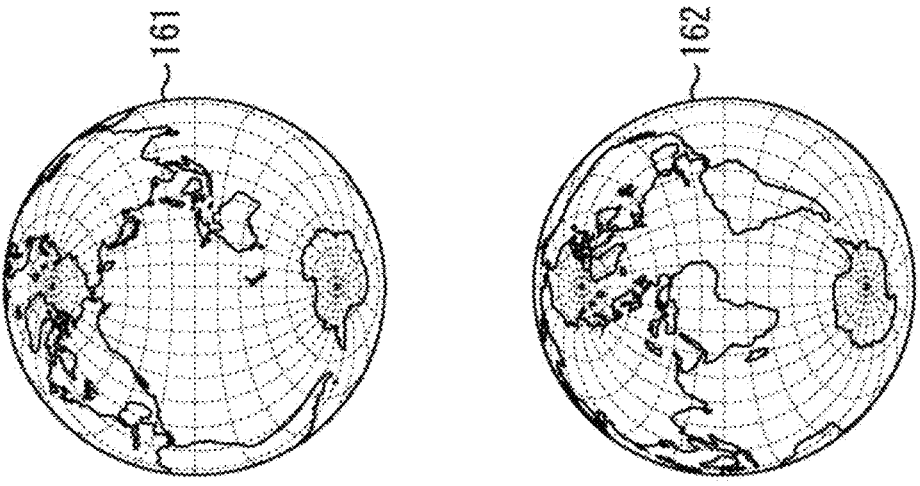
FIG. 9A
FIG. 9B

FIG.35

| FIRST LAYER | | | SECOND LAYER | | | THIRD LAYER | | |
|---|---|---|---|---|---|---|---|---|
| x | y | seg | x | y | seg | x | y | seg |
| 0 | 0 | 1 | 0 | 0 | 1 | 0 | 0 | 2 |
| 0 | 1 | 1 | 0 | 1 | 2 | 0 | 1 | 2 |
| ⋮ | | | | | | | | |
| 1919 | 1079 | 100 | 1919 | 1079 | 98 | 1919 | 1079 | 98 |

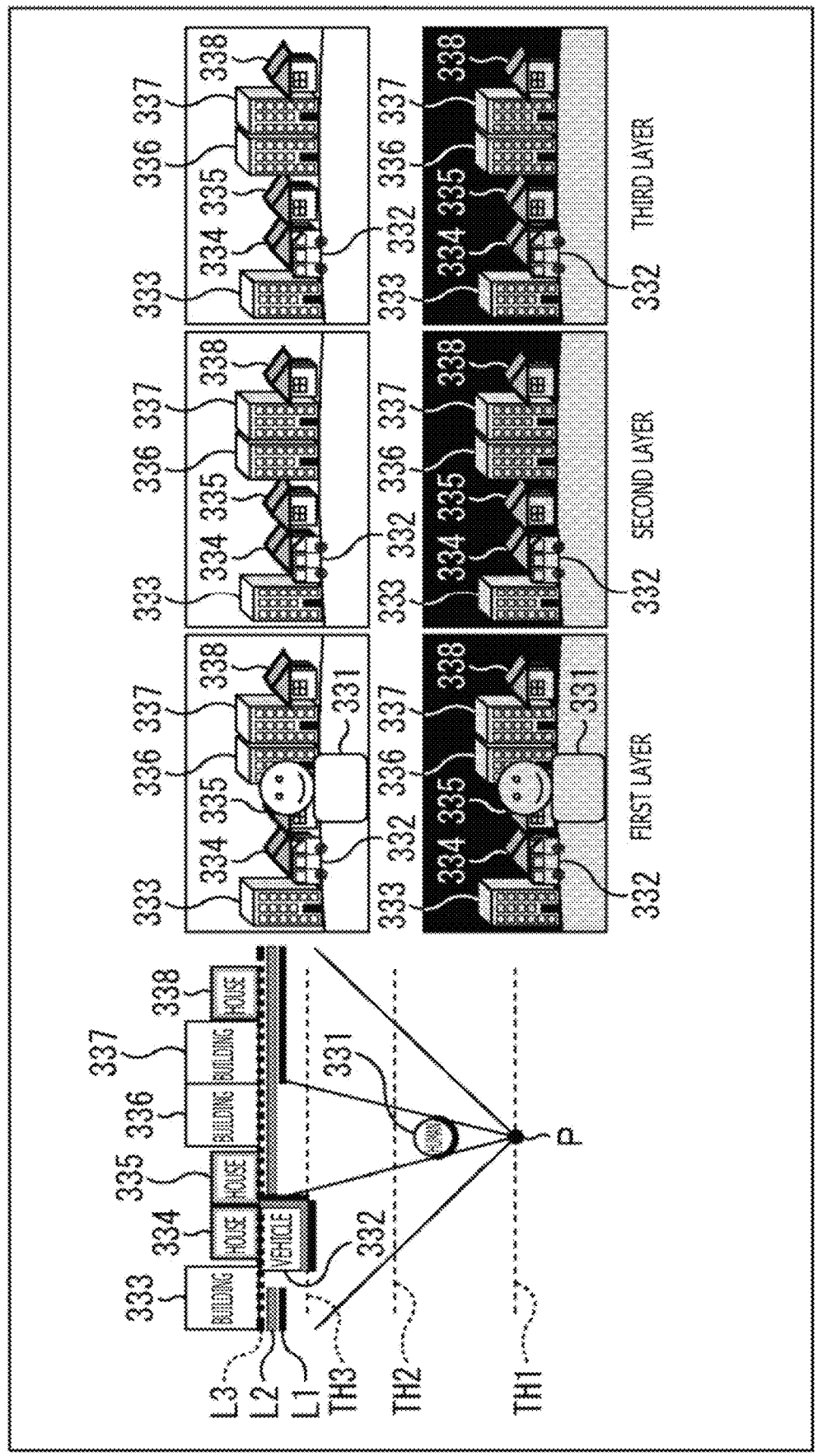

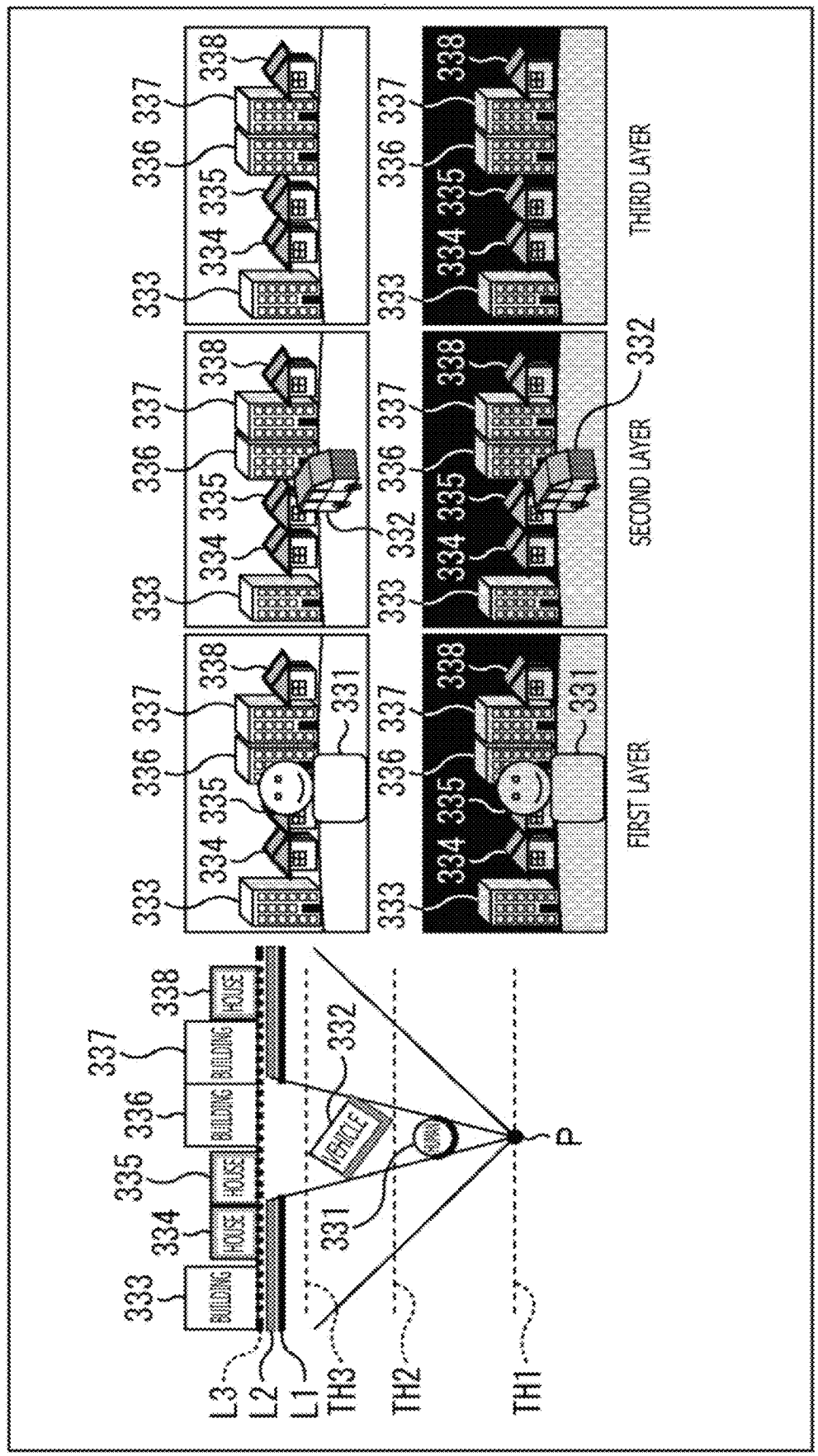

IMAGE PROCESSING DEVICE AND IMAGE PROCESSING METHOD

CROSS REFERENCE TO RELATED APPLICATIONS

This application is a U.S. National Phase of International Patent Application No. PCT/JP2017/028337 filed on Aug. 4, 2017, which claims priority benefit of Japanese Patent Application No. JP 2016-161233 filed in the Japan Patent Office on Aug. 19, 2016. Each of the above-referenced applications is hereby incorporated herein by reference in its entirety.

TECHNICAL FIELD

The present disclosure relates to an image processing device and an image processing method, and more particularly to an image processing device and an image processing method suitable for changing a display mode of an object in live-action content.

BACKGROUND ART

An image processing device which processes computer graphics (CG) content, such as a first person shooter (FPS) game, can easily set, move, rotate, and perform other processing of a visual point (for example, see PTL 1). This type of image processing device can also easily change a display mode, such as display or non-display, of each object within an image.

CITATION LIST

Patent Literature

[PTL 1]
Japanese Patent Laid-open No. 2015-164450

SUMMARY

Technical Problem

Meanwhile, an easy change of a display mode of each object has been demanded not only for CG content, but also for live-action content based on a captured image captured by a camera or the like.

The present disclosure developed in consideration of these circumstances is configured to achieve an easy change of a display mode of each object in live-action content.

Solution to Problem

An image processing device according to one aspect of the present disclosure is an image processing device that includes an image generation section configured to change a display mode of each of objects within a display image on the basis of segment information that indicates a position of a segment in which each of the objects is present, the position of the segment being a position in each of a plurality of layer images that are images generated on the basis of a plurality of captured images and are images classified into a plurality of layers in accordance with distances of the images from a predetermined visual point.

An image processing method according to one aspect of the present disclosure corresponds to the image processing device according to the one aspect of the present disclosure.

According to the one aspect of the present disclosure, a display mode of each of objects within a display image is changed on the basis of segment information that indicates a position of a segment in which each of the objects is present, the position of the segment being a position in each of a plurality of layer images that are images generated on the basis of a plurality of captured images and are images classified into a plurality of layers in accordance with distances of the images from a predetermined visual point.

Note that the image processing device according to the one aspect of the present disclosure can be implemented under programs executed by a computer.

In addition, the programs executed by the computer for implementing the image processing device of the one aspect of the present disclosure can be provided by transmitting the programs via a transmission medium, or recording the programs in a recording medium.

Advantageous Effects of Invention

According to an aspect of the present disclosure, a display image can be generated. According to an aspect of the present disclosure, a display mode of each object in live-action content can be easily changed.

Note that effects to be produced are not limited to the effects described herein, but may be any effects described in the present disclosure.

BRIEF DESCRIPTION OF DRAWINGS

FIGS. 4A and 4B are diagrams explaining a texture image generated by perspective projection of a front surface of each polygon, and a depth image corresponding to the texture image.

FIG. 7 is a diagram explaining a texture image generated by perspective projection of a rear surface of a sphere, and a depth image corresponding to the texture image.

FIGS. 9A and 9B are diagrams explaining a texture image generated by perspective projection of a rear surface of each polygon, and a depth image corresponding to the texture image.

FIG. 35 is a diagram depicting a specific example of a segmentation table.

FIG. 41 is a diagram explaining a method for calculating a moving speed of an object.

FIG. 42 is a diagram explaining the method for calculating a moving speed of an object.

DESCRIPTION OF EMBODIMENTS

Modes for carrying out the present disclosure (hereinafter referred to as embodiments) will be hereinafter described. Note that the description will be given in a following order.

1. First Embodiment: Generation Device and Display Device (FIGS. 1, 2, 3A, 3B, 3C, 4A, 4B, 5, 6, 7, 8A, 8B, 8C, 9A, 9B, 10A, 10B, 11, 12, 13, 14, and 15)

2. Second Embodiment: Generation Device and Display Device (FIGS. 16 to 30)

3. Third Embodiment: Display Device (FIGS. 31 to 39)

4. Modified Examples (FIGS. 40A, 40B, 41, and 42)

Figure 43:
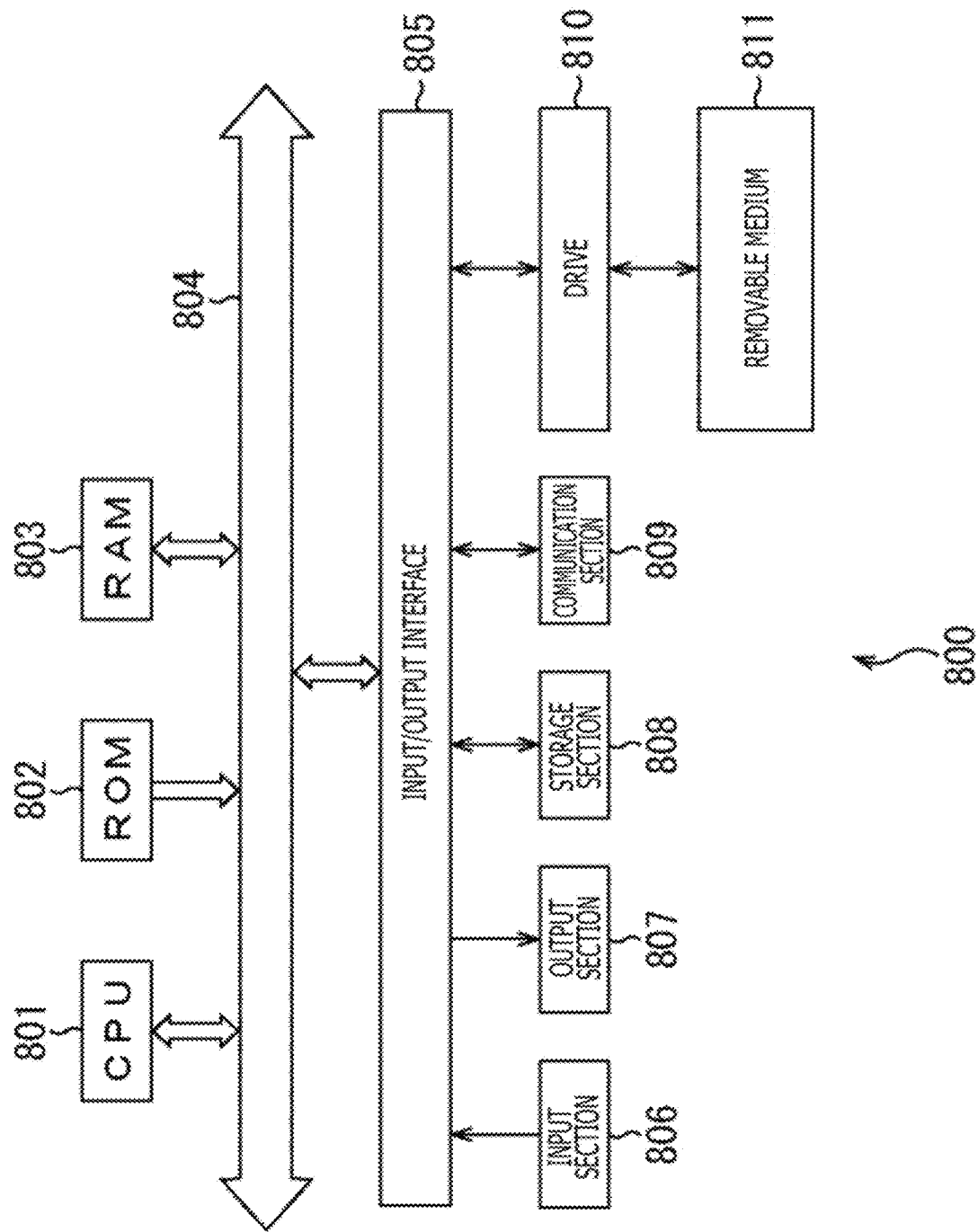
FIG. 43 is a block diagram depicting a configuration example of hardware of a computer.
Figure 44:
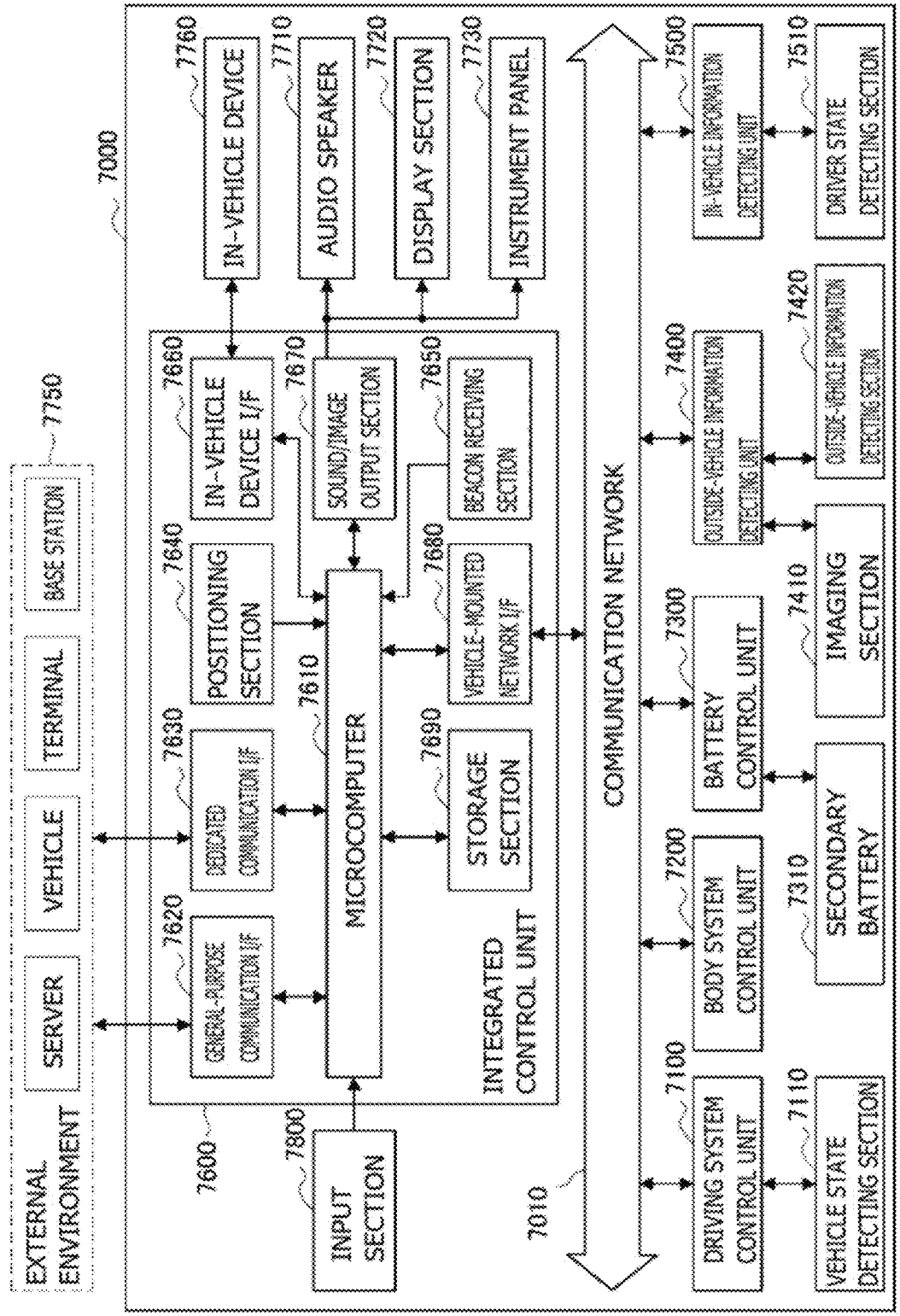
FIG. 44 is a block diagram depicting an example of schematic configuration of a vehicle control system.
Figure 45:
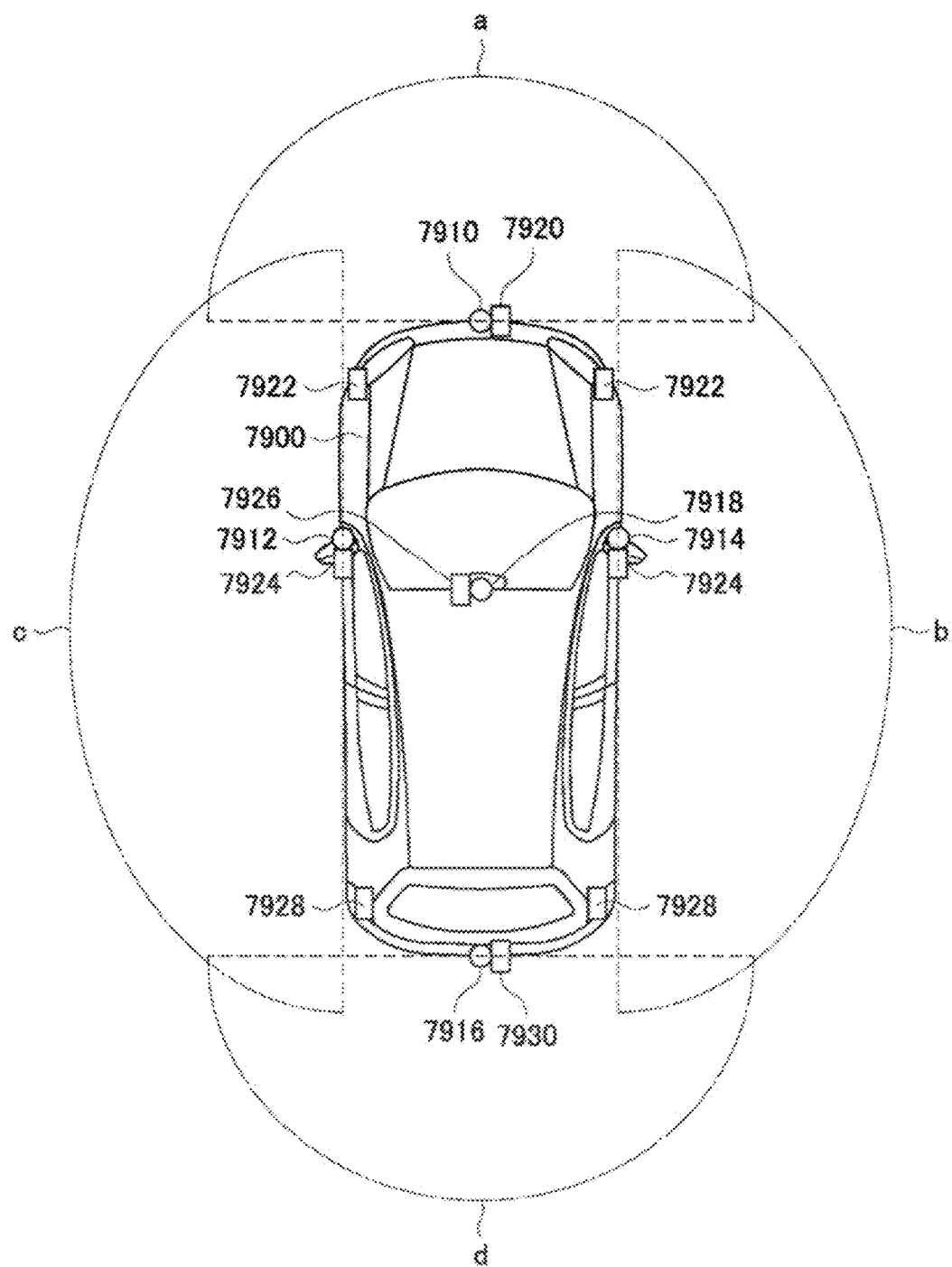
FIG. 45 is a diagram of assistance in explaining an example of installation positions of an outside-vehicle information detecting section and an imaging section.

5. Application Examples (FIGS. 43 to 45)

First Embodiment (Configuration Example of Generation Device)

Figure 1:
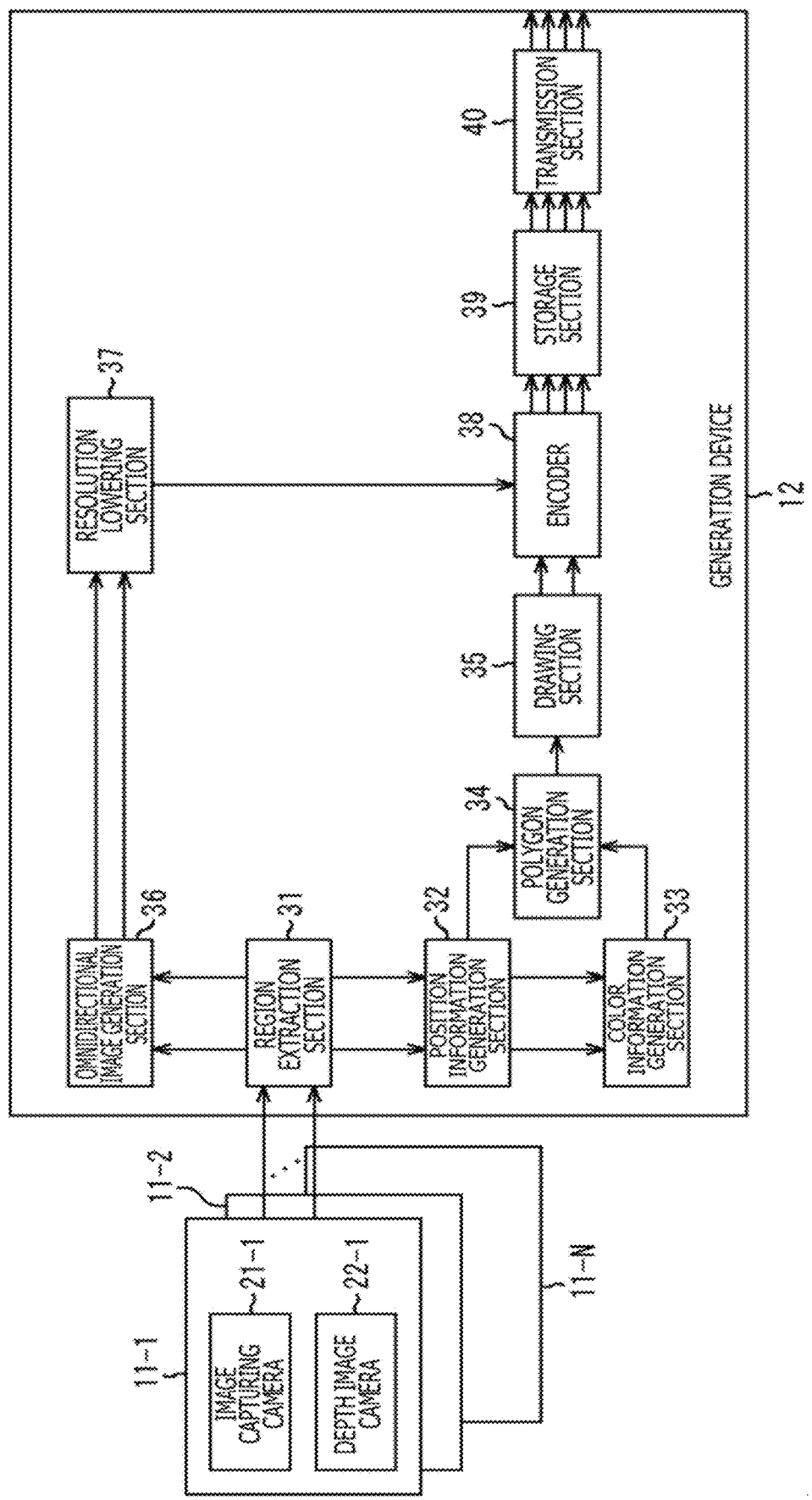
FIG. 1 is a block diagram depicting a configuration example of a generation device according to a first embodiment as an image processing device to which the present disclosure has been applied.

FIG. 1 is a block diagram depicting a configuration example of a generation device according to a first embodiment as an image processing device to which the present disclosure has been applied.

A generation device 12 in FIG. 1 generates texture image and depth image of a main object of imaging within a captured image, and texture image and depth image of an omnidirectional image by using captured images and depth images acquired by imaging devices 11-1 to 11-N (N: 2 or larger).

More specifically, the imaging devices 11-1 to 11-N are disposed around the main object of imaging such that each imaging range of the imaging devices 11-1 to 11-N contains at least a part of the main object of imaging. The imaging devices 11-1 to 11-N include image capturing cameras 21-1 to 21-N, and depth image cameras 22-1 to 22-N, respectively. Each of image capturing cameras 21-1 to 21-N captures an image of an object of imaging to acquire a captured image in units of frame, and supplies the captured image to the generation device 12. Each of the depth image cameras 22-1 to 22-N acquires a position of an object of imaging in a depth direction in each of pixels in a captured image in units of frame to generate a depth image which has a pixel value as information indicating the position, and supplies the generated depth image to the generation device 12.

Note that the imaging devices 11-1 to 11-N are collectively referred to as the imaging devices 11 in cases where distinction between the imaging devices 11-1 to 11-N is not particularly needed. The image capturing cameras 21-1 to 21-N are collectively referred to as the image capturing cameras 21 in cases where distinction between the image capturing cameras 21-1 to 21-N is not particularly needed. The depth image cameras 22-1 to 22-N are collectively referred to as the depth image cameras 22 in cases where distinction between the depth image cameras 22-1 to 22-N is not particularly needed.

The generation device 12 includes a region extraction section 31, a position information generation section 32, a color information generation section 33, a polygon generation section 34, a drawing section 35, an omnidirectional image generation section 36, a resolution lowering section 37, an encoder 38, a storage section 39, and a transmission section 40.

The region extraction section 31 of the generation device 12 extracts a region of a main object of imaging from N captured images and depth images supplied from the N imaging devices 11, and supplies the extracted region to the position information generation section 32. The region extraction section 31 also extracts a region other than the region of the main object of imaging as a background region from N captured images and depth images, and supplies the extracted background region to the omnidirectional image generation section 36.

The position information generation section 32 generates position information associated with one or more polygons corresponding to the main object of imaging by using the N depth images in the region of the main object of imaging supplied from the region extraction section 31. The position information associated with a polygon indicates three-dimensional coordinates of respective vertexes of the polygon in a 3D model coordinate system which is a three-dimensional coordinate system having an origin located at the center of the main object of imaging. The position information generation section 32 supplies position information associated with respective polygons to the color information generation section 33 and the polygon generation section 34. The position information generation section 32 further supplies N captured images in the region of the main object of imaging to the color information generation section 33.

The color information generation section 33 generates color information, such as RGB values, associated with front surface and rear surface of respective polygons by using position information associated with the respective polygons and N captured images in the region of the main object of imaging, both information supplied from the position information generation section 32. More specifically, the color information generation section 33 generates color information associated with front surfaces of respective polygons by using pixel values of captured images corresponding to the polygons. The color information generation section 33 also generates color information associated with front surfaces of respective polygons as color information associated with rear surfaces of the corresponding polygons. The color information generation section 33 supplies the color information associated with both the front surfaces of rear surfaces of the respective polygons to the polygon generation section 34.

Note that color information associated with a front surface of a polygon is expressed by color information described in correspondence with three-dimensional coordinates of respective vertexes of the polygon as coordinates described clockwise around an axis corresponding to a normal vector of the front surface in a 3D model coordinate system. The color information associated with a rear surface of a polygon is expressed similarly to the color information associated with the front surface.

The polygon generation section 34 generates respective polygons on the basis of position information associated with the respective polygons and supplied from the position information generation section 32, and affixes textures to the front surfaces and rear surfaces of the respective polygons on the basis of color information associated with the front surfaces and rear surfaces of the respective polygons and supplied from the color information generation section 33. The polygon generation section 34 supplies, to the drawing section 35, the respective polygons to the front surfaces and rear surfaces of which the textures have been affixed.

The drawing section 35 (image generation section) generates texture images of two visual points by perspective projection of rear surfaces of respective polygons on a perspective projection surface for each of two visual points determined beforehand and facing the origin of the 3D model coordinate system at the center of each of one or more polygons in the main object of imaging. More specifically, the drawing section 35 generates, for each of two visual points, texture images of two visual points by perspective projection of rear surfaces of respective polygons on the perspective projection surface at the center of which a straight line in a visual line direction extending from each of the visual points to the origin passes as a normal line. In the present specification, a "facing position" includes not only a facing position, but also a periphery of the facing position within a range for producing technical effects of the present disclosure. Similarly, a "normal line" includes not only a normal line, but also lines each making an approximately right angle with a surface.

Note that a format of texture images is not limited to a particular format. For example, YCbCr420 format may be adopted. The drawing section 35 generates a depth image for each of texture images of two visual points on the basis of polygons. The drawing section 35 supplies texture images and depth images of two visual points to the encoder 38.

The omnidirectional image generation section 36 generates a texture image of an omnidirectional image surrounding through 360 degrees in the horizontal direction and through 180 degrees in the vertical direction by perspective projection of N captured images in a background region supplied from the region extraction section 31 on a regular octahedron whose center is located at the origin of the 3D model coordinate system. Note that the omnidirectional image is not limited to an image of an entire space of a sphere surrounding through 360 degrees in the horizontal direction and through 180 degrees in the vertical direction, but may be an image of a partial space as long as the technical effects of the present disclosure can be produced. Similarly to the captured images, the omnidirectional image generation section 36 generates a depth image corresponding to the omnidirectional image by perspective projection of N depth images in the background region supplied from the region extraction section 31 on the regular octahedron. The omnidirectional image generation section 36 supplies the texture image and depth images of the omnidirectional image to the resolution lowering section 37.

The resolution lowering section 37 lowers resolution of the texture image and depth images of the omnidirectional image supplied from the omnidirectional image generation section 36, and supplies the resultant texture image and depth images to the encoder 38.

The encoder 38 encodes the texture images and depth images of two visual points supplied from the drawing section 35, and encodes the texture image and depth image of the omnidirectional image supplied from the resolution lowering section 37. For example, advanced video coding (AVC) system, high efficiency video coding (HEVC) system, or MVD system may be adopted as an encoding system for this encoding. It is assumed that AVC system is adopted herein.

Accordingly, the encoder 38 generates, by encoding, encoded streams of texture images (hereinafter referred to as visual point texture streams) and encoded streams of depth images (hereinafter referred to as visual point depth streams) of respective visual points. The encoder 38 further generates, by encoding, encoded stream of texture images (hereinafter referred to as omnidirectional texture stream) and encoded stream of depth images (hereinafter referred to as omnidirectional depth stream) of an omnidirectional image having lowered resolution. The encoder 38 supplies visual point texture streams and visual point depth streams of two visual points, and omnidirectional texture stream and omnidirectional depth stream to the storage section 39.

The storage section 39 stores visual point texture streams and visual point depth streams of two visual points, and omnidirectional texture stream and omnidirectional depth stream, each stream supplied from the encoder 38.

The transmission section 40 reads visual point texture streams and visual point depth streams of two visual points, and omnidirectional texture stream and omnidirectional depth stream, each stream stored in the storage section 39, and transmits the read streams.

As described above, the generation device 12 converts polygons and color information expressing a three-dimensional structure of a main object of imaging into texture images and depth images of two visual points. Accordingly, the generation device 12 can encode texture images and depth images of two visual points by using an ordinary image encoding system to reduce a data volume. As a result, reduction of a transmission band of data expressing the three-dimensional structure of the main object of imaging is achievable.

Note that the generation device 12 depicted in FIG. 1 and generating polygons and color information may generate other information such as point cloud as long as the information expresses a three-dimensional structure used in CG technologies.

Moreover, according to the example depicted in FIG. 1, each of the depth image cameras 22 acquires depth images each having the same number of pixels as the number of pixels in the corresponding captured image. However, in a case where each of the depth image cameras 22 acquires depth images each having a number of pixels smaller than the number of pixels in the corresponding captured image, a depth image interpolation section which interpolates pixel values of depth images is provided between the region extraction section 31 and the position information generation section 32. In this case, the depth image interpolation section interpolates the pixel value of each depth image to equalize the number of pixels of the depth image with the number of pixels in the corresponding captured image.

Furthermore, according to the example depicted in FIG. 1, each of the imaging devices 11 acquires depth images. However, depth images may be generated from captured images acquired by the imaging device 11 different from the imaging device 11 corresponding to the depth images.
(Arrangement Example of Imaging Devices)

Figure 2:
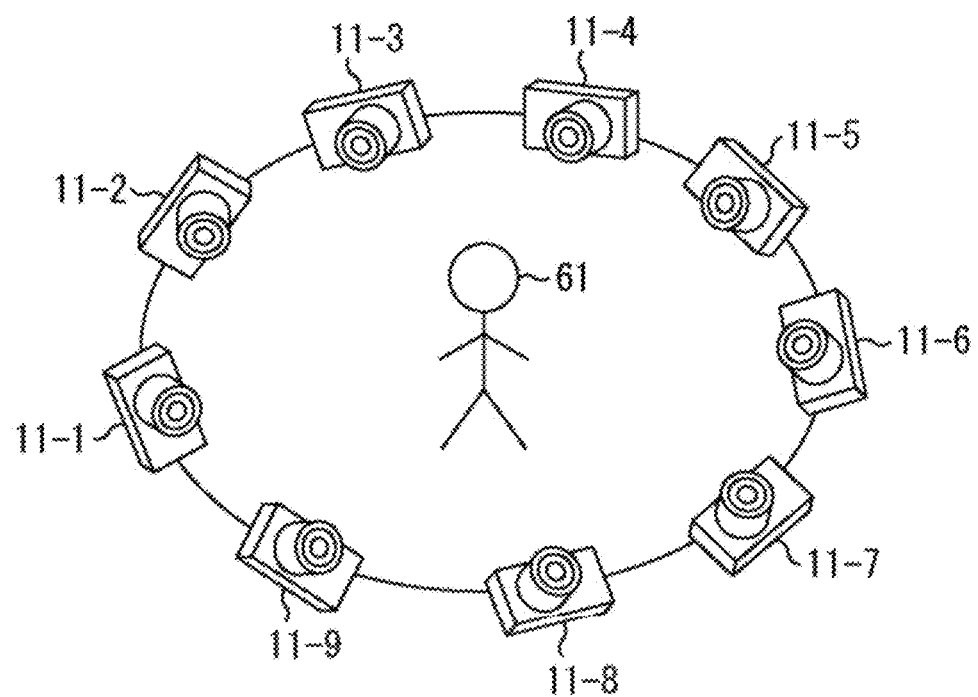
FIG. 2 is a diagram depicting an arrangement example of imaging devices.

FIG. 2 is a diagram depicting an arrangement example of the imaging devices 11 in FIG. 1.

In the example in FIG. 2, N is set to nine.

As depicted in FIG. 2, the nine imaging devices 11-1 to 11-9 are disposed around a main object of imaging 61 in such positions as to surround the main object of imaging 61.
(Description of Effects)

FIGS. 3A, 3B, 3C, 4A, 4B, and 5 are diagrams each explaining a texture image generated by perspective projection of front surfaces of respective polygons on a perspective projection surface, and a depth image corresponding to the texture image for each of two visual points facing the origin of the 3D model coordinate system.

Figure 3C:
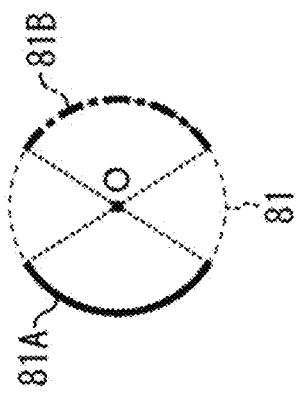
FIGS. 3A, 3B, and 3C are diagrams explaining a texture image generated by perspective projection of a front surface of each polygon, and a depth image corresponding to the texture image.
Figure 3B:
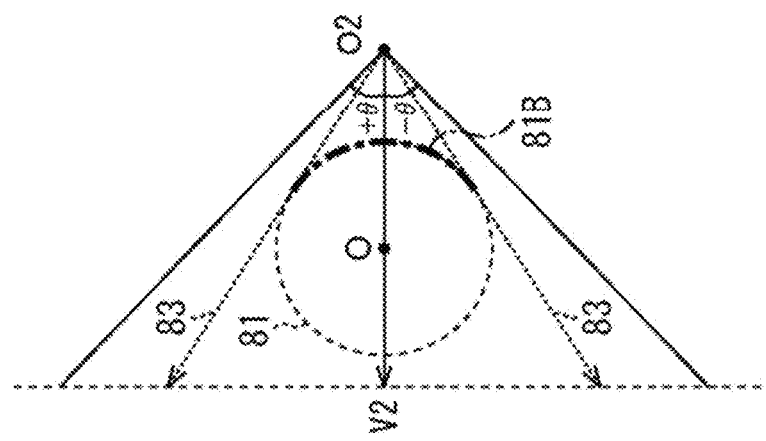
Figure 3A:
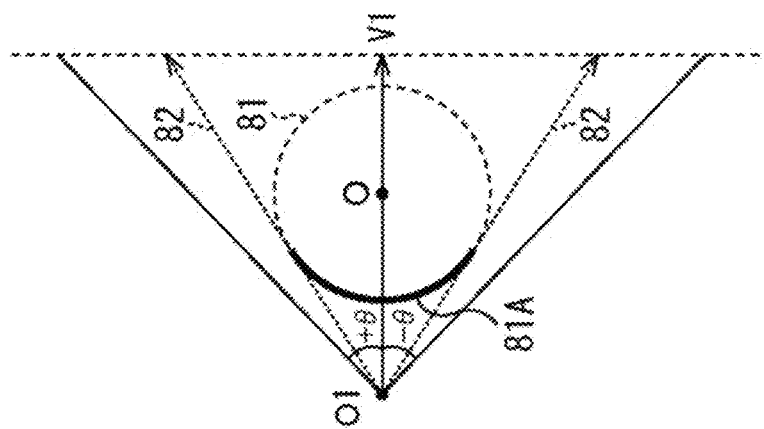

According to the example depicted in FIGS. 3A, 3B, 3C, 4A, 4B, and 5, polygons of the main object of imaging constitute a sphere 81. In this case, a texture affixed to a region 81A which is located on a front surface of the sphere 81 and crosses respective projection directions 82 first is drawn in a texture image generated by perspective projection of the front surface of the sphere 81 on a perspective projection surface in a visual line direction V1 for one visual point O1 of the two visual points as depicted in FIG. 3A. The projection direction is a direction which extends from a visual point and makes such an angle with the visual line direction that the absolute value of the angle falls within a range of the half of an angle of view (θ in example of FIGS. 3A, 3B, and 3C). In addition, a depth image corresponding to this texture image is an image representing a position of the region 81A in a depth direction (visual line direction V1) for the visual point O1.

Furthermore, a texture affixed to a region 81B which is located on the front surface of the sphere 81 and crosses respective projection directions 83 first is drawn in a texture image generated by perspective projection of the front surface of the sphere 81 on a perspective projection surface in a visual line direction V2 for other visual point O2 of the two visual points as depicted in FIG. 3B. In addition, the depth image corresponding to this texture image is an image representing a position of the region 81B in a depth direction (visual line direction V2) for the visual point O2.

Accordingly, as depicted of FIG. 3C, three-dimensional structures of the two regions 81A and 81B facing each other with respect to the center of the sphere 81 can be expressed by using the texture image and depth image of the visual point O1, and the texture image and depth image of the visual point O2. However, regions other than the regions 81A and 81B are present on the front surface of the sphere. In other words, the front surface of the sphere 81 has regions whose three-dimensional structures are difficult to express by using the texture image and depth image of the visual point O1 and the texture image and depth image of the visual point O2.

For example, in a case where a world map is affixed to the front surface and rear surface of the sphere 81 as a texture with the visual point O1 located in the sky above the Atlantic Ocean off the coast of Africa, the African Continent and a part of the South American Continent affixed to the front surface of the region 81A as a texture are drawn in a texture image 101 of the visual point O1 as depicted in a left part of FIG. 4A.

Moreover, in this case, the visual point O2 is located in the sky above the Pacific Ocean. A part of the Australian Continent affixed to the front surface of the region 81B as a texture is drawn in a texture image 102 of the visual point O2 as depicted in a left part of FIG. 4B. However, the Antarctic Continent and others are not drawn in either the texture image 101 or the texture image 102.

In addition, as depicted in a right part of FIG. 4A and a right part of FIG. 4B, a depth image 111 corresponding to the texture image 101 and a depth image 112 corresponding to the texture image 102 are identical. Note that a pixel value (luminance value) of a depth image decreases as the distance of the position of the corresponding pixel increases in the depth direction of the object of imaging. Accordingly, the pixel value at the center becomes the largest in each of the depth image 111 and the depth image 112, and decreases as the distance from the center increases.

Figure 5:
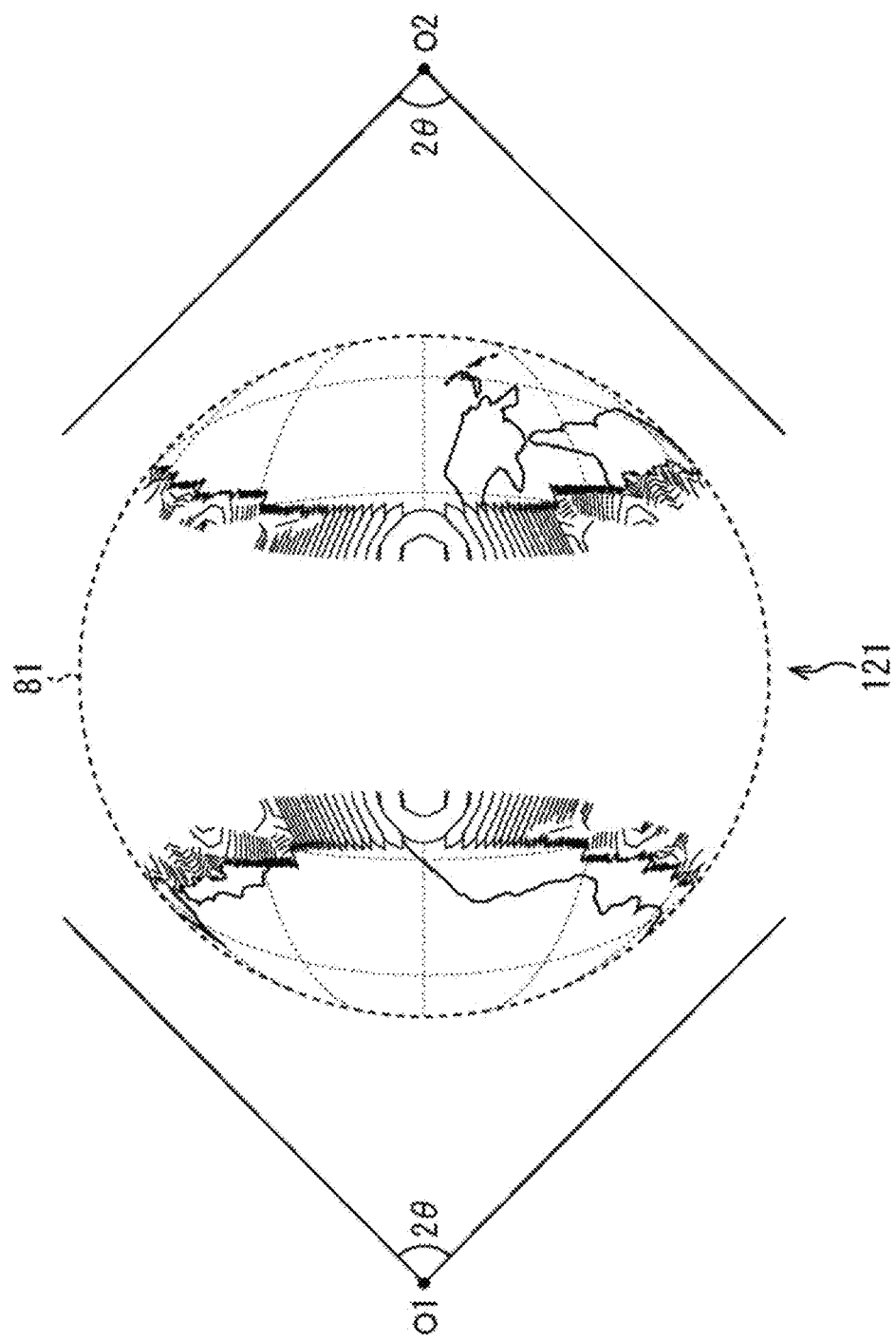
FIG. 5 is a diagram explaining a texture image generated by perspective projection of a front surface of each polygon, and a depth image corresponding to the texture image.

As described above, the Antarctic Ocean and others are not drawn in either the texture image 101 or the texture image 102. Accordingly, as depicted in FIG. 5, A three-dimensional structure 121 reconstructed by using the texture image 101 and the depth image 111, and the texture image 102 and the depth image 112 constitutes only a part of the sphere 81 to the front surface and the rear surface of which the world map has been affixed as a texture.

According to the example depicted in FIGS. 3A, 3B, 3C, 4A, 4B, and 5, each polygon of the sphere 81 has a relatively simple shape. However, in a case where each polygon has a complicated shape, there may be more polygon regions whose three-dimensional structures are difficult to express by texture images of two visual points.

Figure 6:
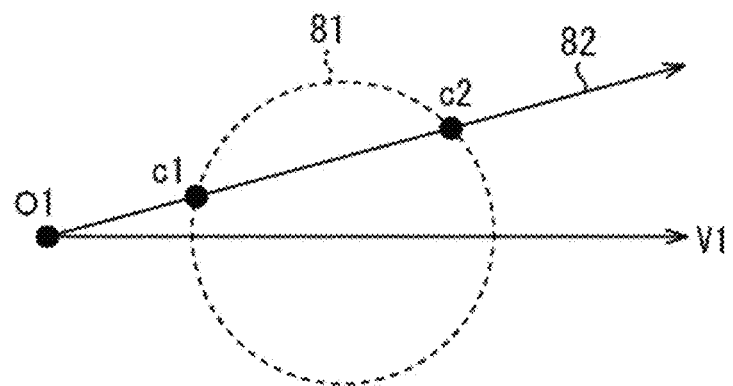
FIG. 6 is a diagram explaining a texture image generated by perspective projection of a rear surface of a sphere, and a depth image corresponding to the texture image.

FIGS. 6 and 7 are diagrams each explaining a texture image generated by perspective projection of the rear surface of the sphere 81 on the perspective projection surface in the visual line direction V1 for the visual point O1, and a depth image corresponding to this texture image.

As described above, in a case where a texture image is generated by perspective projection of the front surface of the sphere 81 on the perspective projection surface in the visual line direction V1 for the visual point O1, a texture affixed to a corresponding point c1 which is located on the front surface of the sphere 81 and crosses the corresponding projection direction 82 first is drawn in the texture image as depicted in FIG. 6. In addition, a depth image corresponding to this texture image is an image representing a position of the corresponding point c1 in the depth direction (visual line direction V1) for the visual point O1.

On the other hand, in a case where a texture image is generated by perspective projection of the front surface of the sphere 81 on the perspective projection surface in the visual line direction V1 for the visual point O1, a texture affixed to a corresponding point c2 which is located on the rear surface of the sphere 81 and crosses the corresponding projection direction 82 first is drawn in the texture image as depicted in FIG. 6. In addition, a depth image corresponding to this texture image is an image representing a position of the corresponding point c2 in the depth direction (visual line direction V1) for the visual point O2.

For example, in a case where a world map is affixed to the front surface and rear surface of the sphere 81 as a texture with the visual point O1 located in the sky above the Atlantic Ocean off the coast of Africa, the North American Continent, a part of the South American Continent, the Antarctic Continent, a part of the European Continent, the Asian Continent, and the Australian Continent affixed to the rear surfaces at the respective points c2 as textures are drawn in a texture image 131 of the visual point O1 as depicted in FIG. 7. In addition, a pixel value at the center in a depth image 132 corresponding to the texture image 131 becomes the smallest, and decreases as the distance from the center increases.

FIGS. 8A, 8B, 8C, 9A, 9B, 10A, and 10B are diagrams each explaining texture images generated by perspective projection of rear surfaces of respective polygons on a perspective projection surface, and depth images corresponding to the texture images for each of two visual points facing the origin of the 3D model coordinate system.

Figure 8C:
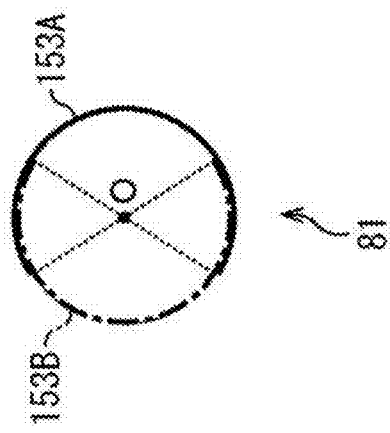
FIGS. 8A, 8B, and 8C are diagrams explaining a texture image generated by perspective projection of a rear surface of each polygon, and a depth image corresponding to the texture image.
Figure 8B:
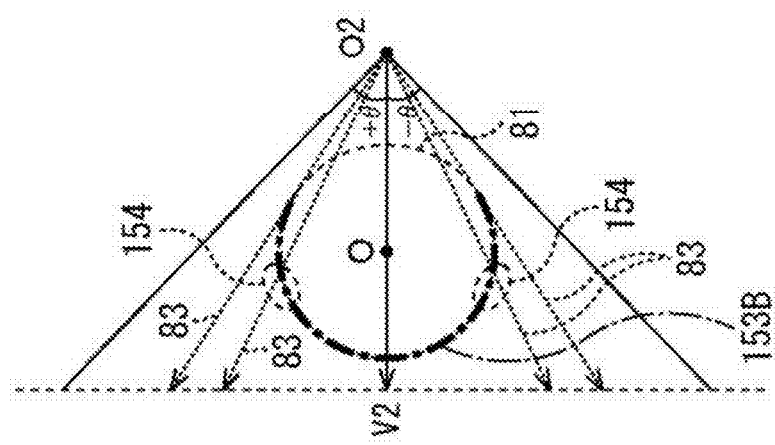
Figure 8A:
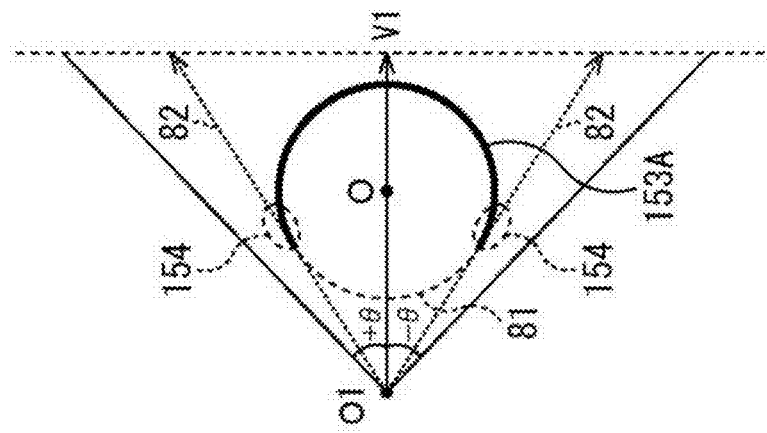

According to the examples depicted in FIGS. 8A, 8B, 8C, 9A, 9B, 10A, and 10B, the polygon of the main object of imaging corresponds to the sphere 81. In this case, a texture affixed to a region 153A which is located on the rear surface of the sphere 81 and crosses the respective projection directions 82 first is drawn in a texture image generated by perspective projection of the rear surface of the sphere 81 on the perspective projection surface in the visual line direction V1 for the visual point O1 as depicted in FIG. 8A. In addition, a depth image corresponding to this texture image is an image representing a position of the region 81A in the depth direction (visual line direction V1) for the visual point O1.

Furthermore, a texture affixed to a region 153B which is located on the rear surface of the sphere 81 and crosses the respective projection directions 83 first is drawn in a texture image generated by perspective projection of the rear surface of the sphere 81 on the perspective projection surface in the visual line direction V2 for the other visual point O2 of the two visual points as depicted in FIG. 8B. In addition, the depth image corresponding to this texture image is an image representing a position of the region 81B in the depth direction (visual line direction V2) for the visual point O2.

Accordingly, as depicted in FIG. 8C, three-dimensional structures of the two regions 153A and 153B facing each other with respect to the center of the sphere 81 can be expressed by using the texture image and depth image of the visual point O1, and the texture image and depth image of the visual point O2.

Note that the region 153A and the region 153B overlap with each other as depicted in FIG. 8C. Accordingly, a three-dimensional structure of the entire sphere 81 can be expressed by using the texture image and depth image of the visual point O1, and the texture image and depth image of the visual point O2.

For example, in a case where a world map is affixed to the front surface and a surface of the sphere 81 as a texture with the visual point O1 located in the sky above the Atlantic Ocean off the coast of Africa, the North American Continent, a part of the South American Continent, the Antarctic Continent, a part of the European Continent, the Asian Continent, and the Australian Continent affixed to the rear surface of the region 153A as textures are drawn in a texture image 161 of the visual point O1 as depicted in a left part of FIG. 9A.

Moreover, in this case, the visual point O2 is located in the sky above the Pacific Ocean. The African Continent, the North American Continent, the South American Continent, the Antarctic Continent, and a part of the European Continent affixed to the rear surface of the region 153B as textures are drawn in a texture image 162 of the visual point O2 as depicted in a left part of FIG. 9B. Accordingly, all of the seven continents are drawn at least either the texture image 161 or the texture image 162.

In addition, as depicted in a right part of A of FIG. 9A and a right part of FIG. 9B, a depth image 163 corresponding to the texture image 161 and a depth image 164 corresponding to the texture image 162 are identical. The pixel value at the center in each of the depth image 163 and the depth image 164 becomes the smallest, and increases as the distance from the center increases.

Figure 10B:
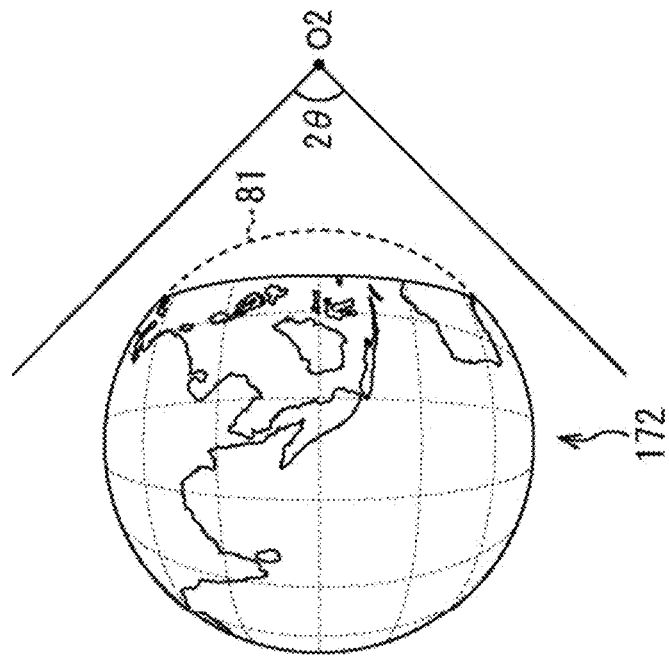
FIGS. 10A and 10B are diagrams explaining a texture image generated by perspective projection of a rear surface of each polygon, and a depth image corresponding to the texture image.
Figure 10A:
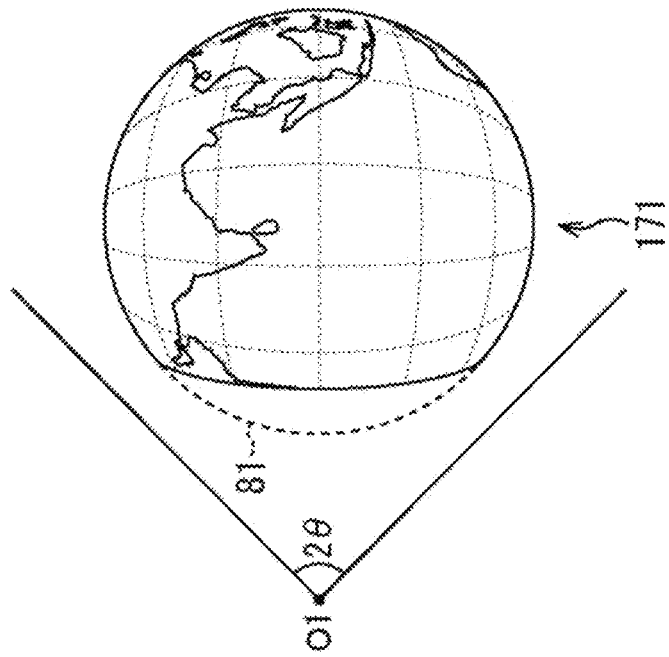

As described above, all of the seven continents are drawn at least either the texture image 161 or the texture image 162. Accordingly, as depicted in FIG. 10A, a three-dimensional structure 171 reconstructed by using the texture image 161 and the depth image 163 corresponds to a part larger than the half of the sphere 81 on the visual point O2 side (right half in the figure). In addition, as depicted in FIG. 10B, a three-dimensional structure 172 reconstructed by using the texture image 162 and the depth image 164 corresponds to a part larger than the half of the sphere 81 on the visual point O1 side (left half in the figure). Accordingly, the entire sphere 81 can be generated by reconstructing three-dimensional structures using the texture image 161 and depth image 163, and the texture image 162 and depth image 164.

Note that an overlapping region between the region 153A and the region 153B is generated by using either the texture image 161 and depth image 163, or the texture image 162 and depth image 164.

For example, as depicted in FIG. 8A, each of regions 154 at ends of the region 153A in the overlapping region between the region 153A and the region 153B makes a small angle with the projection direction 82 in a case of perspective projection for the visual point O1. Accordingly, three-dimensional structures of the regions 154 are difficult to express with high accuracy by using the texture image 161 and the depth image 163.

However, in a case of perspective projection for the visual point O2, each of the regions 154 makes a larger angle with the projection direction 83 than that angle made in case of perspective projection for the visual point O1 as depicted in FIG. 8B. Accordingly, the three-dimensional structure of each of the regions 154 can be expressed with higher accuracy by using the texture image 162 and the depth image 164 than that accuracy achieved by using the texture image 161 and the depth image 163. The regions 154 are therefore generated by using the texture image 162 and the depth image 164.

As described above, accuracy of reconstruction of the sphere 81 can be raised by generating the overlapping region between the region 153A and the region 153B using either the texture image 161 and the depth image 163, or the texture image 162 and the depth image 164, i.e., the images making a larger angle with the overlapping region.

(Description of Process by Generation Device)

Figure 11:
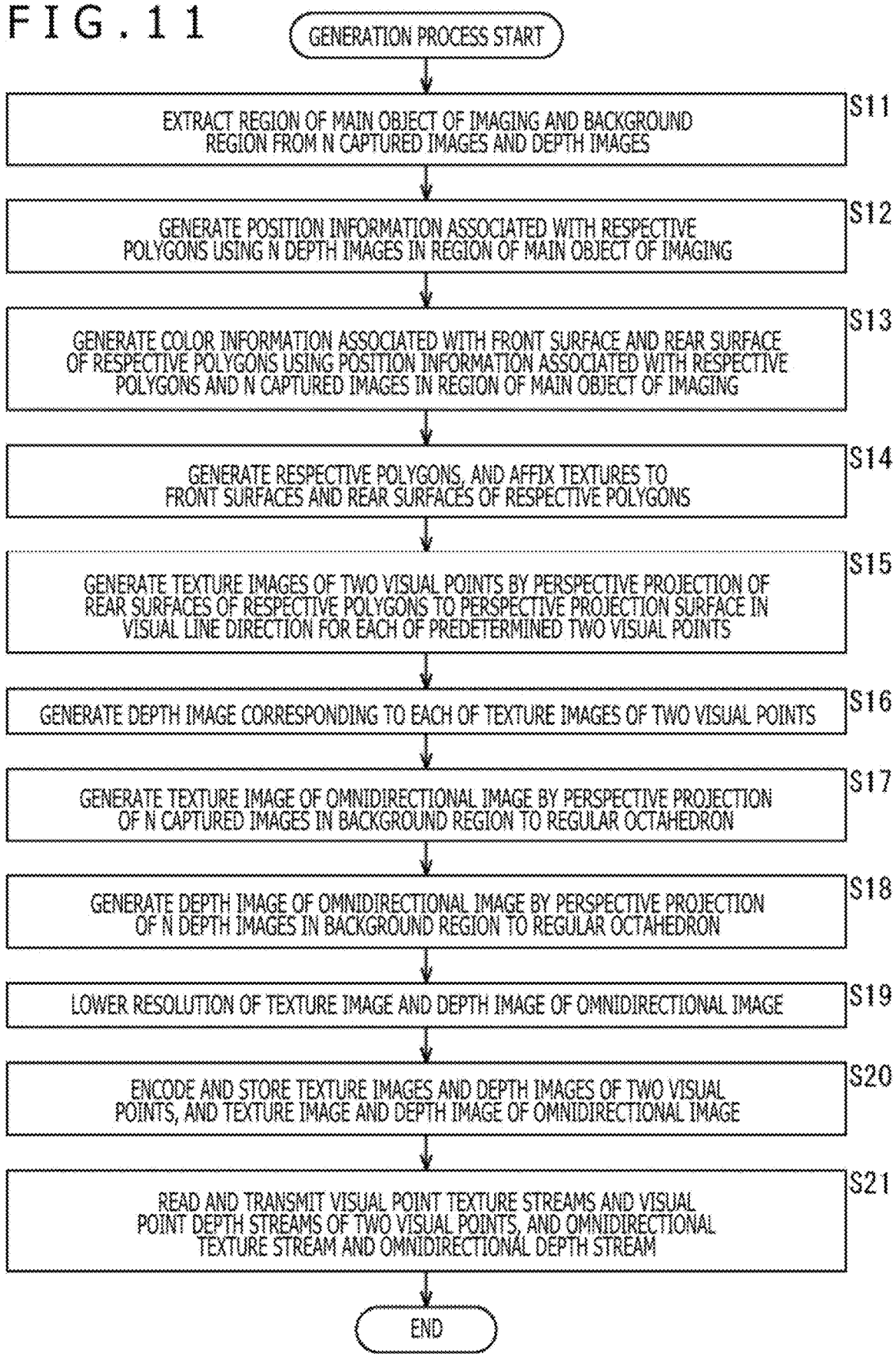
FIG. 11 is a flowchart explaining a generation process performed by the generation device in FIG. 1.

FIG. 11 is a flowchart explaining a generation process performed by the generation device 12 in FIG. 1. This generation process is performed for each frame of N captured images and depth images acquired by the N imaging devices 11.

In step S11 in FIG. 11, the region extraction section 31 of the generation device 12 extracts a region of a main object of imaging and a background region from N captured images and depth images supplied from the imaging devices 11. The region extraction section 31 supplies the N captured images and depth images of the region of the main object of imaging to the position information generation section 32, and the N captured images and depth images of the background region to the omnidirectional image generation section 36.

In step S12, the position information generation section 32 generates position information associated with respective polygons of the main object of imaging by using the N depth images of the region of the main object of imaging supplied from the region extraction section 31, and supplies the generated position information to the color information generation section 33 and the drawing section 35. The position information generation section 32 further supplies the N captured images of the region of the main object of imaging to the color information generation section 33.

In step S13, the color information generation section 33 generates color information associated with front surface and rear surface of the respective polygons by using the position information associated with the respective polygons and the N captured images of the region of the main object of imaging, both supplied from the position information generation section 32. The color information generation section 33 supplies the color information associated with the front surfaces and rear surfaces of the respective polygons to the drawing section 35.

In step S14, the drawing section 35 generates the respective polygons on the basis of the position information associated with the respective polygons and supplied from the position information generation section 32, and affixes textures to the front surfaces and rear surfaces of the respective polygons on the basis of the color information associated with the front surfaces and rear surfaces of the respective polygons and supplied from the color information generation section 33.

In step S15, the drawing section 35 generates texture images of two visual points by perspective projection of the rear surfaces of the respective polygons on a perspective projection surface in a visual line direction for each of predetermined two visual points. The drawing section 35 supplies the texture images of two visual points to the encoder 38.

In step S16, the drawing section 35 generates depth images corresponding to respective texture images of two visual points on the basis of the polygons, and supplies the generated depth images to the encoder 38.

In step S17, the omnidirectional image generation section 36 generates a texture image of an omnidirectional image by perspective projection of N captured images of a background region supplied from the region extraction section 31 on a regular octahedron whose center is located at the origin of the 3D model coordinate system. The omnidirectional image generation section 36 supplies the generated texture image to the resolution lowering section 37.

In step S18, the omnidirectional image generation section 36 generates a depth image of the omnidirectional image by perspective projection of N depth images of the background region supplied from the region extraction section 31 on the regular octahedron similarly to the captured images. The omnidirectional image generation section 36 supplies the generated depth image to the resolution lowering section 37.

In step S19, the resolution lowering section 37 lowers resolution of the texture image and depth image of the omnidirectional image supplied from the omnidirectional image generation section 36, and supplies the resultant texture image and depth image to the encoder 38.

In step S20, the encoder 38 encodes the texture images and depth images of two visual points supplied from the drawing section 35, and the texture image and depth image of the omnidirectional image supplied from the resolution lowering section 37. The encoder 38 supplies visual point texture streams and visual point depth streams of two visual points, and omnidirectional texture stream and omnidirectional depth stream thus generated to the storage section 39, and causes the storage section 39 to store the respective streams.

In step S21, the transmission section 40 reads the visual point texture streams and visual point depth streams of two visual points, and the omnidirectional texture stream and omnidirectional depth stream stored in the storage section 39, and transmits the read streams. Thereafter, the process ends.

As described above, the generation device 12 generates texture images and depth images of two visual points by perspective projection of rear surfaces of polygons on a perspective projection surface in a visual line direction for each of two visual points facing the origin of the 3D model coordinate system. Accordingly, the generated texture images and depth images of two visual points can express a three-dimensional structure including polygons in more regions of a main object of imaging than those regions in case of perspective projection of front surfaces of polygons.

(Configuration Example of Display Device)

Figure 12:
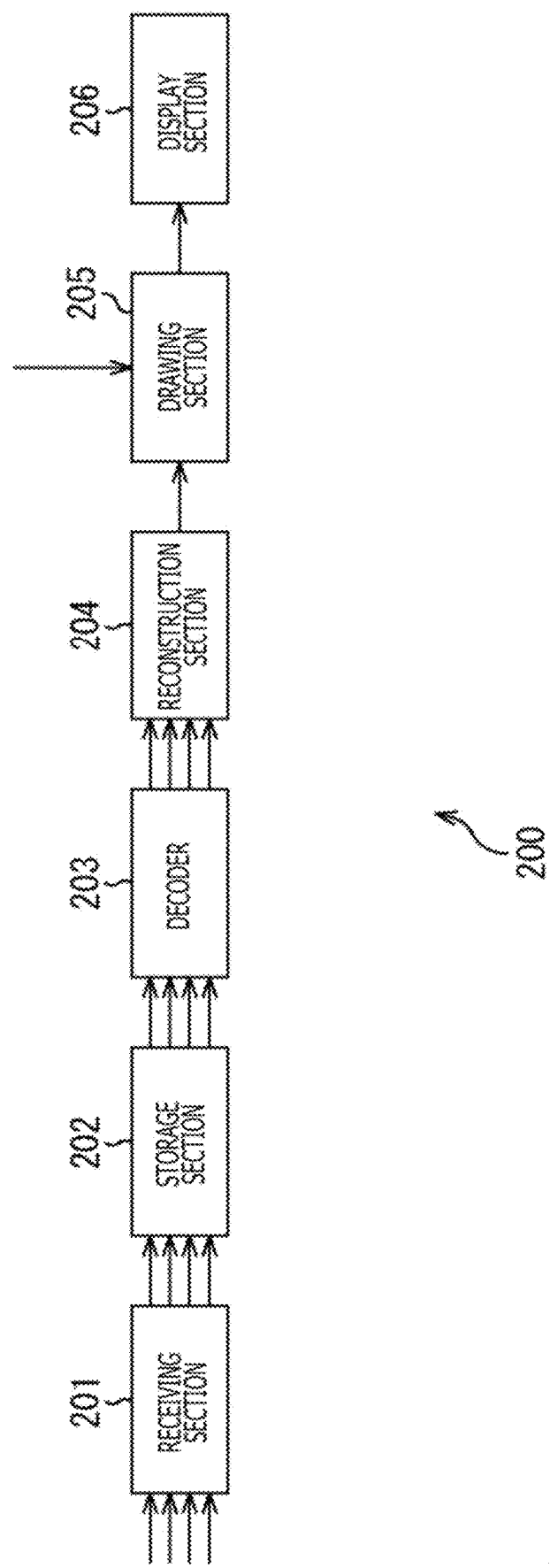
FIG. 12 is a block diagram depicting a configuration example of a display device according to the first embodiment as an image processing device to which the present disclosure has been applied.

FIG. 12 is a block diagram depicting a configuration example of a display device according to the first embodiment as an image processing device to which the present disclosure has been applied.

A display device 200 in FIG. 12 receives visual point texture streams and visual point depth streams of two visual points, and omnidirectional texture stream and omnidirectional depth stream, each of the streams transmitted from the generation device 12 in FIG. 1, and generates texture images of predetermined visual points.

More specifically, the display device 200 includes a receiving section 201, a storage section 202, a decoder 203, a reconstruction section 204, a drawing section 205, and a display section 206.

The receiving section 201 of the display device 200 receives visual point texture streams and visual point depth streams of two visual points, and omnidirectional texture stream and omnidirectional depth stream, each of the streams transmitted from the generation device 12, and supplies the received streams to the storage section 202.

The storage section 202 stores the visual point texture streams and visual point depth streams of two visual points, and the omnidirectional texture stream and omnidirectional depth stream, each of the streams supplied from the receiving section 201.

The decoder 203 reads the visual point texture streams and visual point depth streams of two visual points, and the omnidirectional texture stream and omnidirectional depth stream from the storage section 202, and decodes the read streams. The decoder 203 supplies texture images and depth images of two visual points, and texture image and depth image of an omnidirectional image acquired by decoding to the reconstruction section 204.

The reconstruction section 204 reconstructs a three-dimensional structure of the main object of imaging in the 3D model coordinate system by using the texture images and depth images of two visual points supplied from the decoder 203. As described above, texture images and depth images of two visual points generated by the generation device 12 can express a three-dimensional structure including polygons of a main object of imaging in more regions than those regions in case of perspective projection of front surfaces of polygons. Accordingly, the three-dimensional structure of the main object of imaging is reconstructed by using decoded texture images and depth images of two visual points in more regions than those regions in case of perspective projection of front surfaces of polygons using texture images and depth images of two visual points.

The reconstruction section 204 further reconstructs a three-dimensional structure of the background region in the 3D model coordinate system by using the texture image and depth image of the omnidirectional image supplied from the decoder 203. The reconstruction section 204 supplies position information and color information associated with the three-dimensional structures of the main object of imaging and the background region to the drawing section 205.

The drawing section 205 (image generation section) generates, as display images, texture images of visual points, visual line directions, and angles of view designated by a listener/viewer or the like in the 3D model coordinate system on the basis of the position information and color information associated with the three-dimensional structures of the main object of imaging and the background region and supplied from the reconstruction section 204. The drawing section 205 supplies the generated display images to the display section 206.

The display section 206 displays the display images supplied from the drawing section 205. In this manner, the listener/viewer can view the main object of imaging from any positions around the main object of imaging, for example.

(Description of First Reconstruction Method)

Figure 13:
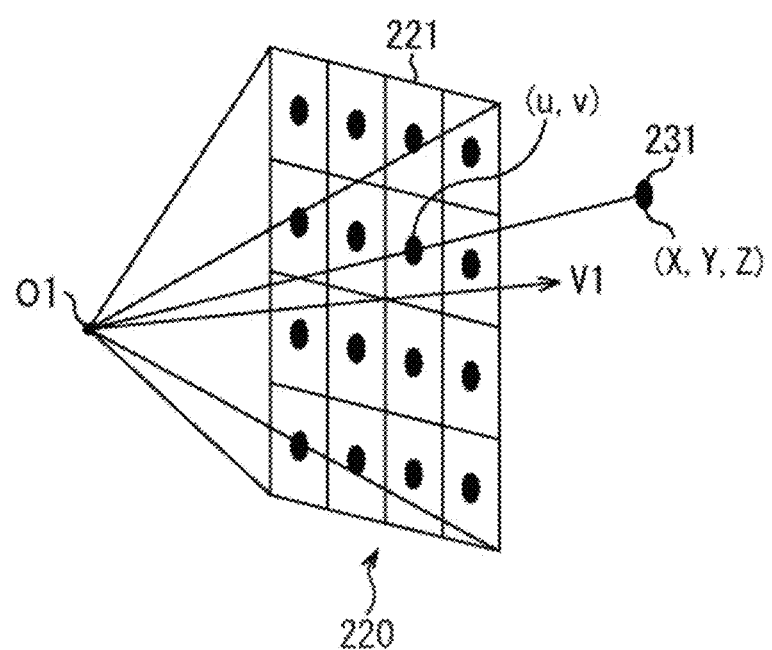
FIG. 13 is a diagram explaining a first reconstruction method.

FIG. 13 is a diagram explaining a first reconstruction method.

Note that texture images and depth images of two visual points are assumed to have resolution of horizontal 4 pixels× vertical 4 pixels in the example of FIG. 13 for convenience of explanation. In addition, described with reference to FIG. 13 is a case where a three-dimensional structure of a main object of imaging is reconstructed using a texture image and a depth image for the one visual point O1 of two visual points.

The first reconstruction method is a method for reconstruction of a three-dimensional structure by using point cloud. More specifically, according to the first reconstruction method, the reconstruction section 204 generates three-dimensional coordinates (X, Y, Z) in the 3D model coordinate system of a sampling point 231 on the basis of the visual point O1, the visual line direction V1, an angle of view 2θ, positions (u, v) of sampling points 231 corresponding to respective pixels 221 of a texture image 220 of the visual point O1 on the texture image 220, and pixel values of the respective pixels 221 of a depth image corresponding to the texture image 220 as depicted in FIG. 13.

The reconstruction section 204 further converts YCbCr values as pixel values of the respective pixels 221 of the texture image 220 into RGB values, and designates the converted RGB values as RGB values of the sampling points 231 corresponding to the respective pixels 221. The reconstruction section 204 draws points of the RGB values of the respective sampling points 231 at the three-dimensional coordinates (X, Y, Z) of the respective sampling points 231 to reconstruct the three-dimensional structure of the main object of imaging. The reconstruction section 204 supplies the three-dimensional coordinates (X, Y, Z) of the respective sampling points 231 to the drawing section 205 as position information associated with the three-dimensional structure of the main object of imaging, and supplies the RGB values of the respective sampling points 231 to the drawing section 205 as color information associated with the three-dimensional structure of the main object of imaging.

(Description of Second Reconstruction Method)

Figure 14:
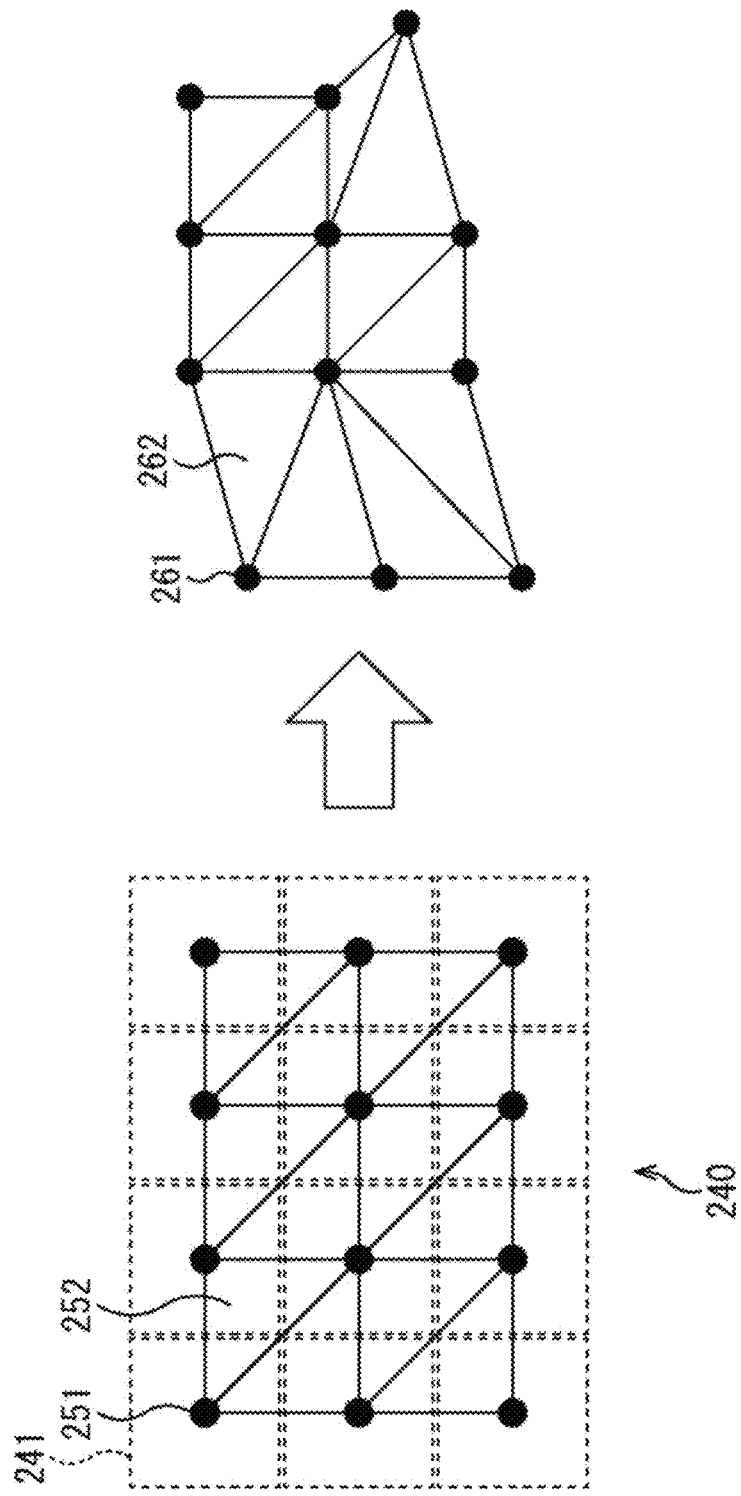
FIG. 14 is a diagram explaining a second reconstruction method.

FIG. 14 is a diagram explaining a second reconstruction method.

Note that texture images and depth images of two visual points are assumed to have resolution of horizontal 4 pixels× vertical 3 pixels in the example of FIG. 14 for convenience of explanation. In addition, described with reference to FIG. 14 is a case where a three-dimensional structure of a main object of imaging is reconstructed using a texture image and a depth image for the one visual point O1 of two visual points.

The second reconstruction method is a method for reconstruction of a three-dimensional structure by using triangular patches. More specifically, according to the second reconstruction method, the reconstruction section 204 generates sampling points 251 corresponding to respective pixels 241 on a texture image 240 of the visual point O1 as depicted in a left part of FIG. 14. The reconstruction section 204 generates a triangular patch 252 whose vertexes are located at the three adjacent sampling points 251 by connecting the three adjacent sampling points 251 included in the sampling points 251 corresponding to all the pixels of the texture image 240.

The reconstruction section 204 further generates three-dimensional coordinates (X, Y, Z) of a 3D model coordinate system corresponding to the respective sampling points 251 on the basis of the visual point O1, the visual line direction V1, the angle of view 2θ, the positions (u, v) of the respective sampling points 251 on the texture image 240, and pixel values of the respective pixels 241 of the depth image corresponding to the texture image 240.

Then, the reconstruction section 204 plots respective sampling points 261 corresponding to the respective sampling points 251 on the 3D model coordinate system on the basis of the three-dimensional coordinates (X, Y, Z) of the respective sampling points 251 as depicted in a right part of FIG. 14. The reconstruction section 204 further generates a triangular patch 262 by connecting the sampling points 261 corresponding to the three sampling points 251 constituting the vertexes of the triangular patch 252.

The reconstruction section 204 also converts YCbCr values of the pixels 241 constituting the triangular patch 252 corresponding to the triangular patch 262 into RGB values for each of the triangular patches 262, and generates RGB values of the triangular patch 262 by using the RGB values thus obtained. The reconstruction section 204 affixes, for each of the triangular patches 262, a texture having the RGB values of the corresponding triangular patch 262 to the corresponding triangular patch 262. In this manner, the reconstruction section 204 reconstructs the three-dimensional structure of the main object of imaging. The reconstruction section 204 supplies three-dimensional coordinates (X, Y, Z) of the sampling points 261 constituting vertexes of each of the triangular patches 262 to the drawing section 205 as position information associated with the three-dimensional structure of the main object of imaging. The reconstruction section 204 further supplies the RGB values of each of the triangular patches 262 to the drawing section 205 as color information associated with the three-dimensional structure of the main object of imaging.

The method for reconstructing the three-dimensional structure of the main object of imaging by using the texture image and depth image of the visual point O1 has been described with reference to FIGS. 13 and 14. This method is also applicable to the method for reconstructing the three-dimensional structure of the main object of imaging by using the texture image and depth image of the visual point O2, and the method for reconstructing the three-dimensional structure of the background region by using the texture image and depth image of the omnidirectional image.

(Description of Process by Display Device)

Figure 15:
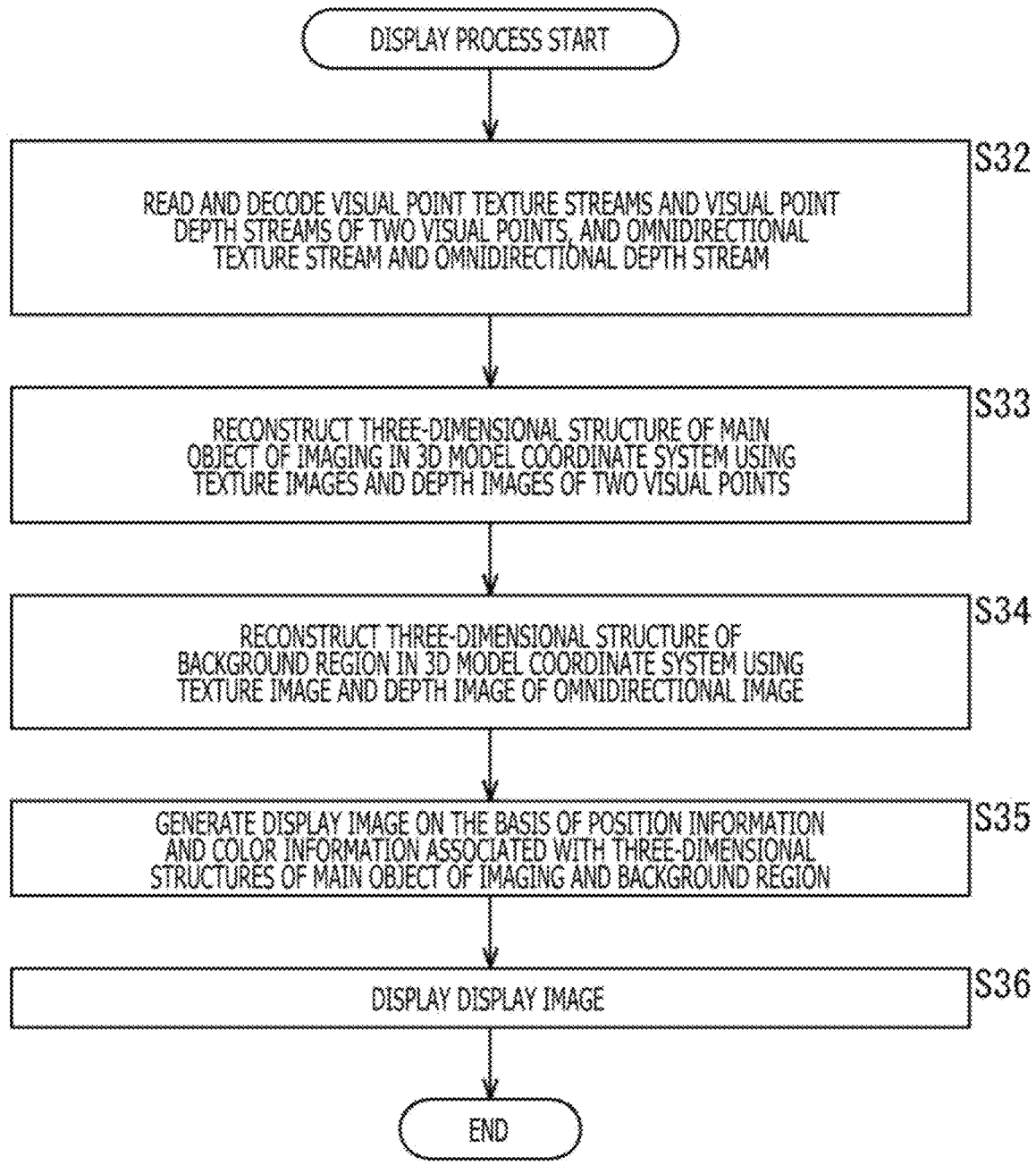
FIG. 15 is a flowchart explaining a display process performed by the display device in FIG. 12.

FIG. 15 is a flowchart explaining a display process performed by the display device 200 in FIG. 12. For example, this display process starts in response to issue of a display request for a display image from a listener/viewer in a state that visual point texture streams and visual point depth streams of two visual points, and omnidirectional texture stream and omnidirectional depth stream are stored in the storage section 202.

In step S32 in FIG. 15, the decoder 203 reads visual point texture streams and visual point depth streams of two visual points, and omnidirectional texture stream and omnidirectional depth stream from the storage section 202, and decodes the read streams. The decoder 203 supplies texture images and depth images of two visual points, and texture image and depth image of an omnidirectional image, each image acquired by decoding, to the reconstruction section 204.

In step S33, the reconstruction section 204 reconstructs a three-dimensional structure of the main object of imaging in the 3D model coordinate system by using the texture images and depth images of two visual points supplied from the decoder 203. The reconstruction section 204 supplies position information and color information associated with the three-dimensional structure of the main object of imaging to the drawing section 205.

In step S34, the reconstruction section 204 further reconstructs a three-dimensional structure of the background region in the 3D model coordinate system by using the texture image and depth image of the omnidirectional image supplied from the decoder 203. The reconstruction section 204 supplies position information and color information associated with the three-dimensional structure of the background region to the drawing section 205.

In step S35, the drawing section 205 generates, as display images, texture images of visual points, visual line directions, and angles of view designated by the listener/viewer or the like in a 3D model coordinate system on the basis of the position information and color information associated with the three-dimensional structures of the main object of imaging and the background region and supplied from the reconstruction section 204. The drawing section 205 supplies the generated display images to the display section 206.

In step S36, the display section 206 displays the display images supplied from the drawing section 205, and the process ends.

As described above, the display device 200 generates a display image by using texture images and depth images of two visual points generated by the generation device 12. In this case, a display image can be generated from a three-dimensional structure of a main object of imaging in more regions of the reconstructed three-dimensional structure than those regions in case of perspective projection of front surfaces of polygons for each of two visual points using texture images and depth images of two visual points. Accordingly, image quality of the display image improves.

Second Embodiment (Configuration Example of Generation Device)

Figure 16:
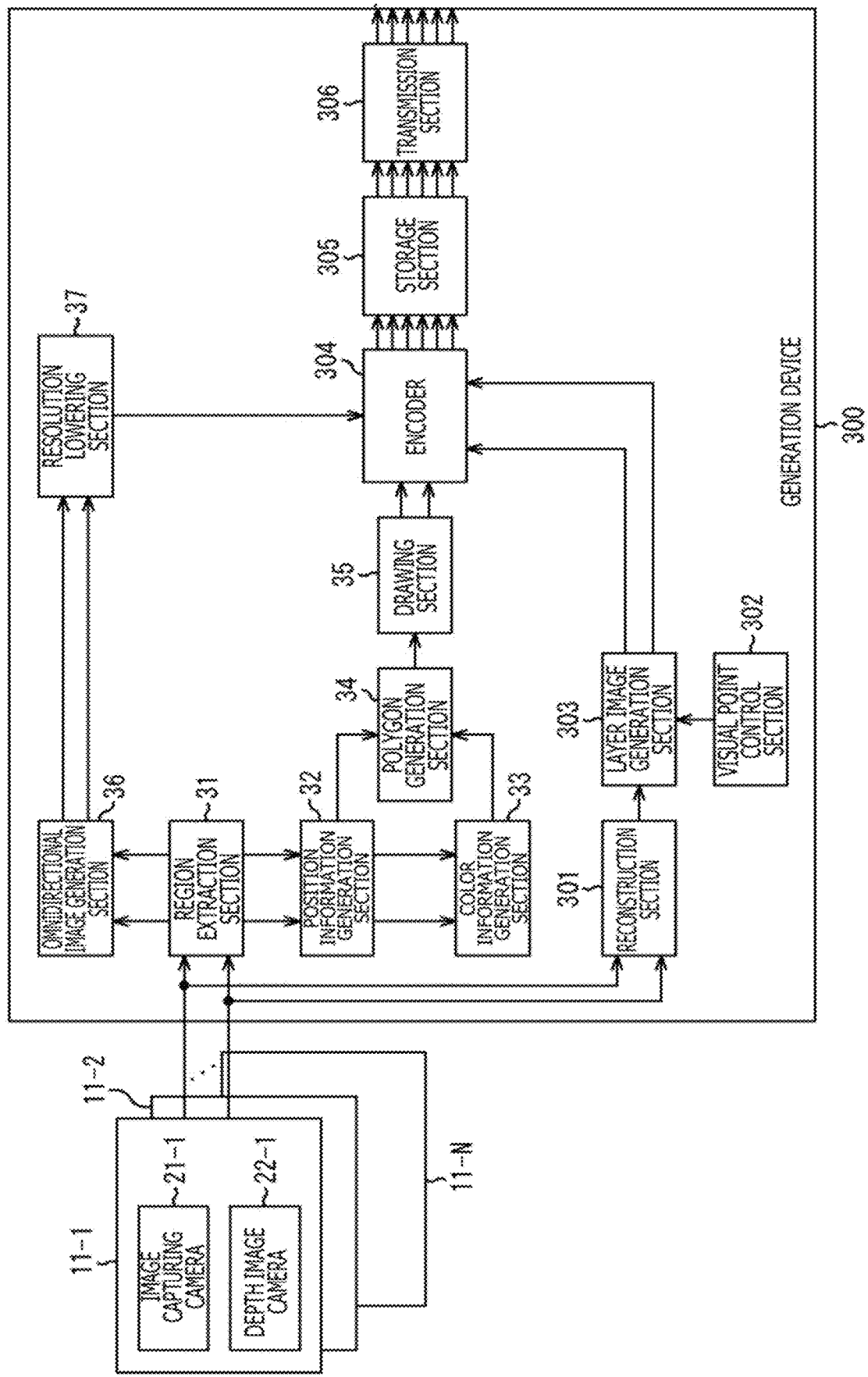
FIG. 16 is a block diagram depicting a configuration example of a generation device according to a second embodiment as an image processing device to which the present disclosure has been applied.

FIG. 16 is a block diagram depicting a configuration example of a generation device according to a second embodiment as an image processing device to which the present disclosure has been applied.

Configurations depicted in FIG. 16 and identical to the corresponding configurations in FIG. 1 have been given identical reference signs. The same description will be omitted where appropriate.

The configuration of a generation device 300 in FIG. 16 is different from the configuration of the generation device 12 in FIG. 1 in that a reconstruction section 301, a visual point control section 302, and a layer image generation section 303 are newly provided, and that an encoder 304, a storage section 305, and a transmission section 306 are provided in place of the encoder 38, the storage section 39, and the transmission section 40.

The generation device 300 generates an encoded stream of texture images of a plurality of layers (hereinafter referred to as layer texture stream), and an encoded stream of depth images (hereinafter referred to as layer depth stream) in addition to visual point texture stream, visual point depth stream, omnidirectional texture stream, and omnidirectional depth stream.

More specifically, the reconstruction section 301 generates a three-dimensional model expressing a three-dimensional structure of each object within a captured image in a 3D model coordinate system by three-dimensional reconstruction based on N captured images and depth images supplied from the N imaging devices 11. The reconstruction section 301 supplies the generated three-dimensional model to the layer image generation section 303.

Note that the 3D model coordinate system used by the reconstruction section 301 may be either identical or not identical to the 3D model coordinate system used by the position information generation section 32 or the like.

The visual point control section 302 sets a visual point and a visual line direction in the 3D model coordinate system as references for generating texture images and depth images of respective layers. The visual point control section 302 supplies visual point information indicating the set visual point and visual line direction to the layer image generation section 303.

The layer image generation section 303 generates texture images and depth images of a plurality of layers on the basis of the visual point and the visual line direction set by the visual point control section 302 as described below. In other words, the layer image generation section 303 classifies texture images and depth images as viewed in the visual line direction from the set visual point into a plurality of layers in accordance with distances from the visual point in the visual line direction. Each of the texture images and the depth images of the respective layers contains an object located at a distance of a predetermined threshold set for each layer or longer in the visual line direction from the set visual point. Note that a higher layer (smaller number layer) has a shorter threshold, and contains an object of imaging (hereinafter also referred to as object) located at a shorter distance from the visual point in the visual line direction. On the other hand, a lower layer (smaller number layer) has a longer threshold, and contains only an object located at a longer distance from the visual point in the visual line direction. The layer image generation section 303 supplies texture images and depth images of respective layers to the encoder 38.

Note that texture images and depth images of respective layers will be hereinafter collectively referred to as layer images in some cases.

The encoder 304 encodes texture images and depth images of two visual points, and encodes texture image, and encodes depth image of an omnidirectional image similarly to the encoder 304 in FIG. 1. The encoder 304 further encodes texture images and depth images of respective layers supplied from the layer image generation section 303. In this manner, layer texture stream and layer depth stream of respective layers are generated. The encoder 304 supplies visual point texture streams and visual point depth streams of two visual points, omnidirectional texture stream and omnidirectional depth stream, and layer texture streams and layer depth streams of respective layers to the storage section 305.

The storage section 305 stores the visual point texture streams and visual point depth streams of two visual points, omnidirectional texture stream and omnidirectional depth stream, and layer texture streams and layer depth streams of respective layers, each of the streams supplied from the encoder 304.

The transmission section 306 reads and transmits the visual point texture streams and visual point depth streams of two visual points, omnidirectional texture stream and omnidirectional depth stream, and layer texture streams and layer depth streams of respective layers, each of the streams stored in the storage section 305.

(Description of Process by Generation Device)

A process performed by a generation device 300 will be next described. Note that the process performed by the generation device 300 for generating visual point texture streams and visual point depth streams of two visual points, and omnidirectional texture stream and omnidirectional depth stream is similar to the corresponding process performed by the generation device 12 in FIG. 1, wherefore description of this process is omitted. A process performed by the generation device 300 for generating texture streams and depth streams of respective layers will be now described with reference to a flowchart in FIG. 17.

In step S101, a reconstruction section 301 of the generation device 300 generates a three-dimensional model expressing a three-dimensional structure of each object within captured images in a 3D model coordinate system on the basis of N captured images and depth images supplied from the imaging devices 11. The reconstruction section 301 supplies the generated three-dimensional model to the layer image generation section 303.

In step S102, the generation device 300 performs a layer image generation process. Details of the layer image generation process will be described below with reference to FIG. 18 and other figures. Texture images and depth images of respective layers are generated by this process.

In step S103, the encoder 304 encodes the texture images and depth images of the respective layers supplied from the layer image generation section 303. The encoder 304 supplies layer texture streams and layer depth streams of the respective layers thus generated to the storage section 305, and causes the storage section 305 to store the supplied streams.

In step S104, the transmission section 306 reads and transmits the layer texture streams and layer depth streams of the respective layers stored in the storage section 305. Thereafter, the process ends.

Figure 17:
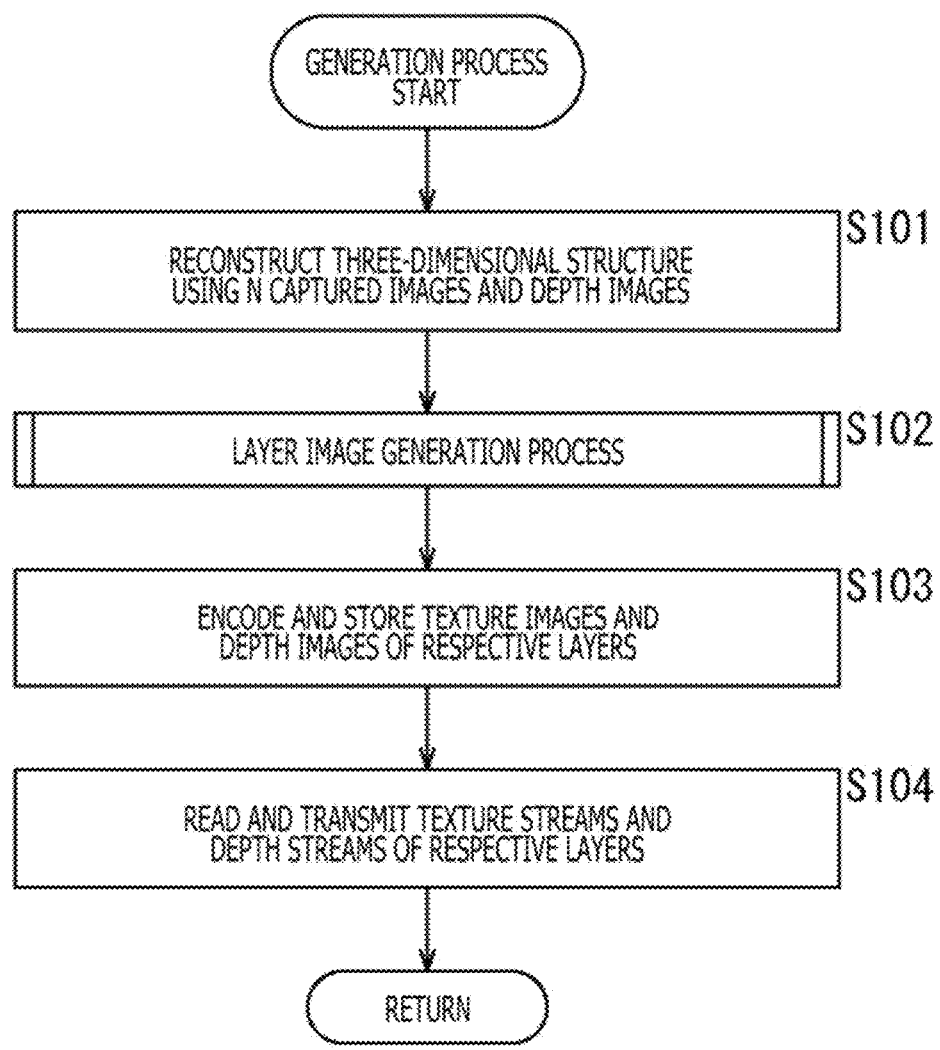
FIG. 17 is a flowchart explaining a generation process performed by the generation device in FIG. 16.

The details of the layer image generation process in step S102 in FIG. 17 will be next described with reference to a flowchart in FIG. 18.

In step S131, the visual point control section 302 sets a visual point and a visual line direction. In other words, the visual point control section 302 sets a visual point and a visual line direction as references for generating texture images and depth images of respective layers in a 3D model coordinate system. The visual point control section 302 supplies visual point information indicating the set visual point and visual line direction to the layer image generation section 303.

Note that the visual point and the visual line direction are set by a user, for example.

In step S132, the layer image generation section 303 selects one of layers for which images are not generated. In other words, the layer image generation section 303 selects an uppermost layer (layer closest to visual point) from layers for which images are not yet generated. Accordingly, a first layer is selected in processing of initial step S132.

Note that a selected layer is hereinafter also referred to as a layer of interest.

In step S133, the layer image generation section 303 sets a shortest distance threshold in accordance with a selected layer. The shortest distance threshold indicates a distance to a closest object from the visual point in the visual line direction in objects drawn in a texture image and a depth image of a layer of interest. Accordingly, an object located at a distance shorter than the shortest distance threshold from the visual point in the visual line direction is not drawn in the texture image and depth image of the layer of interest.

Note that the shortest distance threshold of the first layer is set to 0. Accordingly, all objects visible from the visual point in the visual line direction in the three-dimensional model are drawn in the texture image and depth image of the first layer.

In addition, a lower layer is given a larger value of the shortest distance threshold for a second layer and layers after the second layer. Accordingly, an object located at a shorter distance from the visual point in the visual line direction is drawn in texture image and depth image of a higher layer. On the other hand, an object located at a longer distance from the visual point in the visual line direction, rather than an object located at a short distance from the visual point in the visual line direction, is drawn in texture image and depth image of a lower layer.

Note that the shortest distance threshold is set to a distance shorter than a distance of a background (e.g., sky, far scenery) of the three-dimensional model from the visual point in the visual line direction.

In step S134, the layer image generation section 303 selects one of pixels for each of which pixel value and depth value are not set. More specifically, the layer image generation section 303 selects a pixel for which pixel value and depth value are not set from pixels in a projection surface which is perpendicular to the visual line direction, has a predetermined size (e.g., 1080 vertical pixels×1920 horizontal pixels), and is disposed such that the visual line from the visual point passes through substantially the center of the surface.

Note that a selected pixel is hereinafter also referred to as a pixel of interest. It is further assumed hereinafter that the horizontal direction of the projection surface is an x-axis direction, that the vertical direction of the projection surface is a y-axis direction, and that the visual line direction, i.e. the direction perpendicular to the projection surface, is a z-axis direction.

In step S135, the layer image generation section 303 performs ray-casting up to an initial object in a pixel direction. More specifically, the layer image generation section 303 extends ray (light beam) in a direction toward the pixel of interest from the visual point (pixel direction), and detects a position (hereinafter referred to as adoption candidate position) of collision between the ray and the front surface of the initial object within the three-dimensional model.

In step S136, the layer image generation section 303 determines whether or not the distance to the object in the visual line direction is the shortest distance threshold or longer. In other words, the layer image generation section 303 compares the distance of the adoption candidate position detected in step S135 or step S137 described below from the visual point in the visual line direction (z-axis direction) with the shortest distance threshold. Thereafter, in a case where the layer image generation section 303 determines that the distance to the adoption candidate position in the visual line direction is shorter than the shortest distance threshold, the process proceeds to step S137.

In step S137, the layer image generation section 303 performs ray-casting up to a subsequent object in the pixel direction. More specifically, the layer image generation section 303 further extends the ray in the pixel direction, and detects a position (adoption candidate position) of collision between the ray and the front surface of the object subsequent to the current object.

Thereafter, the process returns to step S136. In step S136, processing in steps S136 and S137 is repeatedly executed until the distance to the object in the visual line direction is determined to be the shortest distance threshold or longer.

In this manner, an object located closest to the visual point and at a distance equal to or longer than the shortest distance threshold from the visual point in the visual line direction is detected from objects present in the pixel direction. The front surface of the selected object is determined as a final adoption candidate position.

Note that the shortest distance threshold is set to a distance shorter than the distance from the visual point to the background of the three-dimensional model in the visual line direction as described above. Accordingly, the background in the pixel direction is detected as a final adoption candidate position even if objects are absent in the pixel direction.

On the other hand, in a case where the distance to the object in the visual line direction is the shortest distance threshold or longer in step S136, the process proceeds to step S138.

In step S138, the layer image generation section 303 sets pixel value and depth value of the selected pixel. More specifically, the layer image generation section 303 sets the pixel value of the adoption candidate position to the pixel value of the pixel of interest in the texture image of the layer of interest. The layer image generation section 303 further sets the distance from the visual point to the adoption candidate position in the visual line direction (z-axis direction) to the depth value of the pixel of interest in the depth image of the layer of interest.

In step S139, the layer image generation section 303 determines whether or not a pixel for which pixel value and depth value are not set is present. In a case where presence of a pixel for which pixel value and depth value are not set is determined, the process returns to step S134.

Thereafter, processing from step S134 to step S139 is repeatedly executed until absence of a pixel for which pixel value and depth value are not set is determined in step S139. In this manner, pixel values of all pixels in the texture image of the layer of interest, and depth values of all pixels in the depth image of the layer of interest are set.

On the other hand, in a case where absence of a pixel for which pixel value and depth value are not set is determined in step S139, the process proceeds to step S140.

In step S140, the layer image generation section 303 determines whether or not a layer for which an image is not generated is present. In a case where presence of a layer for which an image is not generated is determined, the process returns to step S132.

Thereafter, processing from step S132 to S140 is repeatedly executed until absence of a layer for which an image is not generated is determined in step S140. In this manner, texture images and layer images of the respective layers are generated.

On the other hand, in a case where presence of a layer for which an image is not generated is determined in step S140, the layer image generation process ends.

A specific example of the layer image generation process in FIG. 18 will be herein described with reference to FIGS. 19 to 22.

Figure 19:
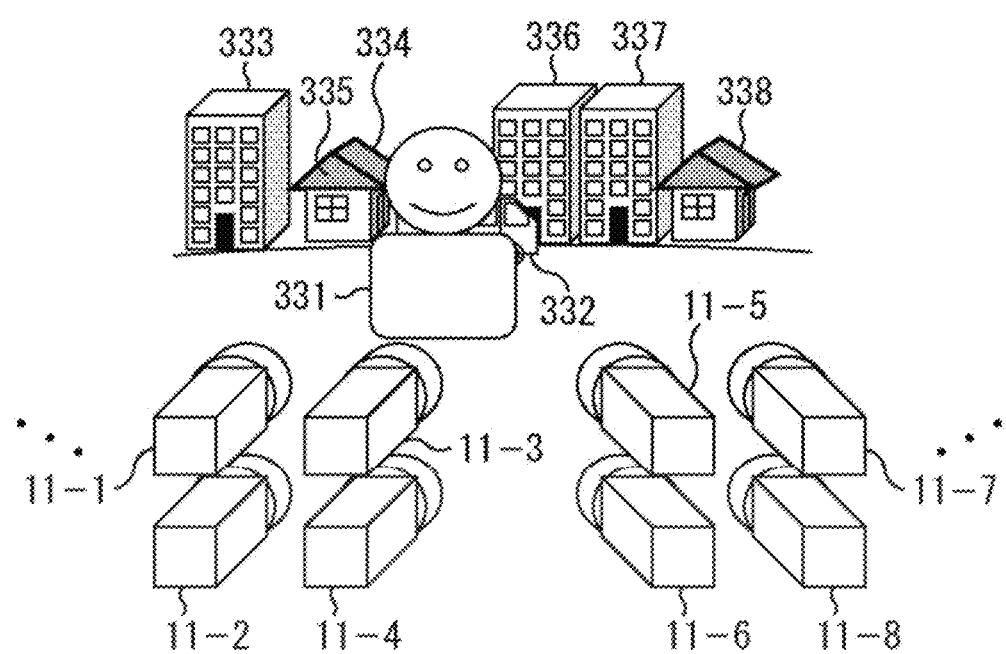
FIG. 19 is a schematic diagram depicting an arrangement example of cameras and respective objects.
Figure 20:
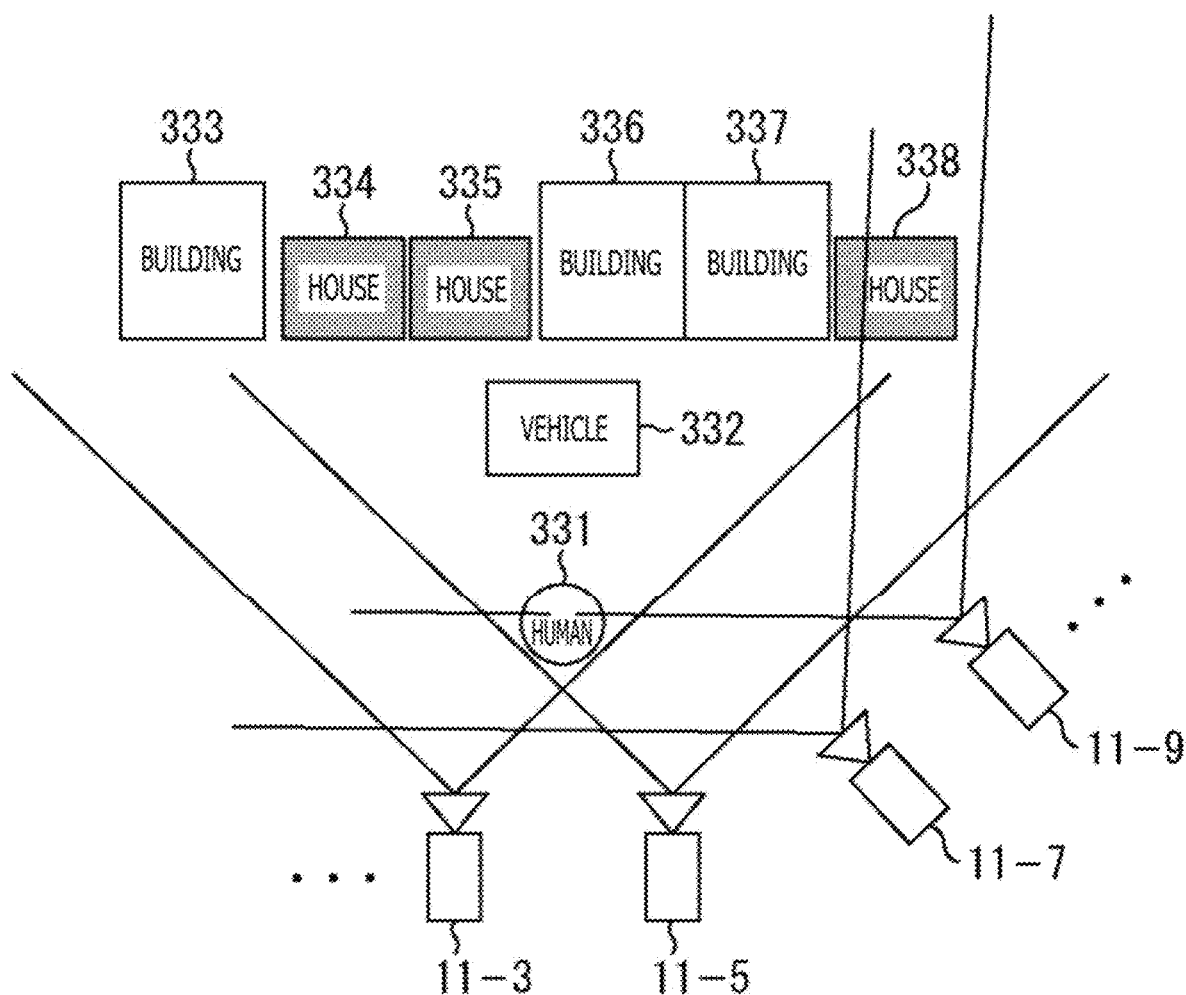
FIG. 20 is a schematic diagram depicting an arrangement example of cameras and respective objects.

FIGS. 19 and 20 each depict an arrangement example of the imaging devices 11 and respective objects. FIG. 19 is a schematic diagram of the respective objects as viewed substantially from the front. FIG. 20 is a schematic diagram of the respective objects as viewed from above.

According to the examples in FIGS. 19 and 20, a human 331, a vehicle 332, a building 333, a house 334, a house 335, a building 336, a building 337, and a house 338 are included in imaging targets. The building 333, the house 334, the house 335, the building 336, the building 337, and the house 338 are horizontally disposed in a line. The vehicle 332 stops in front of the house 335 and the building 336. The human 331 stands in front of the vehicle 332. A part of the vehicle 332, and substantially the whole of the house 335 are invisible behind the human 331 as viewed from the front.

FIGS. 19 and 20 each depict only the imaging devices 11-1 to 11-9. For example, the imaging devices 11 are disposed around at least a part of a periphery of a region containing the respective objects of the human 331 to the house 338 in such positions as to surround at least the part of the periphery in the horizontal direction and the vertical direction, and each capture an image of the region containing the respective objects from a different visual point. Note that each of the imaging devices 11-1, 11-3, 11-5, and 11-8 of the imaging devices 11-1 to 11-8 depicted in the figure captures images of the objects of imaging from above, and that each of the imaging devices 11-2, 11-4, 11-6, and 11-8 captures images of the objects of imaging from below. Each of the imaging devices 11-1 and 11-2 is so disposed as to capture an image of the human 331 from the obliquely left front to the obliquely right front. Each of the imaging devices 11-3 and 11-4 is so disposed as to capture an image of the human 331 substantially in the front direction from the slightly left with respect to the front. Each of the imaging devices 11-5 and 11-6 is so disposed as to capture an image of the human 331 substantially in the front direction from the slightly right with respect to the front. Each of the imaging devices 11-7 and 11-8 is so disposed as to capture an image of the human 331 from the obliquely right front to the obliquely left. The imaging device 11-9 is so disposed as to capture an image of the human 331 substantially from the right to the obliquely left front.

Figure 21:
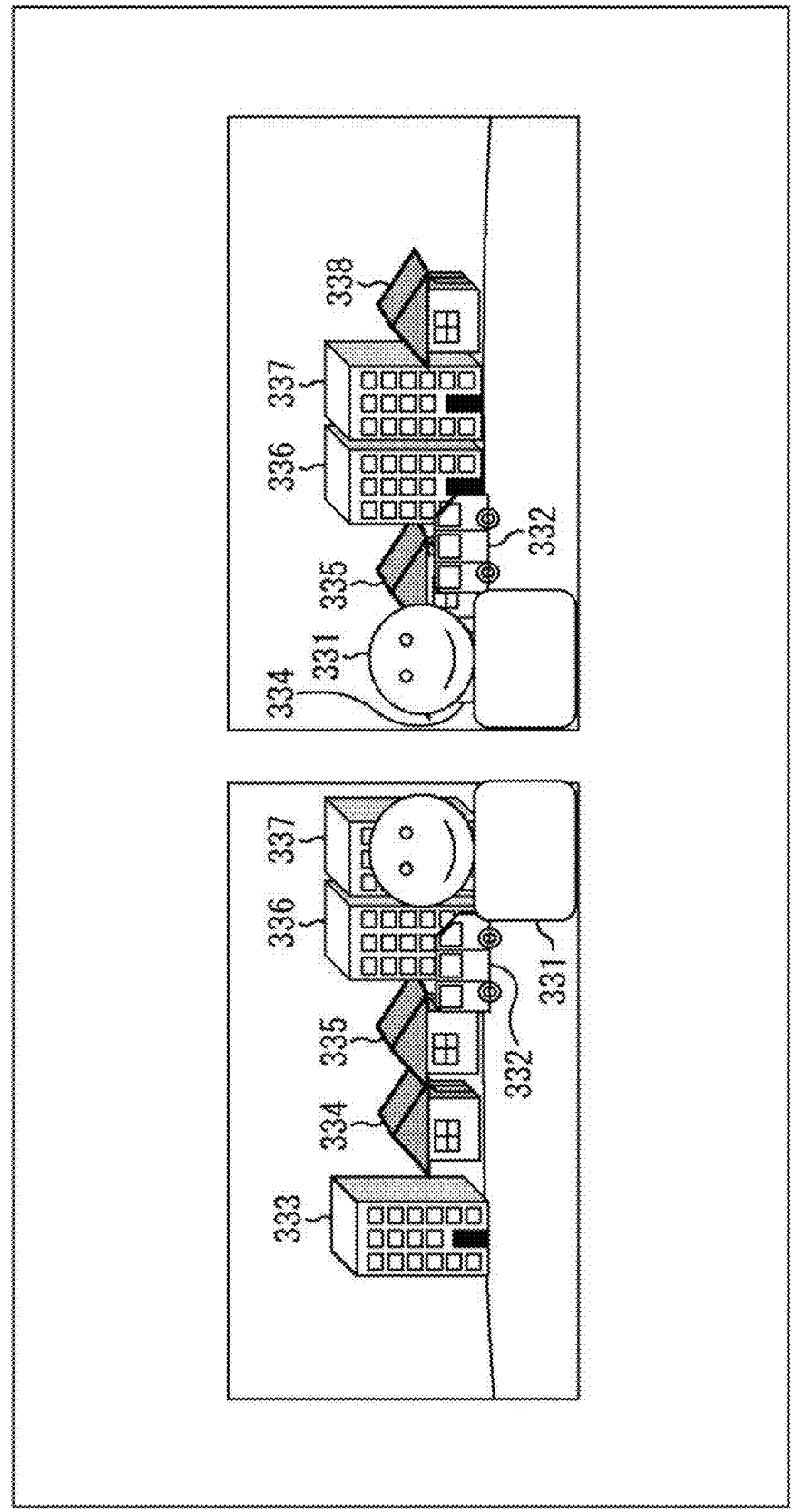
FIG. 21 is a diagram depicting examples of a captured image.

A diagram in a left part of FIG. 21 depicts an example of a captured image captured by the imaging device 11-3 (image capturing camera 21-3), while a diagram in a right part depicts an example of a captured image captured by the imaging device 11-5 (image capturing camera 21-5).

As depicted in these examples, in each of the captured images of the imaging devices 11-3 and 11-5, substantially the whole of the vehicle 332 appears with no invisible portion behind the human 331, unlike a case of the respective objects viewed from the front. On the other hand, in the left captured image, substantially the whole of the house 335 appears with no invisible portion behind the human 331 and the vehicle 332.

As described above, an image of a part or the whole of an object invisible behind another object as viewed from a predetermined visual point can be captured by imaging a region containing respective objects from positions surrounding the region in the horizontal direction and the vertical direction. Accordingly, texture images of respective layers with reference to the predetermined visual point can be generated by imaging under control of the number and positions of the imaging devices 11 and performing appropriate processing, such as coordinate conversion and synthesis, of a captured image thus acquired.

Figure 22:
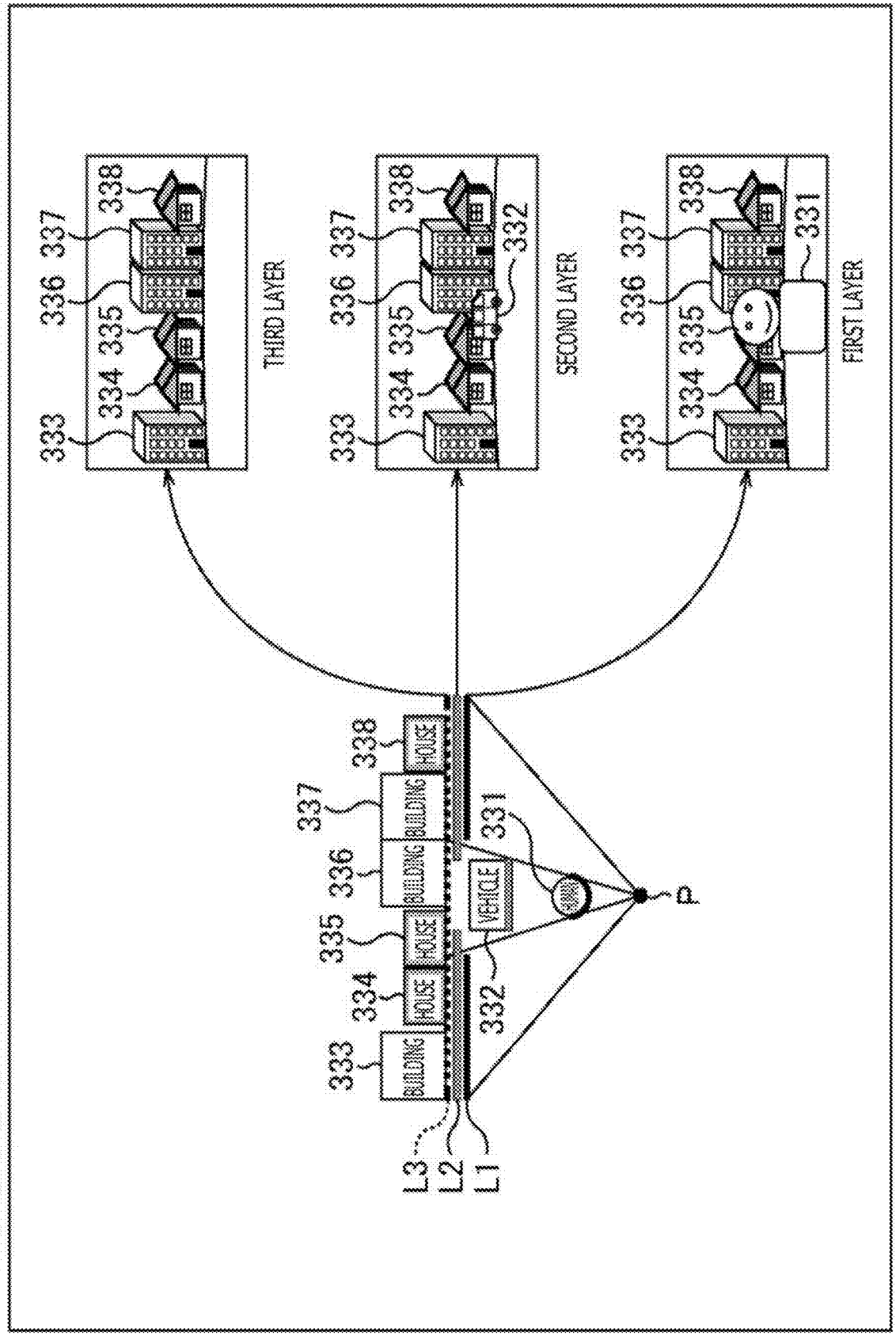
FIG. 22 is an example of a texture image having a three-layer structure.

For example, FIG. 22 depicts an example of a texture image having a three-layer structure and generated on the basis of captured images of the respective objects in FIG. 19 captured by the respective imaging devices 11.

A diagram in a left part of FIG. 22 is a schematic diagram of a positional relationship between the respective objects as viewed from above. A diagram in a right part of FIG. 22 depicts an example of texture images of first layer to third layer in a state where the positional relationship between the respective objects is the state depicted in the diagram in the left part.

Note that a direction from the human 331 to a visual point P and a direction from the human 331 to the vehicle 332 in FIG. 22 are hereinafter defined as forward direction and backward direction, respectively. In addition, a direction from the building 333 to the house 338 and a direction from the house 338 to the building 333 in FIG. 22 are defined as the rightward direction and the leftward direction, respectively. These definitions are also applicable to other similar figures.

A portion indicated by a line L1 in the diagram in the left part is drawn in the texture image of the first layer. More specifically, all of the objects from the human 331 to the house 338 as viewed from the visual point P correspond to drawing targets. In addition, the vehicle 332 is invisible behind the human 331.

A portion indicated by a line L2 in the diagram in the left part is drawn in the texture image of the second layer. More specifically, the whole of the vehicle 332 is drawn in the texture image of the second layer with the human 331 removed from the texture image of the first layer. In addition, a part of the house 335 and a part of the building 336 are invisible behind the vehicle 332.

A portion indicated by a line L3 in the diagram in the left part is drawn in the texture image of the third layer. More specifically, the whole of the house 335 and the whole of the building 336 are drawn in the texture image of the third layer with the vehicle 332 removed from the texture image of the second layer.

As described above, an object invisible behind a front object in a texture image of a higher layer is drawn and become visible in a texture image of a lower layer by classifying respective objects in accordance with distances from the visual point P.

Figure 18:
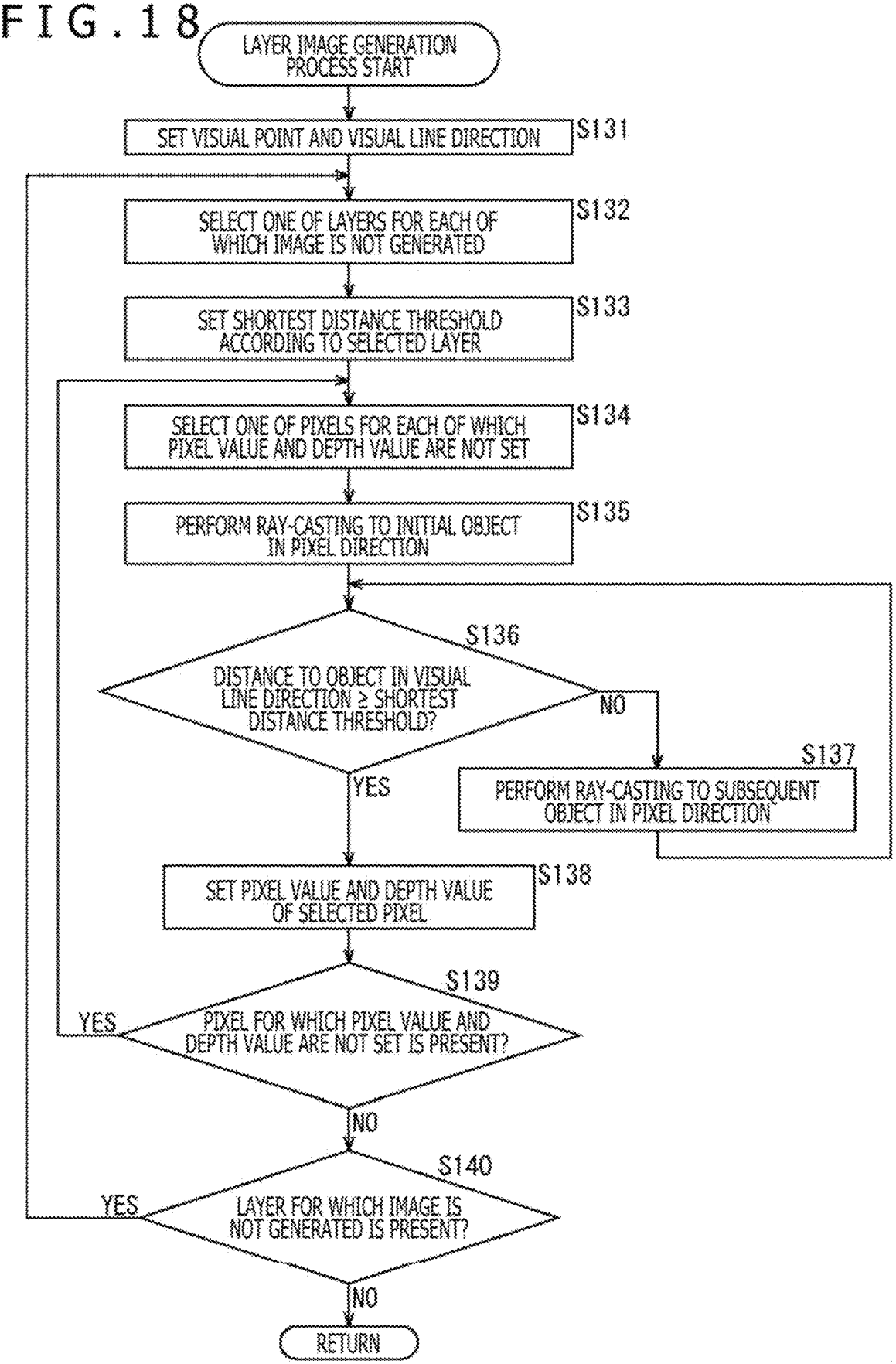
FIG. 18 is a flowchart explaining details of a layer image generation process.
Figure 23:
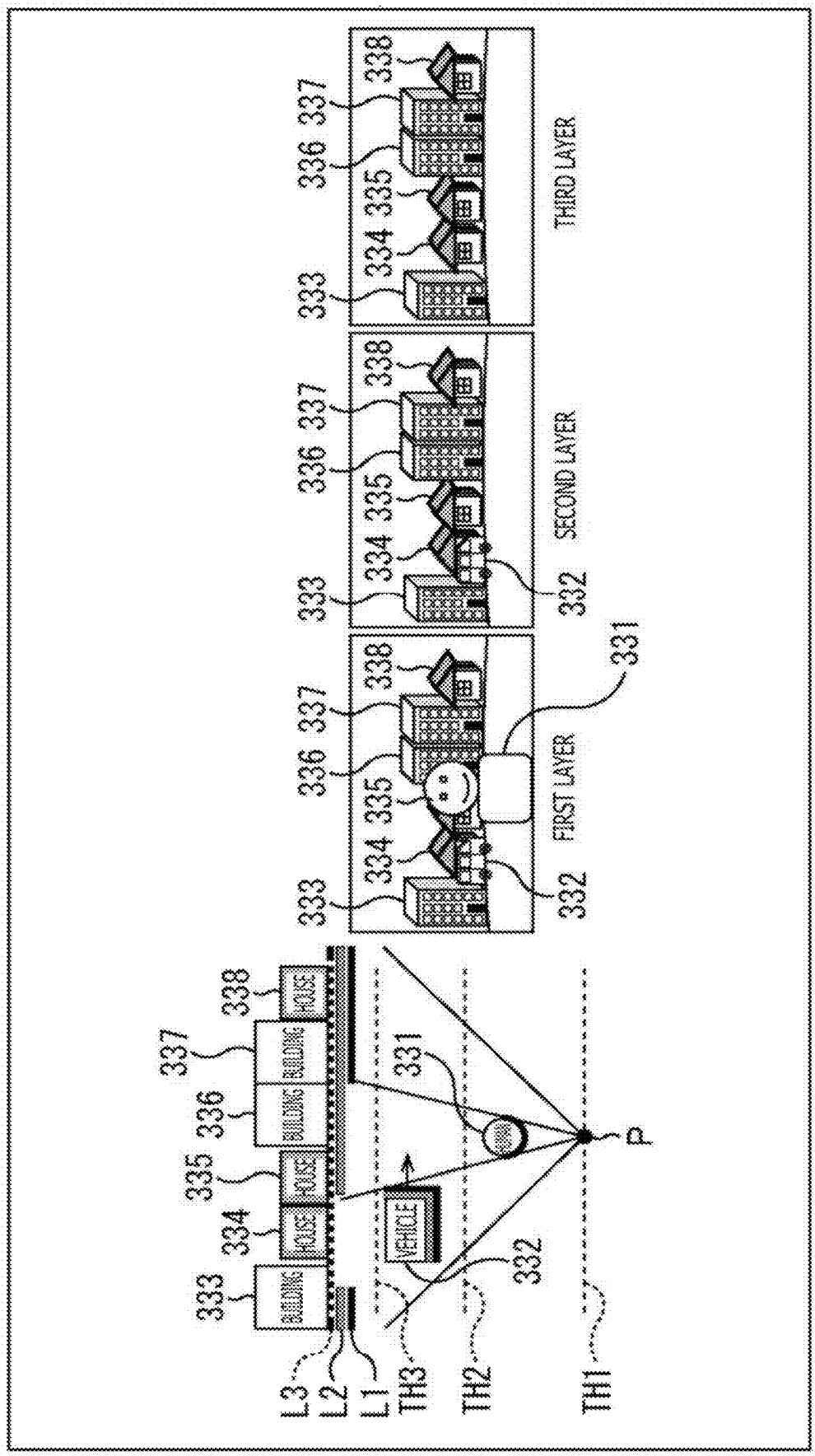
FIG. 23 is a diagram explaining a specific example of the layer image generation process.
Figure 24:
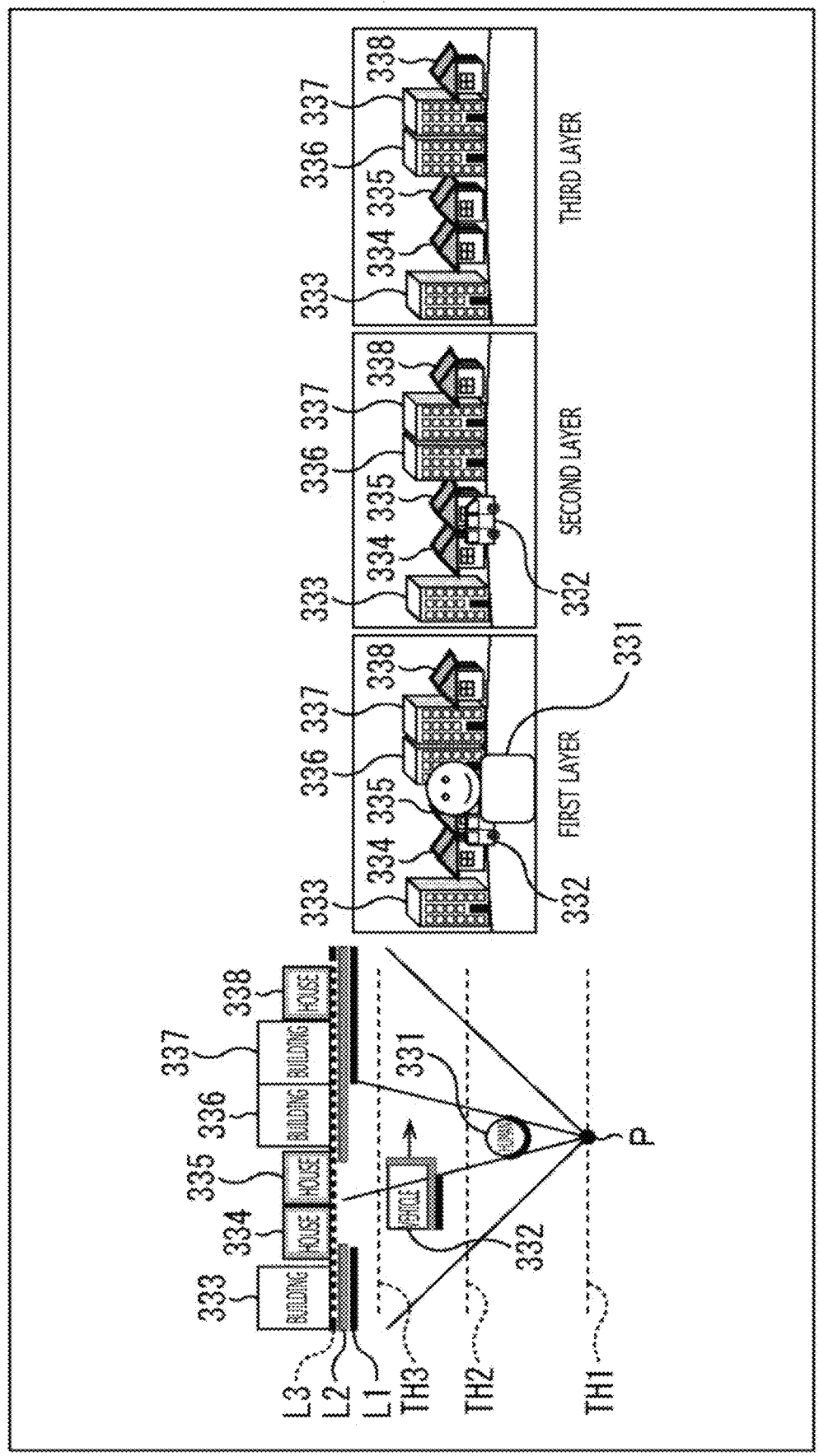
FIG. 24 is a diagram explaining a specific example of the layer image generation process.
Figure 25:
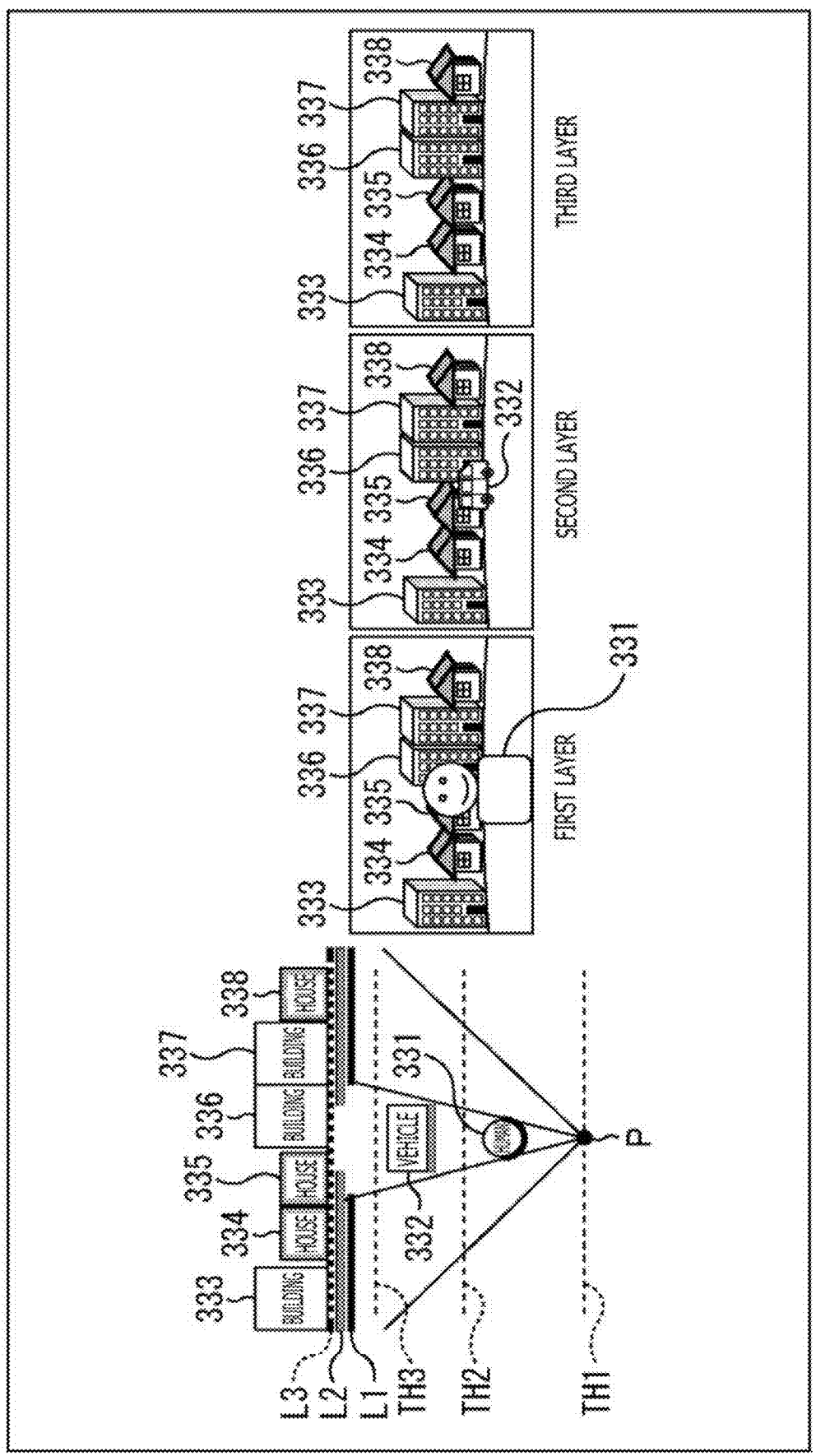
FIG. 25 is a diagram explaining a specific example of the layer image generation process.

The layer image generation process in FIG. 18 will be more specifically described with further reference to FIGS. 23 to 25. Note that configurations depicted in FIGS. 23 to 25 and identical to the corresponding configurations in FIGS. 19 and 20 have been given identical reference signs.

A diagram in a left part of each of FIGS. 23 to 25 is a schematic diagram of a positional relationship between the respective objects as viewed from above. A diagram in a right part of each of FIGS. 23 to 25 depicts an example of texture images of first layer to third layer in a state where the positional relationship between the respective objects is the state depicted in the diagram in the left part.

Note that texture images of the respective layers in FIGS. 23 to 25 are arranged in time series, depicting examples of the texture images of the respective layers in a state where the vehicle 332 moves from the left to the right behind the human 331.

Shortest distance thresholds TH1 to TH3 are set in the examples of FIGS. 23 to 25. The shortest distance threshold TH1 is set to 0. The shortest distance threshold TH2 is set to a distance from the visual point P to a position between the human 331 and the vehicle 332. The shortest distance threshold TH3 is set to a distance from the visual point P to a position between the vehicle 332 and the respective objects from the building 333 to the house 338.

Accordingly, in the texture image of the first layer, all the objects from the human 331 to the house 338 each located at a distance equal to or longer than the shortest distance threshold TH1 from the visual point P in the visual line direction are drawing targets. In the texture image of the second layer, the objects from the vehicle 332 to the house 338 each located at a distance equal to or longer than the shortest distance threshold TH2 from the visual point P in the visual line direction are drawing targets. The human 331 located at a distance shorter than the shortest distance threshold TH2 from the visual point P in the visual line direction is removed from the drawing targets. In the texture image of the third layer, the objects from the building 333 to the house 338 each located at a distance equal to or longer than the shortest distance threshold TH3 from the visual point P in the visual line direction are drawing targets. The human 331 and the vehicle 332 each located at a distance shorter than the shortest distance threshold TH3 from the visual point P in the visual line direction are removed from the drawing targets.

Accordingly, in the texture image of the first layer, the vehicle 332 becomes invisible behind the human 331 in accordance with movement of the vehicle 332 to the right. On the other hand, the human 331 is removed from the texture image of the second layer, wherefore a state of movement of the vehicle 332 from the left to the right is all drawn. Furthermore, the human 331 and the vehicle 332 are removed from the texture image of the third layer, wherefore the whole of the respective objects from the building 333 to the house 338 is drawn as the background of the human 331 and the vehicle 332.

Note that a method for generating depth images of respective layers is similar to the method for generating texture images of respective layers described above.

(Configuration Example of Display Device)

Figure 26:
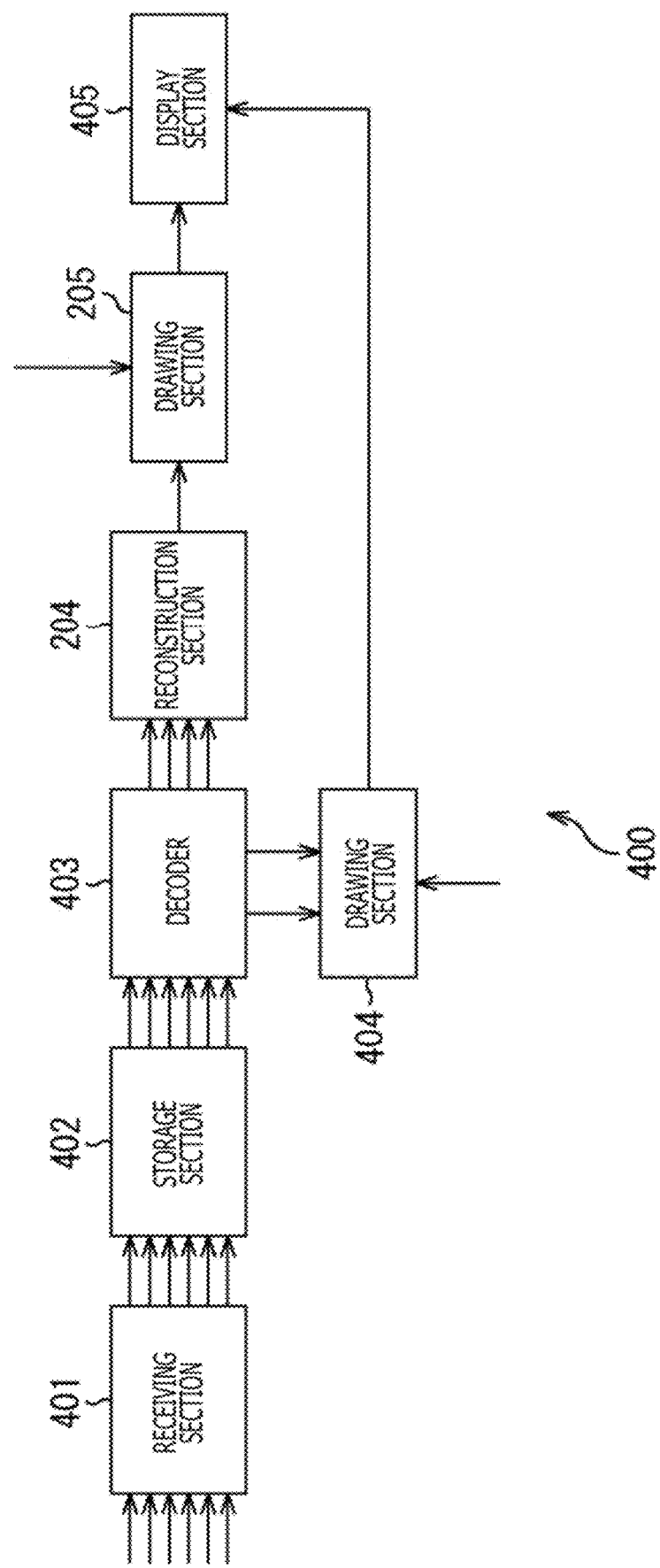
FIG. 26 is a block diagram depicting a configuration example of a display device according to the second embodiment as an image processing device to which the present disclosure has been applied.

FIG. 26 is a block diagram depicting a configuration example of a display device according to the second embodiment as an image processing device to which the present disclosure has been applied.

Configurations depicted in FIG. 26 and identical to the corresponding configurations in FIG. 12 have been given identical reference signs. The same description will be omitted where appropriate.

The configuration of a display device 400 in FIG. 26 is different from the configuration of the display device 200 in FIG. 12 in that a drawing section 404 is newly provided, and that a receiving section 401, a storage section 402, a decoder 403, and a display section 405 are provided in place of the receiving section 201, the storage section 202, the decoder 203, and the display section 206. The display device 400 generates a display image on the basis of layer texture streams and layer depth streams of respective layers in addition to visual point texture stream, visual point depth stream, omnidirectional texture stream, and omnidirectional depth stream.

The receiving section 401 of the display device 400 receives visual point texture streams and visual point depth streams of two visual points, omnidirectional texture stream and omnidirectional depth stream, and layer texture streams and layer depth streams of respective layers, each of the streams transmitted from the generation device 300, and supplies the received streams to the storage section 402.

The storage section 402 stores the visual point texture streams and visual point depth streams of two visual points, omnidirectional texture stream and omnidirectional depth stream, and layer texture streams and layer depth streams of respective layers, each of the streams supplied from the receiving section 401.

The decoder 403 reads the visual point texture streams and visual point depth streams of two visual points, omnidirectional texture stream and omnidirectional depth stream, and layer texture streams and layer depth streams of respective layers from the storage section 402, and decodes the read streams. The decoder 403 supplies texture images and depth images of two visual points, and texture image and depth image of the omnidirectional image, each of the streams acquired by decoding, to the reconstruction section 204. The decoder 403 further supplies texture images and depth images of the respective layers acquired by decoding to the drawing section 404.

The drawing section 404 (image generation section) generates display images by using the texture images and depth images of the respective layers supplied from the decoder 403. For example, the drawing section 404 generates a two-dimensional display image by using a texture image of a layer designated by the listener/viewer or the like. Alternatively, the drawing section 404 generates a three-dimensional display image by using a texture image and a depth image of a layer designated by the listener/viewer or the like. The drawing section 404 supplies the display images to the display section 405.

The display section 405 displays the display images supplied from the drawing section 205 or the drawing section 404.

(Description of Process by Display Device)

A process performed by the display device 400 will be next described. Note that a process performed by the display device 400 for generating and displaying a display image by using visual point texture stream and visual point depth stream, and omnidirectional texture stream and omnidirectional depth stream is similar to the corresponding process performed by the display device 200 in FIG. 12, wherefore description of the process is omitted. The process performed by the display device 400 for generating and displaying a display image by using texture streams and depth streams of respective layers will now be described with reference to a flowchart in FIG. 27.

In step S201, the decoder 403 reads layer texture streams and layer depth streams of respective layers from the storage section 402, and decodes the read streams. The decoder 403 supplies texture images and depth images of the respective layers acquired by decoding to the drawing section 404.

In step S202, the drawing section 404 generates display images by using the texture images and depth streams of the respective layers. For example, the drawing section 404 generates a two-dimensional display image by using a texture image of a layer designated by the listener/viewer or the like. Alternatively, the drawing section 404 generates a three-dimensional display image by using texture image and depth image of a layer designated by the listener/viewer or the like. The drawing section 404 supplies the display image to the display section 405.

In step S36, the display section 405 displays the display images supplied from the drawing section 404, and the process ends.

For example, in a case where display of the first layer is designated in the above-described examples of FIGS. 23 to 25, a two-dimensional or three-dimensional display image of the first layer containing all the objects is displayed. In a case where display of the second layer is designated, a two-dimensional or three-dimensional display image of the second layer containing the objects except for the human 331 is displayed. In a case where display of the third layer is designated, a two-dimensional or three-dimensional display image of the third layer containing the objects except for the human 331 and the vehicle 332 is displayed.

In this manner, display or non-display of respective objects can be controlled in accordance with distances from the visual point P in the visual line direction by designation of a layer by the listener/viewer. For example, the listener/viewer can set an object located close to the visual point P to non-display by designating a lower layer so that an object invisible behind the non-display object can be displayed and visually recognized.

(Modified Example of Layer Image Generation Process)

A modified example of the layer image generation process will be herein described with reference to FIGS. 28 to 30. According to this example, the whole or a part of an object drawn in a higher layer is not drawn in a lower layer.

Figure 28:
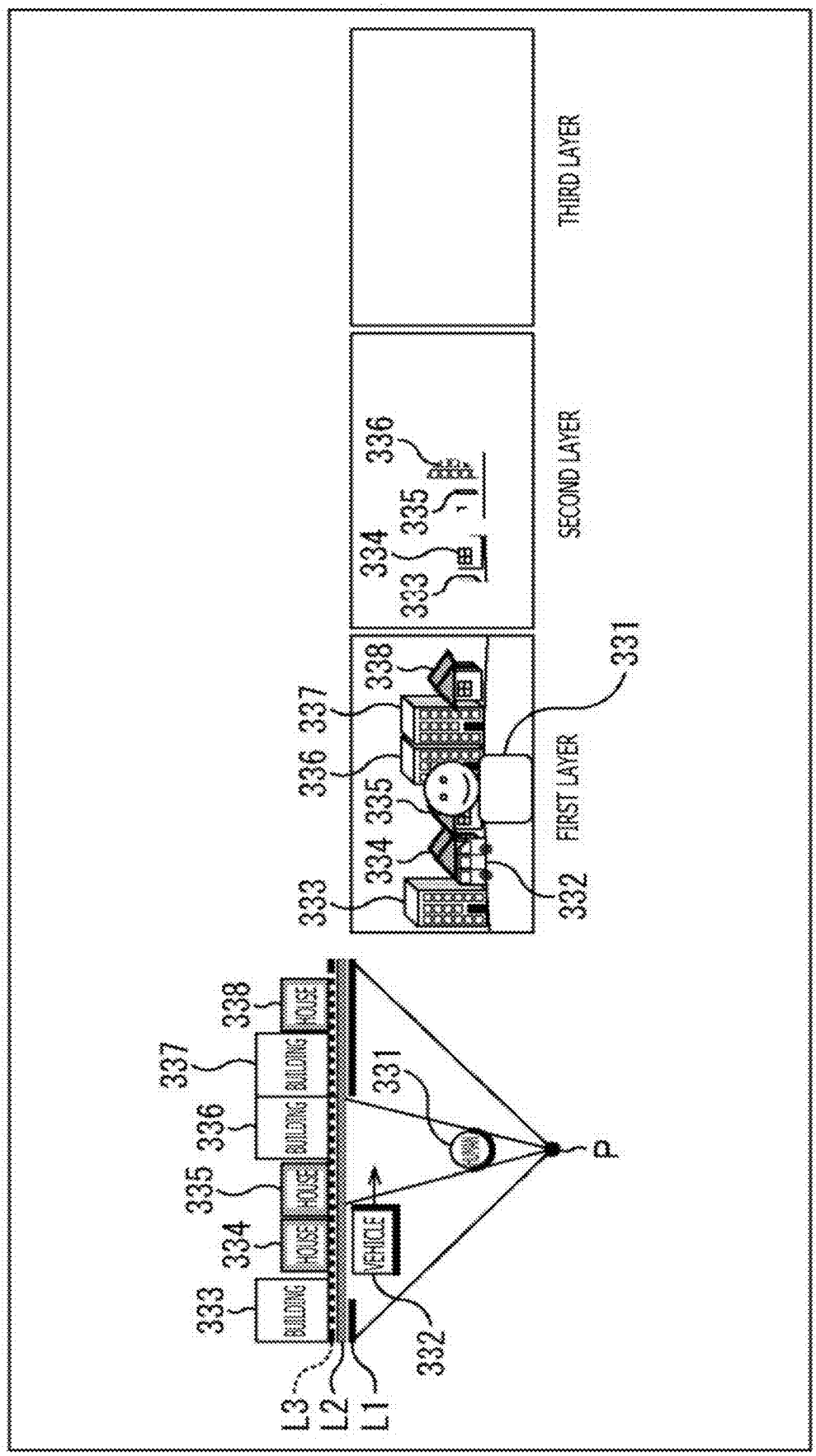
FIG. 28 is a diagram explaining a modified example of the layer image generation process.
Figure 29:
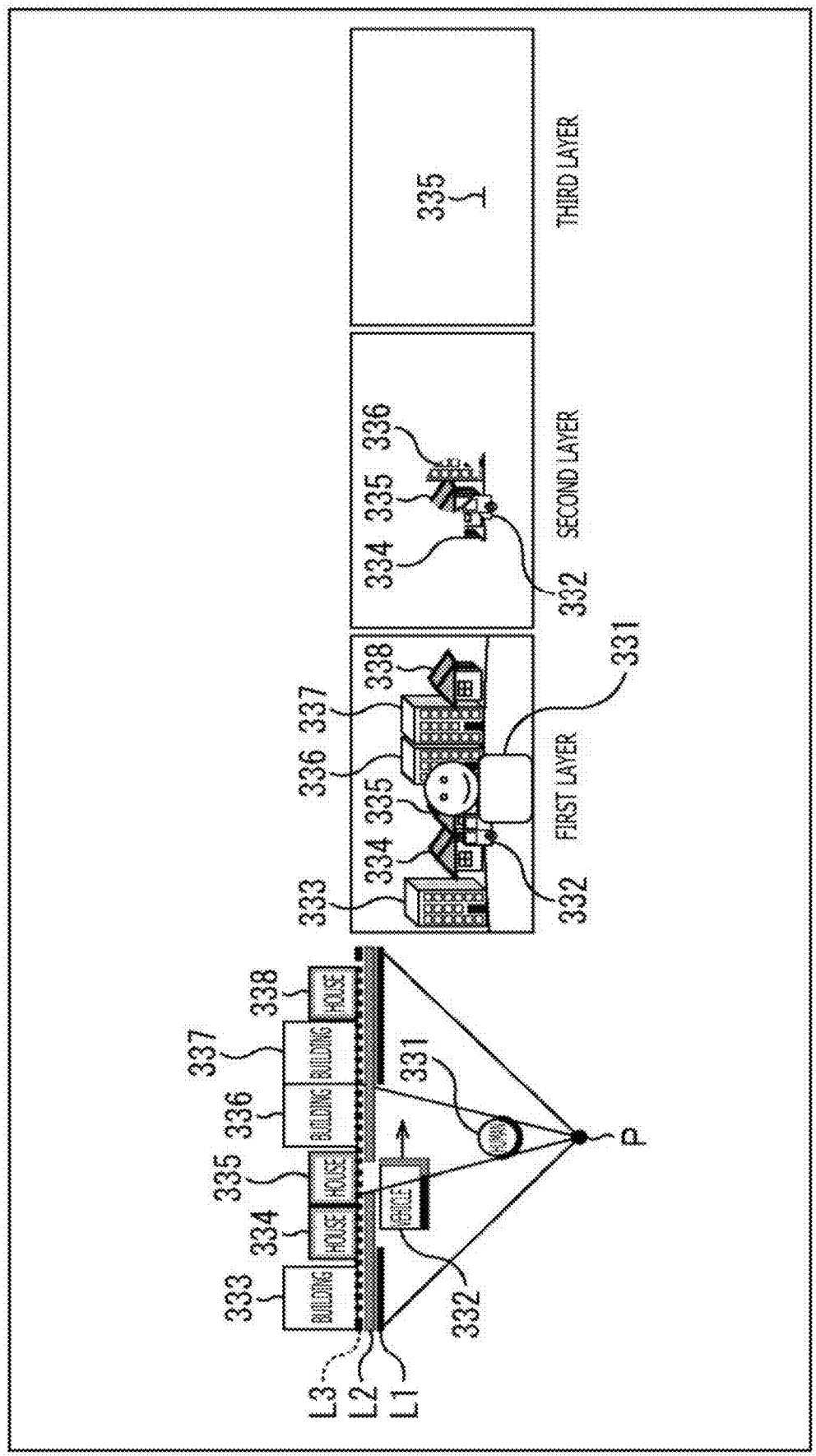
FIG. 29 is a diagram explaining a modified example of the layer image generation process.
Figure 30:
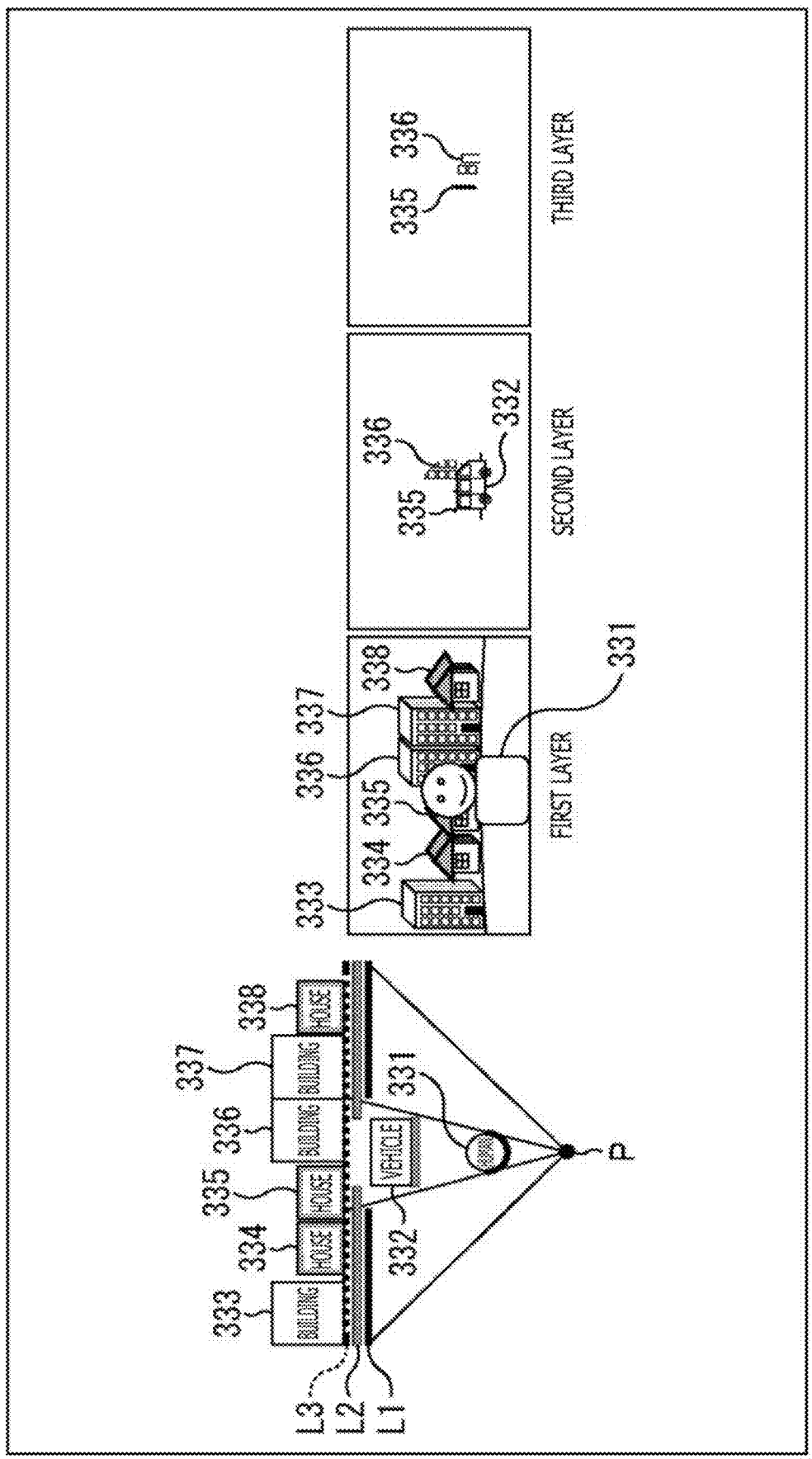
FIG. 30 is a diagram explaining a modified example of the layer image generation process.

FIGS. 28 to 30 each depict an example of texture images of respective layers in a case where the whole or a part of objects drawn in a higher layer is not drawn in a lower layer in the same arrangement of objects as the foregoing arrangement in FIGS. 23 to 25.

In the texture image of the first layer in FIG. 28, a part of the building 333, a part of the house 334, a part of the house 335, and a part of the building 336 are invisible behind the human 331 and the vehicle 332. Accordingly, only a part invisible behind the human 331 and the vehicle 332 in the texture image of the first layer is drawn in the texture image of the second layer. Objects invisible behind other objects are not present in the texture image of the second layer, wherefore nothing is drawn in the texture image of the third layer.

In the texture image of the first layer in FIG. 29, a part of the vehicle 332, a part of the house 335, and a part of the building 336 are invisible behind the human 331. In addition, a part of the house 334 and a part of the house 335 are invisible behind the vehicle 332. Accordingly, only a part invisible behind the human 331 and the vehicle 332 in the texture image of the first layer is drawn in the texture image of the second layer. In the texture image of the second layer, a part of the house 335 is invisible behind the vehicle 332. Accordingly, only a part invisible behind the vehicle 332 in the texture image of the second layer is drawn in the texture image of the third layer.

In the texture image of the first layer in FIG. 30, the whole of the vehicle 332, a part of the house 335, and a part of the building 336 are invisible behind the human 331. Accordingly, only a part invisible behind the human 331 in the texture image of the first layer is drawn in the texture image of the second layer. In the texture image of the second layer, a part of the house 335 and a part of the building 336 are invisible behind the vehicle 332. Accordingly, only a part invisible behind the vehicle 332 in the texture image of the second layer is drawn in the texture image of the third layer.

Third Embodiment (Configuration Example of Display Device)

Figure 31:
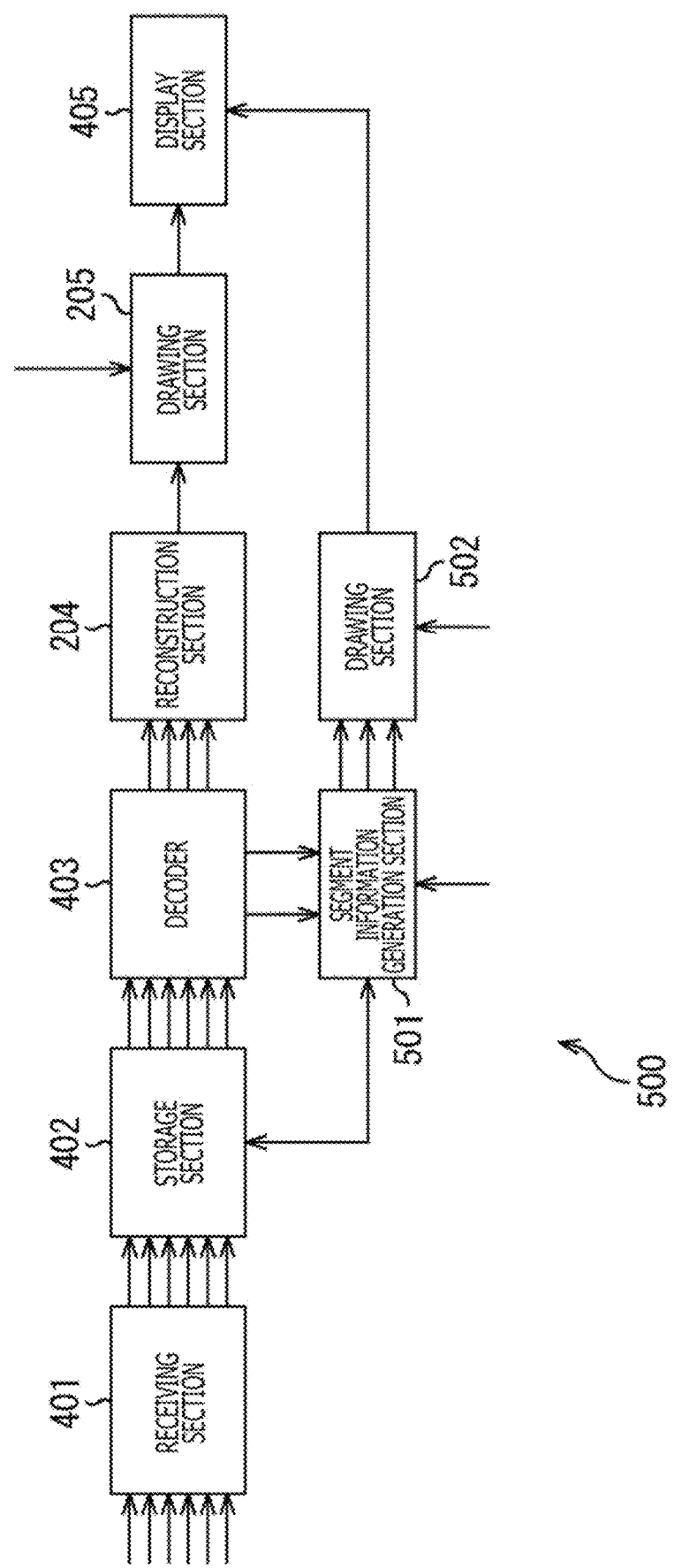
FIG. 31 is a block diagram depicting a configuration example of a display device according to a third embodiment as an image processing device to which the present disclosure has been applied.

FIG. 31 is a block diagram depicting a configuration example of a display device according to a third embodiment as an image processing device to which the present disclosure has been applied.

Configurations depicted in FIG. 31 and identical to the corresponding configurations in FIG. 26 have been given identical reference signs. The same description will be omitted where appropriate.

The configuration of a display device 500 in FIG. 31 is different from the configuration of the display device 400 in FIG. 26 in that a segment information generation section 501 is newly provided, and that a drawing section 502 is provided in place of the drawing section 404. The display device 500 can individually change display modes of respective objects in layer images of respective layers. For example, the display device 500 can individually change display/non-display, movement, rotation, enlargement/reduction in size, and modification of the whole or a part of each object, and tint, color, luminance, resolution, transparency, or others of each object.

The segment information generation section 501 of the display device 500 generates a segmentation table by using texture images and depth images of respective layers supplied from the decoder 403. As described below with reference to FIG. 35, the segmentation table is segment information indicating a position of a segment in the layer direction and pixel direction. This segment is a segment where respective objects are present in layer images (texture images and depth images) of respective layers. The segment information generation section 501 supplies the texture images and depth images of the respective layers, and the segmentation table to the drawing section 502. The segment information generation section 501 further causes the storage section 402 to store the segmentation table.

The drawing section 502 (image generation section) generates display images by using the texture images and depth images of the respective layers, and the segmentation table, the images and segmentation table supplied from the segment information generation section 501. For example, the drawing section 502 generates a two-dimensional display image by using a texture image of a layer designated by the listener/viewer or the like. Alternatively, for example, the drawing section 502 generates a three-dimensional display image by using texture image and depth image of a layer designated by the listener/viewer or the like. The drawing section 502 further changes display modes of respective objects within the display images on the basis of designation by the listener/viewer or the like. The drawing section 502 supplies the display images to the display section 405.

(Description of Process by Display Device)

A process performed by the display device 500 will be next described. Note that a process performed by the display device 500 for generating and displaying a display image by using visual point texture stream and visual point depth stream, and omnidirectional texture stream and omnidirectional depth stream is similar to the corresponding process performed by the display device 200 in FIG. 12, wherefore description of this process is omitted. A process performed by the display device 500 for generating and displaying a display image by using texture streams and depth streams of respective layers is now described with reference to a flowchart in FIG. 32.

In step S301, the decoder 403 reads layer texture streams and layer depth streams of respective layers from the storage section 402, and decodes the read streams. The decoder 403 supplies texture images and depth images of the respective layers acquired by decoding to the segment information generation section 501.

In step S302, the segment information generation section 501 performs a segment information generation process.

Figure 33:
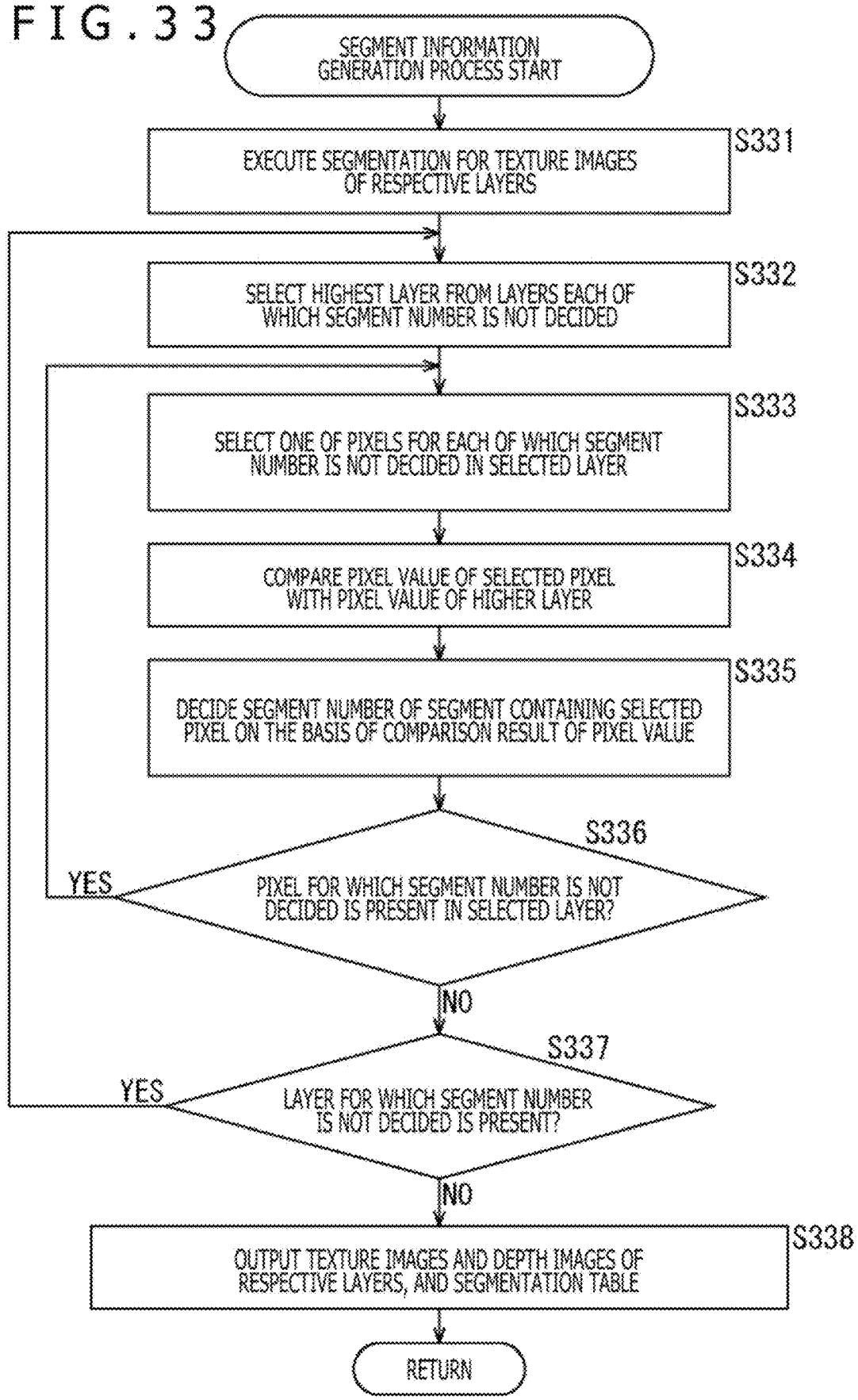
FIG. 33 is a flowchart explaining details of a segment information generation process.
Figure 34:
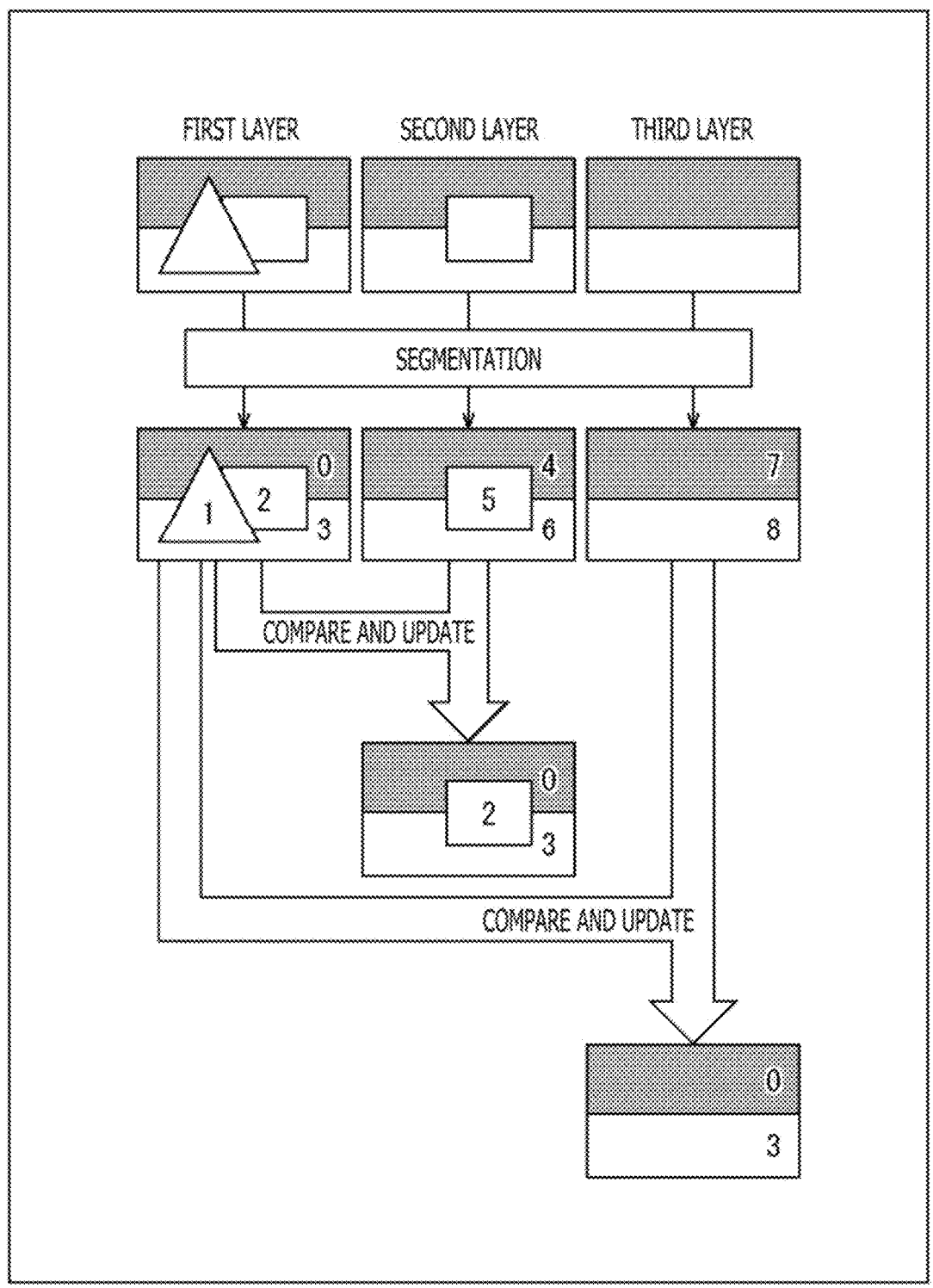
FIG. 34 is a diagram explaining a specific example of the segment information generation process.
Figure 36:
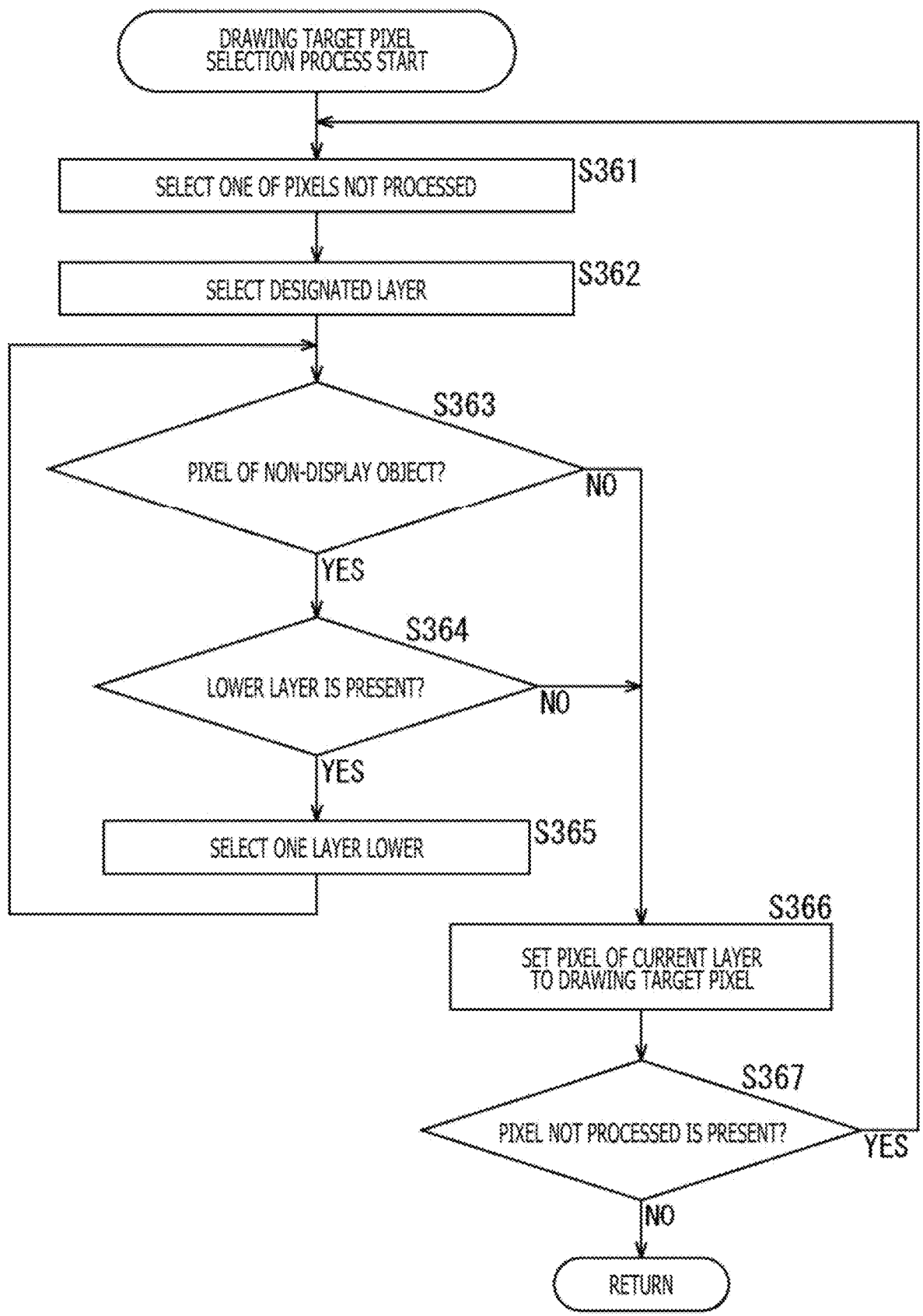
FIG. 36 is a flowchart depicting details of a drawing target pixel selection process.

Details of the segment information generation process will be herein described with reference to a flowchart in FIG. 33. Note that a specific example of the segment information generation process will be described with reference to FIGS. 34 and 35 where appropriate. FIG. 34 depicts an example of segments of texture images of first to third layers, while FIG. 35 depicts an example of the segmentation table.

In step S331, the segment information generation section 501 executes segmentation for texture images of respective layers. More specifically, the segment information generation section 501 divides each texture image of the respective layers into one or more segments for each object by a predetermined method.

Note that the method adopted for segmentation may be any methods. In addition, segmentation may be performed using not only pixel values of a texture image, but also depth values of a depth image.

The segment information generation section 501 further gives segment numbers to uniquely identify segments of texture images of respective layers. Segment numbers in an ascending order from 0 are given to segments in texture images of layers in a lowering order from a higher layer.

For example, four segments of segment numbers 0 to 3 are recognized in a texture image of a first layer in an example in FIG. 34. Three segments of segment numbers 4 to 6 are recognized in a texture image of a second layer. Two segments of segment numbers 7 and 8 are recognized in a texture image of a third layer.

The segment information generation section 501 further generates a segmentation table on the basis of a result of segmentation. For example, x coordinate, y coordinate, and segment number (seg) of each pixel of a layer image are set for each layer in the segmentation table in FIG. 35. Accordingly, a segment number of a segment to which a corresponding pixel belongs is indicated in the segmentation table for each of pixels of layer images of respective layers.

Note that segment numbers given in this process are decided as segment numbers of respective segments in the first layer as the highest layer. For example, segment numbers 0 to 3 are decided as the segment numbers of the respective segments in the first layer in the example in FIG. 34. With decision of the segment numbers, segment numbers of respective pixels of the layer image in the first layer are also decided.

In step S332, the segment information generation section 501 selects a highest layer from layers for each of which a segment number is not decided. Note that the second layer is selected in initial step S332.

Note that a selected layer is hereinafter also referred to as a layer of interest.

In step S333, the segment information generation section 501 selects one pixel from pixels for each of which a segment number is not decided in the selected layer.

Note that a selected pixel is hereinafter also referred to as a pixel of interest.

In step S334, the segment information generation section 501 compares the pixel value of the selected pixel with a pixel value in a higher layer. In other words, the segment information generation section 501 compares a pixel value of a pixel of interest in a texture image of a layer of interest with pixel values of pixels located at the same position in texture images of respective layers higher than the layer of interest.

In step S334, the segment information generation section 501 decides a segment number of a segment containing the selected pixel on the basis of a comparison result of pixel values. More specifically, in a case where a pixel having the same pixel value as the pixel value of a pixel of interest in a texture image of a layer of interest is present in a texture image in a higher layer, the segment information generation section 501 recognizes that the segment containing the corresponding pixel in the texture image of the higher layer, and the segment containing the pixel of interest are segments corresponding to the same object. Thereafter, the segment information generation section 501 updates the segment number of the segment containing the pixel of interest to the same value of the segment number of the corresponding pixel in the texture image of the higher layer. The segment information generation section 501 further updates segment numbers of pixels belonging to the same segment as the segment of the pixel of interest in the layer of interest to the updated segment number, and decides the updated segment number. In this manner, the segments included in the different layers and corresponding to the same object are associated with each other.

For example, the segment of the segment number 4 in the second layer is recognized as a segment corresponding to the same object as the object of the segment of the segment number 0 in the first layer in the example in FIG. 34. In this case, the segment number 4 is updated to 0 and decided. The segment of the segment number 5 in the second layer is recognized as a segment corresponding to the same object as the object of the segment of the segment number 2 in the first layer. In this case, the segment number 5 is updated to 2 and decided. The segment of the segment number 6 in the second layer is recognized as a segment corresponding to the same object as the object of the segment of the segment number 3 in the first layer. In this case, the segment number 6 is updated to 3 and decided. The segment of the segment number 7 in the third layer is recognized as a segment corresponding to the same object as the object of the segment of the segment number 0 in the first layer. In this case, the segment number 7 is updated to 0 and decided. The segment of the segment number 8 in the third layer is recognized as a segment corresponding to the same object as the object of the segment of the segment number 3 in the first layer. In this case, the segment number 8 is updated to 3 and decided.

On the other hand, in a case where a pixel of the same pixel value as the pixel value of a pixel of interest in a texture image of a layer of interest is absent in a texture image in a higher layer, the segment information generation section 501 decides the current segment number as the segment number of the segment containing the pixel of interest. The segment information generation section 501 further decides the current segment number as the segment number of the pixel belonging to the same segment as the segment of the pixel of interest in the layer of interest.

The segment information generation section 501 updates segment numbers of respective pixels in the segmentation table to the decided numbers.

In step S336, the segment information generation section 501 determines whether or not a pixel for which a segment number is not decided is present in a selected layer. In a case where a pixel for which a segment number is not decided is present in the selected layer, the process returns to step S333.

Thereafter, processing from step S333 to step S336 is repeatedly executed in step S336 until absence of a pixel for which a segment number is not decided is determined. In this manner, segment numbers of all pixels of the layer of interest are decided.

On the other hand, in a case where absence of a pixel for which a segment number is not decided is determined in step S336, the process proceeds to step S337.

In step S337, the segment information generation section 501 determines whether or not a layer for which a segment number is not decided is present. In a case where presence of a layer for which a segment number is not decided is determined, the process returns to step S332.

Thereafter, processing from step S332 to step S337 is repeatedly executed in step S337 until absence of a layer for which a segment number is not decided is determined. In this manner, segment numbers of all pixels in all layers are decided.

On the other hand, in a case where absence of a layer for which a segment number is not decided is determined in step S337, the process proceeds to step S338.

In step S338, the segment information generation section 501 outputs the texture images and depth images of the respective layers, and the segmentation table. In other words, the segment information generation section 501 supplies the texture images and depth images of the respective layers, and the segmentation table to the drawing section 502. The segment information generation section 501 further causes the storage section 402 to store the segmentation table.

Returning to FIG. 32, the drawing section 502 determines whether or not an instruction of non-display of an object has been issued in step S303. For example, the listener/viewer desiring non-display of a certain object designates a layer to be displayed and a non-display object. Subsequently, in a case where the drawing section 502 determines that an instruction of non-display of an object has been issued, the process proceeds to step S304. Note that the drawing section 502 acquires a segment number of a segment corresponding to the designated non-display object on the basis of the segmentation table.

In step S304, the drawing section 502 executes a drawing target pixel selection process. Details of the drawing target pixel selection process will be herein described with reference to a flowchart in FIG. 36.

In step S361, the drawing section 502 selects one of pixels not processed.

Note that a selected pixel is hereinafter also referred to as a pixel of interest.

Figure 32:
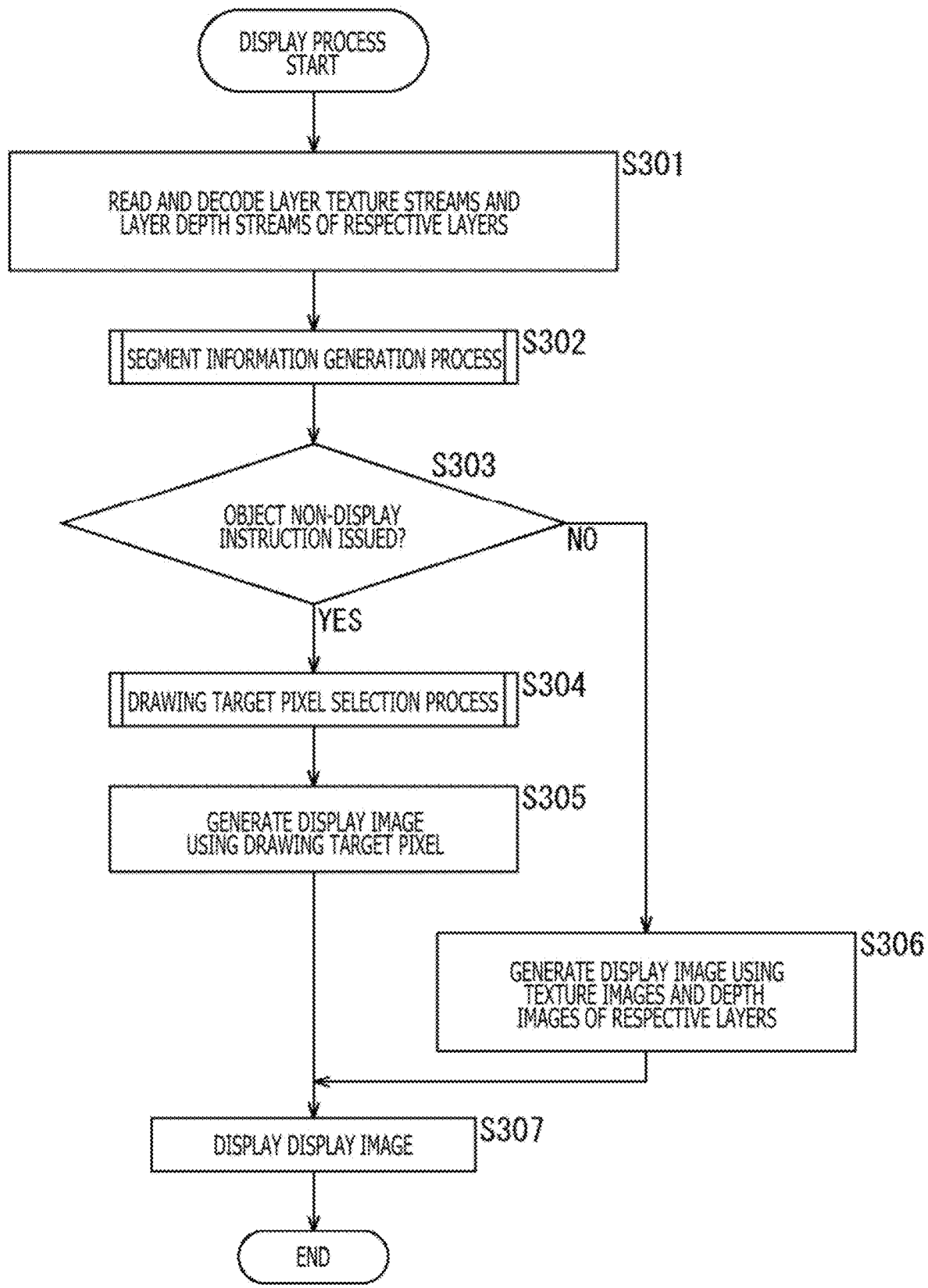
FIG. 32 is a flowchart explaining a display process performed by the display device in FIG. 31.

In step S362, the drawing section 502 selects the layer designated in processing in step S303 in FIG. 32. Note that the drawing section 502 selects a highest layer, for example, in a case where a layer to be displayed has not been designated.

Note that a selected layer is hereinafter also referred to as a layer of interest.

In step S363, the drawing section 502 determines coincidence with a pixel of the non-display object. More specifically, in a case where a segment number of a pixel of interest in a layer of interest coincides with the segment number of the non-display object in the segmentation table, the drawing section 502 determines that the pixel of interest is the pixel of the non-display object. The process then proceeds to step S364.

In step S364, the drawing section 502 determines whether or not a lower layer is present. In a case where presence of a lower layer is determined, the process proceeds to step S365.

In step S365, the drawing section 502 selects a layer located one layer lower. In this manner, the layer of interest is switched to the layer located one layer lower.

Thereafter, the process returns to step S363. Processing from step S363 to step S365 is repeatedly executed until determination that the pixel is not the pixel of the non-display object is made in step S363, or determination that a lower layer is absent is made in step S364.

On the other hand, in a case where determination that the pixel is not the pixel of the non-display object is made in step S363, or determination that a lower layer is absent is made in step S364, the process proceeds to step S366.

In step S366, the drawing section 502 sets pixels in a current layer to drawing target pixels. In other words, the drawing section 502 sets a pixel of interest in a texture image of a layer of interest, and a pixel of interest in a depth image of the layer of interest to drawing target pixels.

As a result, in a case where pixels of objects other than the non-display object are present in pixels of interest in the designated layer or respective layers lower than the designated layer, pixels in a highest layer of these layers are set to drawing target pixels. In this manner, for example, pixels located at the same positions in a layer image in a layer lower than the designated layer and included in a segment different from the segment corresponding to the non-display object are used as drawing target pixels instead of pixels of the segment corresponding to the non-display object in the layer image of the designated layer.

On the other hand, in a case where pixels of objects different from the non-display object are absent in pixels of interest in the designated layer or respective layers lower than the designated layer, pixels of interest in a lowest layer are set to drawing target pixels, for example.

Note that pixel values and depth values of drawing target pixels may be set to predetermined values, or may be calculated by a predetermined method, for example, in a case where pixels of objects different from the non-display object are absent in pixels of interest in the designated layer or respective layers lower than the designated layer.

In step S367, the drawing section 502 determines whether or not a pixel not processed is present. In a case where presence of a pixel not processed is determined, the process returns to step S361.

Thereafter, processing from step S361 to step S367 is repeatedly executed in step S367 until absence of a pixel not processed is determined. In this manner, one of pixels in the designated layer or layers lower than the designated layer is selected as a drawing target pixel for each pixel.

On the other hand, in a case where absence of a pixel not processed is determined in step S367, the drawing target pixel selection process ends.

Returning to FIG. 32, the drawing section 502 generates display images by using drawing target pixels in step S305. The drawing section 502 extracts only drawing target pixels from texture images of respective layers, and arranges the extracted pixels in an original order to generate texture images for display. The drawing section 502 further extracts only drawing target pixels from depth images of respective layers, and arranges the extracted pixels in an original order to generate depth images for display. The drawing section 502 generates display images by processing similar to the foregoing processing in step S202 in FIG. 27 using the texture images and depth images for display. The drawing section 502 supplies the display images to the display section 405.

Thereafter, the process proceeds to step S307.

On the other hand, in a case where no issue of an instruction of non-display of an object is determined in step S303, the process proceeds to step S306.

Figure 27:
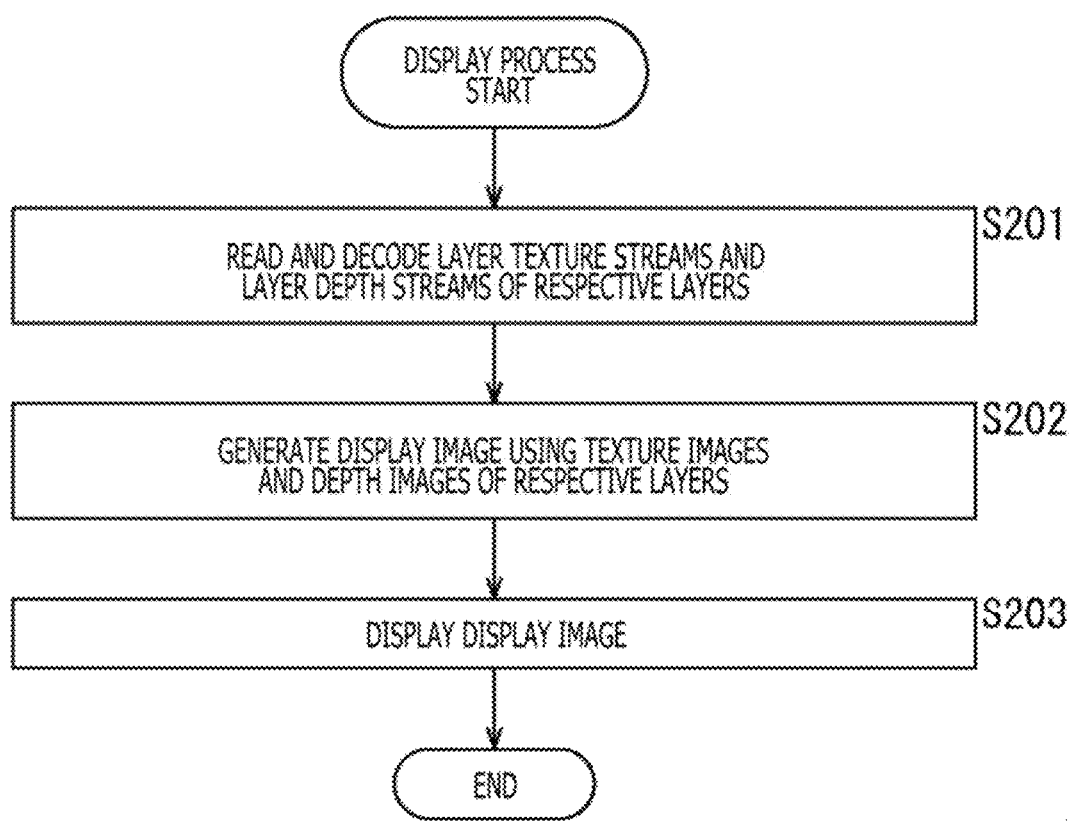
FIG. 27 is a flowchart explaining a display process performed by the display device in FIG. 26.

In step S306, display images are generated by using texture images and depth images of respective layers similarly to the foregoing processing in step S202 in FIG. 27.

Thereafter, the process proceeds to step S307.

In step S307, display images are displayed similarly to the foregoing processing in step S203 in FIG. 24.

Thereafter, the process ends.

Figure 37:
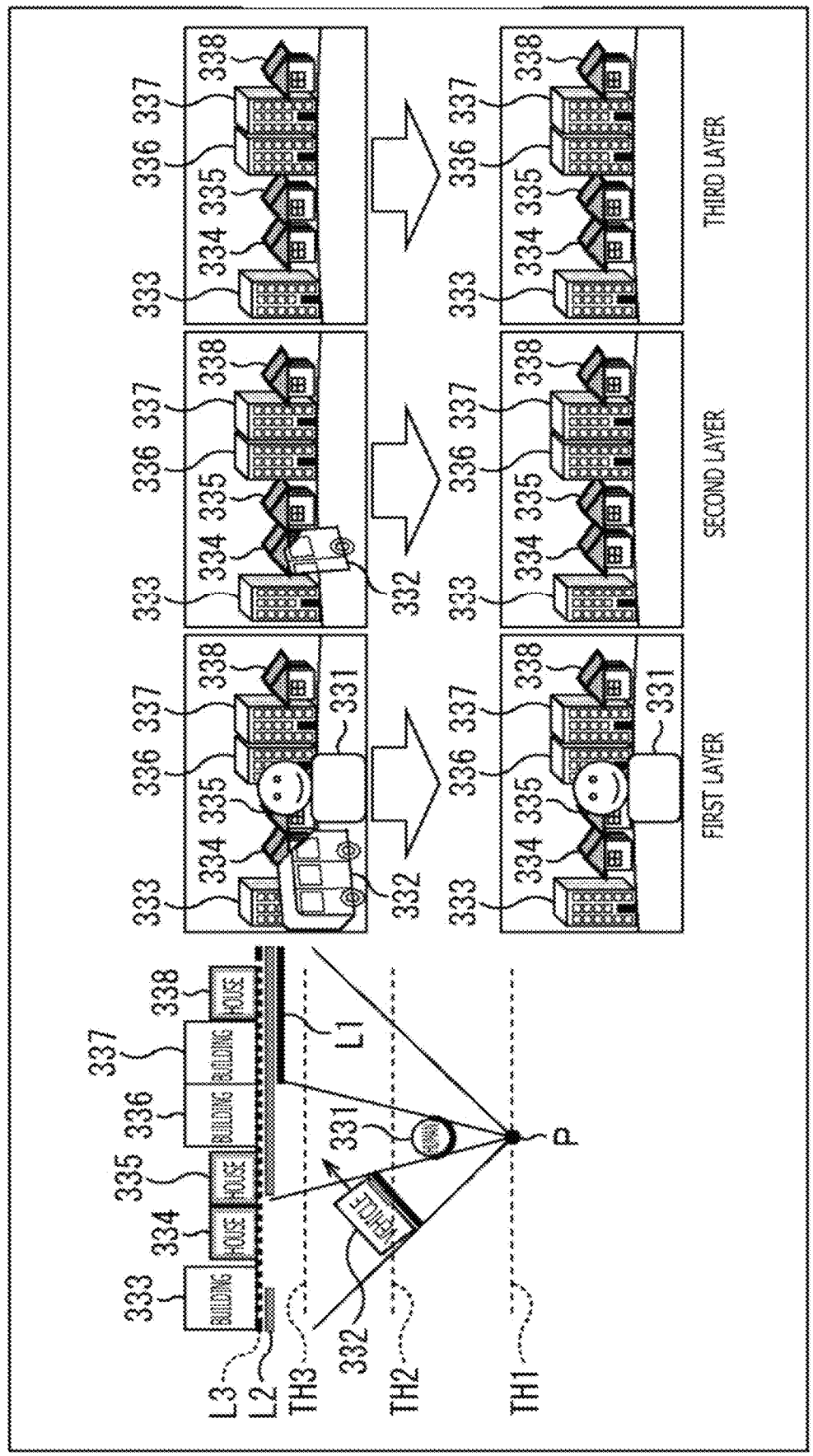
FIG. 37 is a diagram depicting an example of non-display of predetermined objects.
Figure 38:
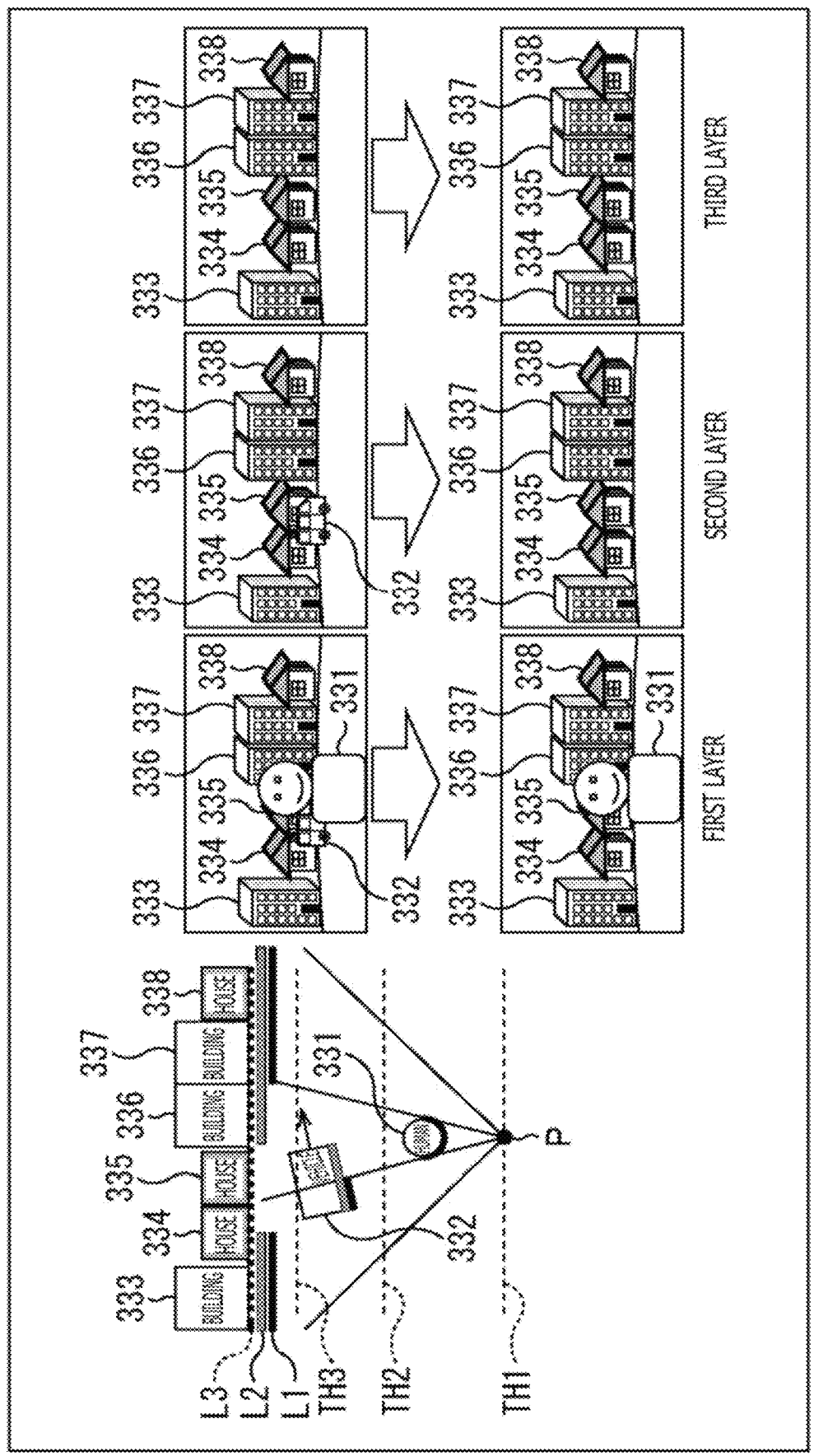
FIG. 38 is a diagram depicting an example of non-display of predetermined objects.
Figure 39:
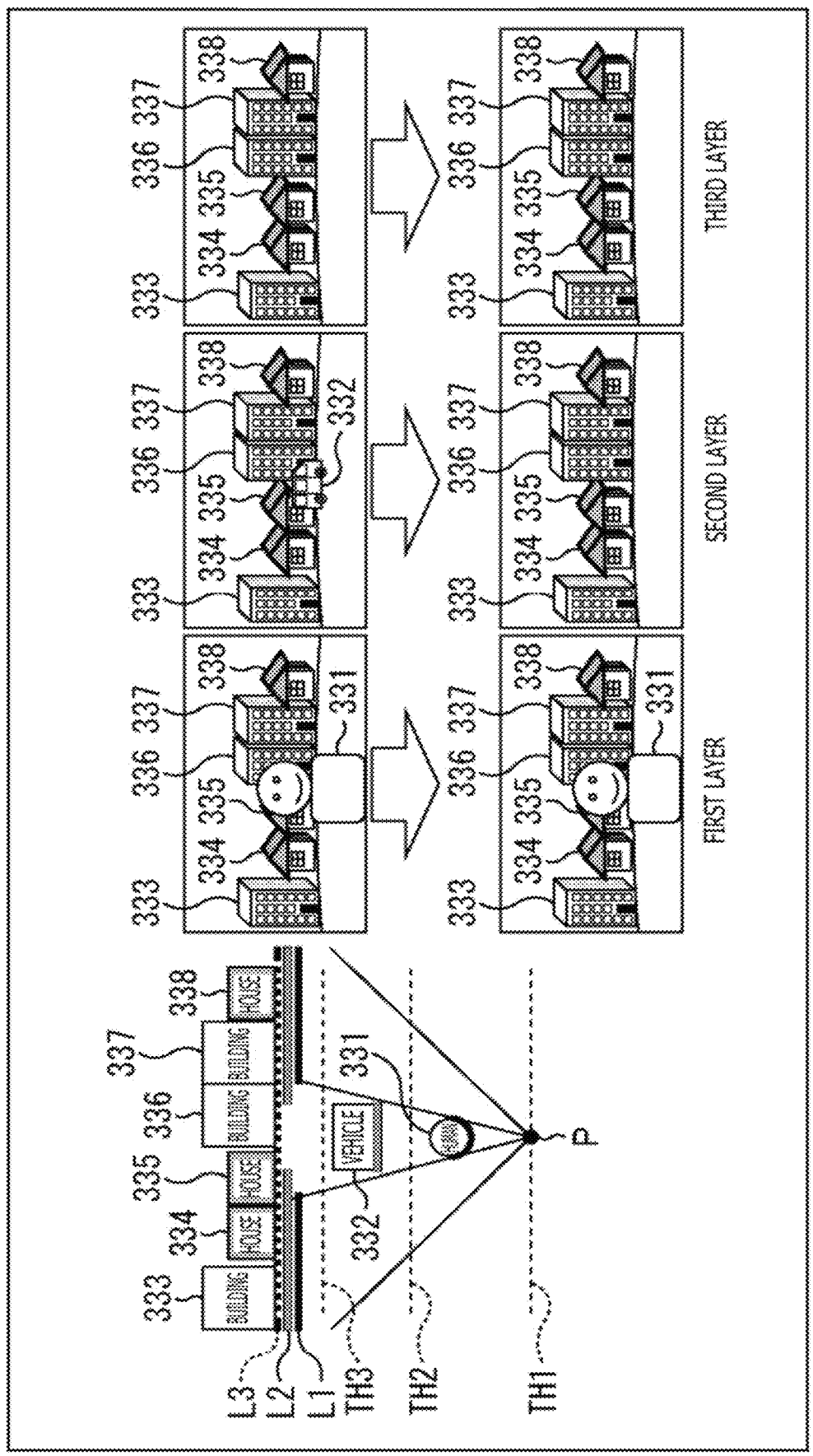
FIG. 39 is a diagram depicting an example of non-display of a predetermined object.

FIGS. 37 to 39 each depict an example of non-display of a predetermined object achieved by the process described above. Note that configurations depicted in FIGS. 37 to 39 and identical to the corresponding configurations in FIGS. 23 and 25 have been given identical reference signs.

A diagram in a left part of each of FIGS. 37 to 39 is a schematic diagram of a positional relationship between respective objects as viewed from above. A diagram in an upper right part of each of FIGS. 37 to 39 depicts an example of texture images of first layer to third layer in a state where the positional relationship between the respective objects is the state depicted in the diagram in the left part. A lower right part of each of FIGS. 37 to 39 depicts an example of display images of first layer to third layer in case of non-display of the vehicle 332.

Note that texture images and display images of the respective layers in each of FIGS. 37 to 39 are arranged in time series, depicting an example of a state where the vehicle 332 moves from the obliquely right rear to the right behind the human 331 while changing a traveling route.

At the position of the vehicle 332 in FIG. 37, the human 331 and the vehicle 332 are drawn without overlap with each other in the texture image of the first layer. In the texture image of the second layer, only a part included in the vehicle 332 and located farther than a shortest distance threshold TH2 is drawn. In the texture image of the third layer, neither the human 331 nor the vehicle 332 is drawn. Non-display of only the vehicle 332 can be therefore achieved in the display images of the first layer and the second layer by performing the foregoing display process.

At the position of the vehicle 332 in FIG. 38, a part of the vehicle 332 is invisible behind the human 331 in the texture image of the first layer. In the texture image of the second layer, the whole of the vehicle 332 is drawn. In the texture image of the third layer, neither the human 331 nor the vehicle 332 is drawn. Non-display of only the vehicle 332 can be therefore achieved in the display images of the first layer and the second layer by performing the foregoing display process.

At the position of the vehicle 332 in FIG. 39, the vehicle 332 is invisible behind the human 331 and not drawn in the texture image of the first layer. In the texture image of the second layer, the whole of the vehicle 332 is drawn. In the texture image of the third layer, neither the human 331 nor the vehicle 332 is drawn. Non-display of only the vehicle 332 can be therefore achieved in the display image of the second layer by performing the foregoing display process.

In this manner, display or non-display of respective objects can be easily switched in display images of respective layers (live-action content) without the necessity of special processing during imaging or during image generation.

Note that the display device 500 can change display modes of respective objects in manners other than switching between display or non-display of the whole of each object as chiefly described above by way of example. In other words, the display device 500 can recognize positions of respective objects and draw parts invisible behind the respective objects, and therefore can easily change display modes of the respective objects. For example, the display device 500 can change display or non-display, movement, rotation, enlargement or reduction in size, and modification of a part of each object, and tint, color, luminance, resolution, transparency or others of each object.

MODIFIED EXAMPLES

Modified examples of the embodiments according to the present disclosure described above will be hereinafter described.

(Other Examples of Texture Image)

Figure 40A:
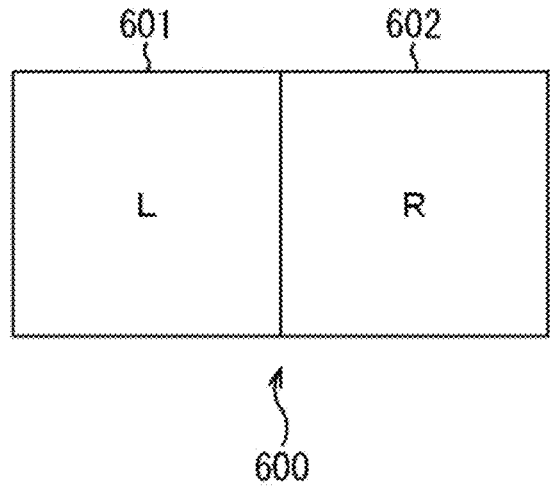
FIGS. 40A and 40B are diagrams depicting another example of a texture image.
Figure 40B:
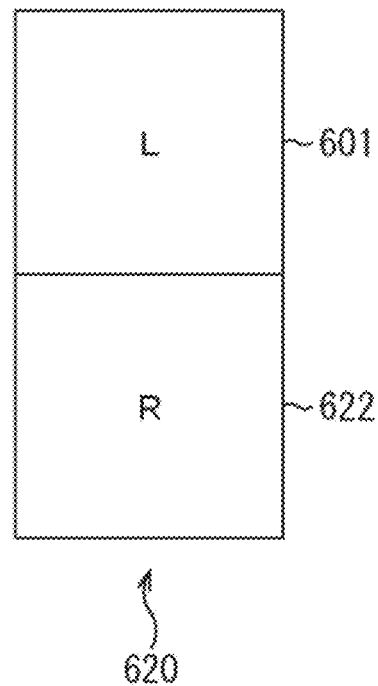

FIGS. 40A and 40B are diagrams depicting other examples of a texture image.

While a texture image described above is a texture image of one visual point, a texture image may be formed by synthesizing texture images of a visual point for a left eye and a visual point for a right eye corresponding to the one visual point.

More specifically, as depicted in FIG. 40A, a texture image may be a packing image 600 formed by packing a texture image 601 of a visual point for a left eye and a texture image 602 of a visual point for a right eye, both corresponding to one visual point and disposed in the transverse direction (horizontal direction), for example.

In addition, as depicted in FIG. 40B, a texture image may be a packing image 620 formed by packing the texture image 601 and the texture image 602 in the longitudinal direction (vertical direction), for example.

As described above, in a case where a texture image is formed by packing images of a visual point for a left eye and a visual point for a right eye, a texture image acquired by decoding is separated into a texture image of the visual point for the left eye and a texture image of the visual point for the right eye. Thereafter, a three-dimensional structure is generated for each eye.

A display image for the left eye is then generated from the three-dimensional structure for the left eye on the basis of a visual point, a visual line direction, and an angle of view of the left eye corresponding to a visual point designated by the listener/viewer or the like. In addition, a display image for the right eye is generated from the three-dimensional structure for the right eye on the basis of a visual point, a visual line direction, and an angle of view of the right eye corresponding to a visual point designated by the listener/viewer or the like.

In a case where the display section 206 (405) is of a type capable of providing 3D display, the display section 206 (405) displays the display image for the left eye as an image for the left eye, and the display image for the right eye as an image for the right eye to provide 3D display of display images. On the other hand, in a case where the display section 206 (405) is of a type incapable of providing 3D display, the display section 206 (405) provides 2D display of the display image for the left eye or the display image for the right eye.

(Modified Example of Camera Arrangement)

The arrangement of the imaging devices 11 depicted in FIGS. 19 and 20 in the second and third embodiments are presented only by way of example, and can be changed to any arrangement in accordance with objects or the like corresponding to imaging targets.

For example, the imaging devices 11 may be so disposed as to surround a periphery of a region containing respective objects only in the horizontal direction, and not to surround the periphery of the region in the vertical direction.

Alternatively, the one imaging device 11 may be disposed at the position of a visual point for generating layer images. In this case, texture images and depth images of respective layers may be generated on the basis of a plurality of texture images and depth images acquired by imaging in the visual line direction at a plurality of different times using the one imaging device 11. In other words, texture images and depth images of respective layers may be generated on the basis of a plurality of texture images and depth images acquired by fixed point observation from a predetermined visual point in a predetermined visual line direction. In this manner, for example, texture images and depth images both in a state where an object as a moving body is present and in a state where an object as a moving body is absent are acquired, wherefore texture images and depth images of respective layers can be easily generated.

(Other Modified Examples)

For example, a plurality of sets of a visual point and a visual line direction may be set to generate layer images of a plurality of layers for each of the sets in the second and third embodiments. Alternatively, a plurality of visual line directions may be set for one visual point to generate layer images of a plurality of layers for each of the visual line directions. The display device 400 or the display device 500 may subsequently display a display image of a desired layer included in display images in a visual line direction from a desired visual point in accordance with designation of visual point, visual line direction, and layer by the listener/viewer or the like.

Moreover, for example, the configuration for performing the generation process and display process of visual point texture streams and visual point depth streams of two visual points, and omnidirectional texture stream and omnidirectional depth stream may be eliminated in the second and third embodiments.

Furthermore, the generation device 12 (300) may read visual point texture streams and visual point depth streams of two visual points, and omnidirectional texture stream and omnidirectional depth stream stored in the storage section 39 (305), and transmits the read streams to the display device 200 only at the time of a request from the display device 200. This modification is also applicable to transmission of the table.

In addition, the generation device 300 may read layer texture streams and layer depth streams of respective layers stored in the storage section 305, and transmits the read streams to the display device 400 (500) only at the time of a request from the display device 400 (500).

Moreover, the generation device 300 may generate the segmentation table depicted in FIG. 35, and transmit the generated segmentation table to the display device 400 or 500.

Furthermore, for example, the generation device 300 may transmit N captured images and depth images, or a three-dimensional model based on N captured images and depth images to the display device 400 (500), and the display device 400 (500) may generate texture images and depth images of respective layers.

In addition, for example, a three-dimensional moving speed of an object invisible behind another object can be calculated in the third embodiment.

For example, a three-dimensional moving speed of a certain object can be calculated by obtaining, in time series, coordinates and a depth value of a segment (object) in a lowest layer where a segment associated with the object is present.

An example of calculation of a moving speed of the vehicle 332 will be herein described with reference to FIGS. 41 and 42. Note that configurations depicted in FIGS. 41 and 42 and identical to the corresponding configurations in FIGS. 23 to 25 have been given identical reference signs.

A diagram in a left part of each of FIGS. 41 and 42 is a schematic diagram depicting a positional relationship between respective objects as viewed from above. A diagram in an upper right part of each of FIGS. 41 and 42 depicts an example of texture images of first layer to third layer in a state where the positional relationship between the respective objects is the state depicted in the diagram in the left part. A diagram in a lower right part of each of FIGS. 41 and 42 depicts an example of depth images of the first layer to third layer.

Note that texture images and depth images of the respective layers in each of FIGS. 41 and 42 are arranged in time series, depicting an example of a state where the vehicle 332 moves from the front of the house 334 to the rear of the human 331 in a direction toward the obliquely right front.

In a state depicted in FIG. 41, the vehicle 332 is drawn in texture image and depth image in each of the second layer and third layer. On the other hand, in a state depicted in FIG. 42, the vehicle 332 disappears in the texture image and depth image of the third layer, and is drawn only in the texture image and depth image of the second layer.

For example, in the state depicted in FIG. 41, it is assumed that coordinates of a predetermined point (hereinafter referred to as point of interest) of the vehicle 332 in the texture image of the third layer are expressed as $(x_3, y_3)$. It is further assumed that a depth value of the point of interest of the vehicle 332 in the depth image of the third layer is $D_3$. On the other hand, in the state depicted in FIG. 42, it is assumed that coordinates of a point of interest of the vehicle 332 in the texture image of the second layer are expressed as $(x_2, y_2)$. It is further assumed that a depth value of the point of interest of the vehicle 332 in the depth image of the second layer is $D_2$. In addition, it is assumed that a time required to change from the state in FIG. 41 to the state in FIG. 42 is t.

In this case, a three-dimensional moving speed v of the vehicle 332 from the state in FIG. 41 to the state in FIG. 42 is calculated by following Formula (1).

[Math. 1]

$$v = \frac{\sqrt{(x_2 - x_3)^2 + (y_2 - y_3)^2 + (D_2 - D_3)^2}}{t} \quad (1)$$

The speed of the vehicle 332 invisible behind the human 331 can be calculated in this manner.

<Application Example>

(Description of Computer to Which Present Disclosure has been Applied)

A series of processes described above may be executed by hardware, or may be executed by software. For executing the series of processes by software, programs constituting the software are installed in a computer. Examples of the computer adopted herein include a computer incorporated in dedicated hardware, a general-purpose personal computer capable of executing various types of functions under various types of programs installed in the computer, and other computers.

FIG. 43 is a block diagram depicting a configuration example of hardware of a computer which executes the series of processes described above under programs.

A central processing unit (CPU) 801, a read only memory (ROM) 802, and a random access memory (RAM) 803 are mutually connected via a bus 804 in a computer 800.

An input/output interface 805 is further connected to the bus 804. An input section 806, an output section 807, a storage section 808, a communication section 809, and a drive 810 are connected to the input/output interface 805.

The input section 806 includes a keyboard, a mouse, a microphone or the like. The output section 807 includes a display, a speaker or the like. The storage section 808 includes a hard disk, a non-volatile memory or the like. The communication section 809 includes a network interface or the like. The drive 810 drives a removable medium 811 such as a magnetic disk, an optical disk, a magneto-optical disk, and a semiconductor memory.

According to the computer 800 thus configured, the CPU 801 performs the series of processes described above by loading programs stored in the storage section 808 into the RAM 803 via the input/output interface 805 and the bus 804, and executing the loaded programs, for example.

The programs executed by the computer 800 (CPU 801) can be recorded in the removable medium 811 such as a package medium, and provided in this form, for example. Alternatively, the programs may be provided via a wired or wireless transmission medium such as a local area network, the Internet, and satellite digital broadcasting.

According to the computer 800, the programs can be installed in the storage section 808 via the input/output interface 805 by attachment of the removable medium 811 to the drive 810. The programs can also be received by the communication section 809 via a wired or wireless transmission medium, and installed in the storage section 808. Alternatively, the program can be installed in the ROM 802 or the storage section 808 beforehand.

Note that the programs executed by the computer 800 may be programs under which processing is performed in time series in the order described in the present specification, or programs under which processing is performed in parallel, or at necessary timing such as timing of a call.

(Application Example to Moving Body Control System)

The technology according to the present disclosure is applicable to various products. For example, the technology according to the present disclosure may be implemented as a device mounted on any type of moving body, such as car, electric car, hybrid electric car, motorcycle, bicycle, personal mobility, airplane, drone, ship, robot, construction machinery, and agricultural machinery (tractor).

FIG. 44 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 44, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 44 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

FIG. 45 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 45 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 44, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE)), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 44, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 44 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

Note that computer programs for performing respective functions of the generation device 12 (300) and the display device 200 (400, 500) according to the present embodiments described with reference to FIGS. 1, 2, 3A, 3B, 3C, 4A, 4B, 5, 6, 7, 8A, 8B, 8C, 9A, 9B, 10A, 10B, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40A, 40B, 41, and 42 may be implemented in any one of control units or the like. In addition, a computer-readable recording medium storing these computer programs may be provided. For example, this recording medium may include a magnetic disk, an optical disk, a magneto-optical disk, a flash memory or the like. Moreover, the computer programs described above may be distributed via a network, for example, rather than provided in the form of a recording medium.

The generation device 12 (300) and the display device 200 (400, 500) according to the present embodiments described with reference to FIGS. 1, 2, 3A, 3B, 3C, 4A, 4B, 5, 6, 7, 8A, 8B, 8C, 9A, 9B, 10A, 10B, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40A, 40B, 41, and 42 may be applied to the vehicle control system 7000 described above. In this case, for example, the generation device 12 (300) and the display device 200 (400, 500) are integrated into one body, and correspond to the microcomputer 7610, the storage section 7690, and the display section 7720. In addition, the imaging device 11 corresponds to the imaging section 7410. In this case, for example, the vehicle control system 7000 can detect another object invisible behind a front object, and detect moving speeds of respective objects by using texture images and depth images of a layer structure.

Moreover, at least a part of constituent elements of the generation device 12 (300) and the display device 200 (400, 500) described with reference to FIGS. 1, 2, 3A, 3B, 3C, 4A, 4B, 5, 6, 7, 8A, 8B, 8C, 9A, 9B, 10A, 10B, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40A, 40B, 41, and 42 may be implemented in a module (e.g., integrated circuit module including one die) for the vehicle control system 7000 depicted in FIG. 44. Alternatively, the generation device 12 (300) and the display device 200 (400, 500) described with reference to FIGS. 1, 2, 3A, 3B, 3C, 4A, 4B, 5, 6, 7, 8A, 8B, 8C, 9A, 9B, 10A, 10B, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40A, 40B, 41, and 42 may be implemented by a plurality of control units of the vehicle control system 7000 depicted in FIG. 44.

Note that effects described in the present specification are presented only by way of example. Effects to be produced are not limited to these effects, but may include other effects.

In addition, embodiments according to the present disclosure are not limited to the embodiments described herein, but may include various modifications without departing from the subject matters of the present disclosure.

For example, the present disclosure may adopt a configuration of cloud computing where one function is shared and cooperatively processed by a plurality of devices via a network.

Moreover, the respective steps described with reference to the flowcharts described herein can be executed by one device, or can be shared and executed by a plurality of devices.

Furthermore, in a case where a plurality of processes are included in one step, the plurality of processes contained in the one step can be executed by one device, or can be shared and executed by a plurality of devices.

Note that the present disclosure may have following configurations.

(1)

An image processing device including:

an image generation section configured to change a display mode of each of objects within a display image on the basis of segment information that indicates a position of a segment in which each of the objects is present, the position of the segment being a position in each of a plurality of layer images that are images generated on the basis of a plurality of captured images and are images classified into a plurality of layers in accordance with distances of the images from a predetermined visual point.

(2)

The image processing device according to (1) described above, in which the segment information indicates a position of each of the segments in a layer direction and a pixel direction.

(3)

The image processing device according to (2) described above, in which the segment information indicates the segment to which each of pixels in each of the layer images belongs, and the segments included in the different layer images and corresponding to the same object are associated with each other.

(4)

The image processing device according to any one of (1) to (3) described above, further including:

a segment information generation section configured to generate the segment information by dividing each of the layer images into a plurality of segments for each of the objects, and associating the segments included in the different layer images and corresponding to the same object with each other.

(5)

The image processing device according to any one of (1) to (4) described above, in which the image generation section generates the display image by using, instead of a pixel of a first segment corresponding to the object set to non-display in the layer image of a first layer, a pixel of a second segment different from the first segment, the pixel of the second segment being a pixel located at the same position in the layer image of a second layer lower than the first layer.

(6)

The image processing device according to any one of (1) to (5) described above, in which the plurality of captured images include a plurality of images captured from different visual points so disposed as to surround at least a part of a periphery of a region that contains each of the objects.

(7)

The image processing device according to (6) described above, in which the plurality of layer images are generated on the basis of a three-dimensional model generated by three-dimensional reconstruction based on the plurality of images captured from the different visual points.

(8)

The image processing device according to any one of (1) to (5) described above, in which the plurality of captured images include a plurality of images captured at different times from the visual point.

(9)

The image processing device according to any one of (1) to (8) described above, in which each of the layer images includes an object located at a distance of a predetermined threshold set for each of the layer images or longer than the predetermined threshold from the visual point in a predetermined visual line direction.

(10)

The image processing device according to any one of (1) to (9) described above, in which each of the layer images includes a texture image and a depth image.

(11)

An image processing method including:

an image generation step where an image processing device changes a display mode of each of objects within a display image on the basis of segment information that indicates a position of a segment in which each of the objects is present, the position of the segment being a position in each of a plurality of layer images that are images generated on the basis of a plurality of captured images and are images classified into a plurality of layers in accordance with distances of the images from a predetermined visual point.

REFERENCE SIGNS LIST

11-1 to 11-N: Imaging device
21-1 to 21-N: Image capturing camera
22-1 to 22-N: Depth image camera
300: Generation device
301: Reconstruction section
302: Visual point control section
303: Drawing section
500: Display device
501: Segment information generation section
502: Drawing section

The invention claimed is:

1. An image processing device, comprising:
a central processing unit (CPU) configured to:
generate segment information that indicates a respective position of each segment of a plurality of segments, wherein
the respective position of the each segment is in a respective layer image of a plurality of layer images;
the plurality of layer images corresponds to a plurality of captured images,
each layer image of the plurality of layer images corresponds to a respective layer of a plurality of layers based on a respective distance of the each layer image from a visual point,
a first segment of the plurality of segments includes a first object of a plurality of objects,
the first segment is in a first layer image of the plurality of layer images,
a second segment of the plurality of segments includes a second object of the plurality of objects,
the second segment is in a second layer image of the plurality of layer images, and
the first layer image is different from the second layer image;
determine the first object is same as the second object;
associate the first segment with the second segment based on the determination that the first object in the first segment is same as the second object in the second segment;
generate a display image based on the plurality of layer images, the segment information, and the association of the first segment with the second segment, wherein the display image includes a set of objects of the plurality of objects; and
change a display mode of each object of the set of objects in the display image based on the segment information.

2. The image processing device according to claim 1, wherein the segment information indicates the respective position of each segment of the plurality of segments in a layer direction and a pixel direction.

3. The image processing device according to claim 2, wherein
each layer image of the plurality of layer images includes:
a plurality of pixels; and
the plurality of segments, and the segment information indicates a segment the plurality of segments, corresponding to each pixel of the plurality of pixels, in the respective layer image of the plurality of layer images.

4. The image processing device according to claim 1, wherein the CPU is further configured to:
divide each layer image of the plurality of layer images into the plurality of segments; and
generate the segment information based on the divide of the each layer image.

5. The image processing device according to claim 1, wherein the CPU is further configured to
generate the display image based on a pixel of the second segment different from the first segment, without utilization of a pixel of the first segment, wherein
the pixel of the first segment of the first layer image is in a first layer of the plurality of layers,
the pixel of the first segment corresponds to a third object set to a non-display state,
a position of the pixel of the second segment in the second layer image corresponds to a position of the pixel of the first segment in the first layer image of the first layer, and
the pixel of the second segment of the second layer image is in a second layer of the plurality of layers lower than the first layer.

6. The image processing device according to claim 1, wherein
the plurality of captured images is captured from a plurality of visual points,
visual points of the plurality of visual points are different,
each captured image of the plurality of captured images corresponds to a respective visual point of the plurality of visual points, and
the plurality of visual points surround at least a part of a periphery of a region that includes each object of the plurality of objects.

7. The image processing device according to claim 6, wherein
generation of the plurality of layer images is based on a three-dimensional model, and
the three-dimensional model is based on the plurality of captured images captured from the plurality of visual points.

8. The image processing device according to claim 1, wherein images of the plurality of captured images are captured at different times from the visual point.

9. The image processing device according to claim 1, wherein
each object of the plurality of objects corresponds to a respective layer image of the plurality of layer images,
the each object of the respective layer image is at a distance from the visual point in a visual direction, and
the distance of the each object is one of equal to or larger than a threshold value of the respective layer image.

10. The image processing device according to claim 1, wherein each layer image of the plurality of layer images includes:
a texture image; and
a depth image.

11. An image processing method, comprising:
generating segment information that indicates a respective position of each segment of a plurality of segments, wherein
the respective position of the each segment is in a respective layer image of a plurality of layer images,
the plurality of layer images is based on a plurality of captured images,
each layer image of the plurality of layer images corresponds to a respective layer of a plurality of layers based on a respective distance of the each layer image from a visual point,
a first segment of the plurality of segments includes a first object of a plurality of objects,
the first segment is in a first layer image of the plurality of layer images,
a second segment of the plurality of segments includes a second object of the plurality of objects,
the second segment is in a second layer image of the plurality of layer images, and
the first layer image is different from the second layer image;
determining the first object is same as the second object;
associating the first segment with the second segment based on the determination that the first object in the first segment is same as the second object in the second segment;
generating a display image based on the plurality of layer images, the segment information, and the association of the first segment with the second segment, wherein the display image includes a set of objects of the plurality of objects; and
changing a display mode of each object of the set of objects in the display image based on the segment information.

* * * * *